United States Patent
Nielsen et al.

(10) Patent No.: US 9,542,863 B2
(45) Date of Patent: Jan. 10, 2017

(54) METHODS AND APPARATUS FOR GENERATING OUTPUT DATA STREAMS RELATING TO UNDERGROUND UTILITY MARKING OPERATIONS

(71) Applicant: CertusView Technologies, LLC, Palm Beach Gardens, FL (US)

(72) Inventors: Steven Nielsen, North Palm Beach, FL (US); Curtis Chambers, Palm Beach Gardens, FL (US); Jeffrey Farr, Royal Palm Beach, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 826 days.

(21) Appl. No.: 13/908,945

(22) Filed: Jun. 3, 2013

(65) Prior Publication Data

US 2014/0074970 A1    Mar. 13, 2014

Related U.S. Application Data

(63) Continuation of application No. 12/622,768, filed on Nov. 20, 2009, now Pat. No. 8,457,893, which is a
(Continued)

(51) Int. Cl.
*G01C 21/10* (2006.01)
*G09B 29/00* (2006.01)
(Continued)

(52) U.S. Cl.
CPC .............. *G09B 29/003* (2013.01); *G01C 15/06* (2013.01); *G06Q 10/06* (2013.01); *G06Q 50/06* (2013.01); *G06Q 50/08* (2013.01); *H04L 69/22* (2013.01)

(58) Field of Classification Search
CPC .......... G01C 15/04; G01C 15/06; E01C 23/22; E01C 23/227; E01C 23/20; G06Q 50/06; G06Q 50/08
(Continued)

(56) References Cited

U.S. PATENT DOCUMENTS 3,871,557 A    3/1975   Smrt
3,972,038 A    7/1976   Fletcher et al.
(Continued)

FOREIGN PATENT DOCUMENTS

CA    2636137    7/2007
CA    2623761    10/2008
(Continued)

OTHER PUBLICATIONS

U.S. Appl. No. 14/579,223, filed Dec. 22, 2014, Nielsen et al.
(Continued)

*Primary Examiner* — Mark Hellner
(74) *Attorney, Agent, or Firm* — Cooley LLP

(57) ABSTRACT

Methods and apparatus for generating electronic records of marking operations for underground facilities/utilities. Electronic records of marking information may be logged/stored in local memory of a marking device, formatted in various manners, processed and/or analyzed at the marking device itself, and/or transmitted in whole or in part to another device (e.g., a remote computer/server) for storage, processing and/or analysis. In one example, an output stream of data packets is provided, wherein each data packet includes one or more flag fields that is/are set or reset upon at least one actuation of the marking device.

38 Claims, 14 Drawing Sheets

Related U.S. Application Data continuation of application No. 12/539,497, filed on Aug. 11, 2009, now Pat. No. 8,280,631.

(60) Provisional application No. 61/102,151, filed on Oct. 2, 2008.

(51) Int. Cl.

| | | |
|---|---|---|
| *G06Q 10/06* | (2012.01) | |
| *G06Q 50/06* | (2012.01) | |
| *G06Q 50/08* | (2012.01) | |
| *H04L 29/06* | (2006.01) | |
| *G01C 15/06* | (2006.01) | |

(58) Field of Classification Search
USPC .. 709/217; 118/663, 708; 700/283; 701/521; 324/323, 326; 427/137
See application file for complete search history.

(56) References Cited

U.S. PATENT DOCUMENTS

| | | |
|---|---|---|
| 3,974,491 A | 8/1976 | Sipe |
| 3,988,922 A | 11/1976 | Clark et al. |
| 4,016,748 A | 4/1977 | Boyens |
| 4,258,320 A | 3/1981 | Schonstedt |
| 4,387,340 A | 6/1983 | Peterman |
| 4,388,592 A | 6/1983 | Schonstedt |
| 4,520,317 A | 5/1985 | Peterman |
| 4,536,710 A | 8/1985 | Dunham |
| 4,539,522 A | 9/1985 | Schonstedt |
| 4,590,425 A | 5/1986 | Schonstedt |
| 4,623,282 A | 11/1986 | Allen |
| 4,639,674 A | 1/1987 | Rippingale |
| 4,712,094 A | 12/1987 | Bolson, Sr. |
| 4,747,207 A | 5/1988 | Schonstedt et al. |
| 4,803,773 A | 2/1989 | Schonstedt |
| 4,818,944 A | 4/1989 | Rippingale |
| 4,839,623 A | 6/1989 | Schonstedt et al. |
| 4,839,624 A | 6/1989 | Schonstedt |
| 4,873,533 A | 10/1989 | Oike |
| 4,899,293 A | 2/1990 | Dawson et al. |
| 4,989,151 A | 1/1991 | Nuimura |
| 5,006,806 A | 4/1991 | Rippingale et al. |
| 5,014,008 A | 5/1991 | Flowerdew |
| 5,017,873 A | 5/1991 | Rippingale et al. |
| 5,025,150 A | 6/1991 | Oldham et al. |
| 5,043,666 A | 8/1991 | Tavernetti et al. |
| 5,045,368 A | 9/1991 | Cosman et al. |
| 5,065,098 A | 11/1991 | Salsman et al. |
| 5,093,622 A | 3/1992 | Balkman |
| 5,097,211 A | 3/1992 | Schonstedt |
| 5,114,517 A | 5/1992 | Rippingale et al. |
| 5,122,750 A | 6/1992 | Rippingale et al. |
| 5,136,245 A | 8/1992 | Schonstedt |
| 5,138,761 A | 8/1992 | Schonstedt |
| 5,150,295 A | 9/1992 | Mattingly |
| 5,173,139 A | 12/1992 | Rippingale et al. |
| 5,206,065 A | 4/1993 | Rippingale et al. |
| 5,214,757 A | 5/1993 | Mauney et al. |
| 5,231,355 A | 7/1993 | Rider et al. |
| 5,239,290 A | 8/1993 | Schonstedt |
| 5,260,659 A | 11/1993 | Flowerdew et al. |
| 5,264,795 A | 11/1993 | Rider |
| 5,299,300 A | 3/1994 | Femal |
| 5,324,922 A * | 6/1994 | Roberts ............... G06Q 10/087 235/375 |
| 5,329,464 A | 7/1994 | Sumic et al. |
| 5,349,520 A | 9/1994 | Hickman |
| 5,361,029 A | 11/1994 | Rider |
| 5,365,163 A | 11/1994 | Satterwhite et al. |
| 5,373,298 A | 12/1994 | Karouby |
| 5,379,045 A | 1/1995 | Gilbert et al. |
| 5,381,338 A | 1/1995 | Wysocki |
| 5,389,149 A | 2/1995 | Carey et al. |
| 5,430,379 A | 7/1995 | Parkinson et al. |
| 5,444,364 A | 8/1995 | Satterwhite et al. |
| 5,467,271 A | 11/1995 | Abel et al. |
| 5,471,143 A | 11/1995 | Doany |
| 5,486,067 A | 1/1996 | Huynh |
| 5,487,603 A * | 1/1996 | Hoff ............... B01F 15/00253 222/58 |
| 5,490,646 A | 2/1996 | Shaw |
| 5,517,419 A | 5/1996 | Lanckton |
| 5,519,329 A | 5/1996 | Satterwhite |
| 5,529,433 A | 6/1996 | Huynh |
| 5,530,357 A | 6/1996 | Cosman et al. |
| 5,543,931 A | 8/1996 | Lee et al. |
| 5,546,387 A * | 8/1996 | Larsson ............... H04L 49/3009 370/392 |
| 5,553,407 A | 9/1996 | Stump |
| 5,568,162 A | 10/1996 | Samsel et al. |
| 5,576,973 A | 11/1996 | Haddy |
| 5,621,325 A | 4/1997 | Draper et al. |
| 5,629,626 A | 5/1997 | Russell et al. |
| 5,644,237 A | 7/1997 | Eslambolchi et al. |
| 5,659,985 A | 8/1997 | Stump |
| 5,673,050 A | 9/1997 | Moussally et al. |
| 5,689,415 A | 11/1997 | Calotychos et al. |
| 5,699,244 A | 12/1997 | Clark, Jr. |
| 5,704,142 A | 1/1998 | Stump |
| 5,734,348 A | 3/1998 | Aoki et al. |
| 5,739,785 A | 4/1998 | Allison et al. |
| 5,751,289 A | 5/1998 | Myers |
| 5,751,450 A | 5/1998 | Robinson |
| 5,764,127 A | 6/1998 | Hore et al. |
| 5,769,370 A | 6/1998 | Ashjaee |
| 5,819,859 A | 10/1998 | Stump et al. |
| 5,828,219 A | 10/1998 | Hanlon et al. |
| 5,848,373 A | 12/1998 | Delorme et al. |
| 5,916,300 A | 6/1999 | Kirk et al. |
| 5,917,325 A | 6/1999 | Smith |
| 5,918,565 A | 7/1999 | Casas |
| 5,920,194 A | 7/1999 | Lewis et al. |
| 5,955,667 A | 9/1999 | Fyfe |
| 6,026,135 A | 2/2000 | McFee et al. |
| 6,031,454 A | 2/2000 | Lovejoy et al. |
| 6,032,530 A | 3/2000 | Hock |
| 6,037,010 A | 3/2000 | Kahmann et al. |
| 6,053,260 A | 4/2000 | Boon |
| 6,061,632 A | 5/2000 | Dreier |
| 6,064,940 A | 5/2000 | Rodgers |
| 6,074,693 A | 6/2000 | Manning |
| 6,075,481 A | 6/2000 | Eslambolchi |
| 6,095,081 A | 8/2000 | Gochenour |
| 6,107,801 A | 8/2000 | Hopwood |
| 6,119,376 A | 9/2000 | Stump |
| 6,127,827 A | 10/2000 | Lewis |
| 6,130,539 A | 10/2000 | Polak |
| 6,138,906 A | 10/2000 | DeMayo |
| 6,140,819 A | 10/2000 | Peterman et al. |
| 6,169,958 B1 | 1/2001 | Nagasamy et al. |
| 6,188,392 B1 | 2/2001 | O'Connor et al. |
| 6,188,777 B1 | 2/2001 | Darrell et al. |
| 6,206,282 B1 | 3/2001 | Hayes, Sr. et al. |
| 6,234,218 B1 | 5/2001 | Boers |
| 6,240,360 B1 | 5/2001 | Phelan |
| 6,268,731 B1 | 7/2001 | Hopwood et al. |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,297,736 B1 | 10/2001 | Lewis et al. |
| 6,299,934 B1 | 10/2001 | Manning |
| 6,308,565 B1 | 10/2001 | French et al. |
| 6,320,518 B2 | 11/2001 | Saeki et al. |
| 6,343,290 B1 | 1/2002 | Cossins |
| RE37,574 E | 3/2002 | Rawlins |
| 6,356,082 B1 | 3/2002 | Alkire et al. |
| 6,363,320 B1 | 3/2002 | Chou |
| 6,375,038 B1 | 4/2002 | Daansen et al. |
| 6,378,220 B1 | 4/2002 | Baioff et al. |
| 6,388,629 B1 | 5/2002 | Albats et al. |
| 6,390,336 B1 | 5/2002 | Orozco |

(56) References Cited

U.S. PATENT DOCUMENTS

| | | |
|---|---|---|
| 6,401,051 B1 | 6/2002 | Merriam |
| 6,407,550 B1 | 6/2002 | Parakulam et al. |
| 6,411,094 B1 | 6/2002 | Gard et al. |
| 6,417,797 B1 | 7/2002 | Cousins et al. |
| 6,437,708 B1 | 8/2002 | Brouwer |
| 6,438,239 B1 | 8/2002 | Kuechen |
| 6,459,266 B1 | 10/2002 | Fling |
| 6,459,988 B1 | 10/2002 | Fan et al. |
| 6,476,708 B1 | 11/2002 | Johnson |
| 6,477,588 B1 | 11/2002 | Yerazunis |
| 6,490,524 B1 | 12/2002 | White et al. |
| 6,512,478 B1 | 1/2003 | Chien |
| 6,526,400 B1 | 2/2003 | Takata |
| 6,549,011 B2 | 4/2003 | Flatt |
| 6,552,548 B1 | 4/2003 | Lewis et al. |
| 6,585,133 B1 | 7/2003 | Brouwer |
| 6,600,420 B2 | 7/2003 | Goff et al. |
| 6,617,856 B1 | 9/2003 | Royle et al. |
| 6,633,163 B2 | 10/2003 | Fling |
| 6,650,293 B1 | 11/2003 | Eslambolchi |
| 6,650,798 B2 | 11/2003 | Russell et al. |
| 6,658,148 B1 | 12/2003 | Fung et al. |
| 6,674,276 B2 | 1/2004 | Morgan et al. |
| 6,700,526 B2 | 3/2004 | Witten |
| 6,710,741 B2 | 3/2004 | Tucker |
| 6,717,392 B2 | 4/2004 | Pearson |
| 6,723,375 B2 | 4/2004 | Zeck et al. |
| 6,728,662 B2 | 4/2004 | Frost et al. |
| 6,751,552 B1 | 6/2004 | Minelli |
| 6,751,553 B2 | 6/2004 | Young |
| 6,751,554 B1 | 6/2004 | Asher et al. |
| 6,777,923 B2 | 8/2004 | Pearson |
| 6,778,128 B2 | 8/2004 | Tucker et al. |
| 6,798,379 B2 | 9/2004 | Tucker et al. |
| 6,799,116 B2 | 9/2004 | Robbins |
| 6,815,953 B1 | 11/2004 | Bigelow |
| 6,819,109 B2 | 11/2004 | Sowers et al. |
| 6,825,775 B2 | 11/2004 | Fling et al. |
| 6,825,793 B2 | 11/2004 | Taylor, Jr. et al. |
| 6,833,795 B1 | 12/2004 | Johnson et al. |
| 6,833,811 B2 | 12/2004 | Zeitfuss et al. |
| 6,836,231 B2 | 12/2004 | Pearson |
| 6,845,171 B2 | 1/2005 | Shum et al. |
| 6,850,161 B1 | 2/2005 | Elliott et al. |
| 6,850,843 B2 | 2/2005 | Smith et al. |
| 6,853,303 B2 | 2/2005 | Chen et al. |
| 6,865,484 B2 | 3/2005 | Miyasaka et al. |
| 6,898,525 B1 | 5/2005 | Minelli |
| 6,898,550 B1 | 5/2005 | Blackadar et al. |
| 6,904,361 B1 | 6/2005 | Tallman et al. |
| 6,941,890 B1 | 9/2005 | Cristo et al. |
| 6,947,028 B2 | 9/2005 | Shkolnikov |
| 6,954,071 B2 | 10/2005 | Flatt et al. |
| 6,956,524 B2 | 10/2005 | Tucker et al. |
| 6,956,564 B1 | 10/2005 | Williams |
| 6,958,690 B1 | 10/2005 | Asher et al. |
| 6,968,296 B2 | 11/2005 | Royle |
| 6,972,698 B2 | 12/2005 | Deguchi |
| 6,975,942 B2 | 12/2005 | Young et al. |
| 6,977,508 B2 | 12/2005 | Pearson et al. |
| 6,992,584 B2 | 1/2006 | Dooley et al. |
| 6,993,088 B2 | 1/2006 | Fling et al. |
| 6,999,021 B2 | 2/2006 | Taylor, Jr. |
| 7,009,399 B2 | 3/2006 | Olsson et al. |
| 7,009,519 B2 | 3/2006 | Leonard et al. |
| 7,038,454 B2 | 5/2006 | Gard et al. |
| 7,042,358 B2 | 5/2006 | Moore |
| 7,048,320 B2 | 5/2006 | Rubel |
| 7,053,789 B2 | 5/2006 | Fling et al. |
| 7,057,383 B2 | 6/2006 | Schlapp et al. |
| 7,062,414 B2 | 6/2006 | Waite et al. |
| 7,079,591 B2 | 7/2006 | Fling et al. |
| 7,091,872 B1 | 8/2006 | Bigelow et al. |
| 7,113,124 B2 | 9/2006 | Waite |
| 7,116,244 B2 | 10/2006 | Fling et al. |
| 7,120,564 B2 | 10/2006 | Pacey |
| 7,235,980 B2 | 6/2007 | Pearson et al. |
| 7,236,863 B2 | 6/2007 | LaPorte et al. |
| 7,285,958 B2 | 10/2007 | Overby et al. |
| 7,304,480 B1 | 12/2007 | Pearson |
| 7,310,584 B2 | 12/2007 | Royle |
| 7,319,387 B2 | 1/2008 | Willson et al. |
| 7,331,340 B2 | 2/2008 | Barney |
| 7,336,078 B1 | 2/2008 | Merewether et al. |
| 7,339,379 B2 | 3/2008 | Thompson et al. |
| 7,342,537 B2 | 3/2008 | Pearson et al. |
| 7,356,421 B2 | 4/2008 | Gudmundsson et al. |
| 7,358,738 B2 | 4/2008 | Overby et al. |
| 7,372,247 B1 | 5/2008 | Giusti et al. |
| 7,372,276 B2 | 5/2008 | Mulcahey |
| 7,396,177 B2 | 7/2008 | Lapstun et al. |
| 7,396,178 B2 | 7/2008 | Lapstun et al. |
| 7,400,976 B2 | 7/2008 | Young et al. |
| 7,403,012 B2 | 7/2008 | Worsley et al. |
| 7,413,363 B2 | 8/2008 | Lapstun et al. |
| 7,443,154 B1 | 10/2008 | Merewether et al. |
| 7,447,509 B2 | 11/2008 | Cossins |
| 7,451,721 B1 | 11/2008 | Garza et al. |
| 7,482,973 B2 | 1/2009 | Tucker et al. |
| 7,498,816 B1 | 3/2009 | Olsson et al. |
| 7,500,583 B1 | 3/2009 | Cox |
| 7,532,127 B2 | 5/2009 | Holman et al. |
| 7,636,901 B2 | 12/2009 | Munson |
| 7,640,105 B2 | 12/2009 | Nielsen et al. |
| 7,664,530 B2 | 2/2010 | Skelton |
| 7,730,095 B2 | 6/2010 | Vishwanath et al. |
| 7,733,077 B1 | 6/2010 | Merewether et al. |
| 7,755,360 B1 | 7/2010 | Martin |
| 7,773,095 B1 | 8/2010 | Badrak et al. |
| 7,798,417 B2 | 9/2010 | Snyder et al. |
| 7,834,801 B2 | 11/2010 | Waite et al. |
| 7,834,806 B2 | 11/2010 | Tucker et al. |
| 7,889,124 B2 | 2/2011 | Islam et al. |
| 7,889,888 B2 | 2/2011 | Deardorr |
| 7,929,981 B2 | 4/2011 | Sangberg |
| 7,978,129 B2 | 7/2011 | Sawyer et al. |
| 7,986,246 B2 | 7/2011 | Angelis et al. |
| 7,990,151 B2 | 8/2011 | Olsson |
| 8,040,272 B1 | 10/2011 | Clodfelter et al. |
| 8,060,304 B2 | 11/2011 | Nielsen et al. |
| 8,068,789 B2 | 11/2011 | Bell et al. |
| 8,069,412 B2 | 11/2011 | Bankston et al. |
| 8,077,072 B2 | 12/2011 | Mohamadi et al. |
| 8,081,112 B2 | 12/2011 | Tucker et al. |
| 8,106,660 B1 | 1/2012 | Merewether et al. |
| 8,118,192 B2 | 2/2012 | Daughtery |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,264,409 B2 | 9/2012 | Miller |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |

(56) References Cited

U.S. PATENT DOCUMENTS

| | | | |
|---|---|---|---|
| 8,424,486 B2 | 4/2013 | Nielsen et al. |
| 8,457,893 B2 | 6/2013 | Nielsen et al. |
| 8,463,487 B2 | 6/2013 | Nielsen et al. |
| 8,467,932 B2 | 6/2013 | Nielsen et al. |
| 8,467,969 B2 | 6/2013 | Nielsen et al. |
| 8,468,206 B2 | 6/2013 | Nielsen et al. |
| 8,473,148 B2 | 6/2013 | Nielsen et al. |
| 8,473,209 B2 | 6/2013 | Nielsen et al. |
| 8,476,906 B2 | 7/2013 | Nielsen et al. |
| 8,478,523 B2 | 7/2013 | Nielsen et al. |
| 8,478,524 B2 | 7/2013 | Nielsen et al. |
| 8,478,525 B2 | 7/2013 | Nielsen et al. |
| 8,478,617 B2 | 7/2013 | Nielsen et al. |
| 8,478,635 B2 | 7/2013 | Nielsen et al. |
| 8,480,332 B2 | 7/2013 | Miller |
| 8,484,300 B2 | 7/2013 | Nielsen et al. |
| 8,510,141 B2 | 8/2013 | Nielsen et al. |
| 8,532,341 B2 | 9/2013 | Nielsen et al. |
| 8,532,342 B2 | 9/2013 | Nielsen et al. |
| 8,543,651 B2 | 9/2013 | Nielsen et al. |
| 8,543,937 B2 | 9/2013 | Nielsen et al. |
| 8,549,084 B2 | 10/2013 | Nielsen et al. |
| 8,560,164 B2 | 10/2013 | Nielsen et al. |
| 8,566,737 B2 | 10/2013 | Nielsen et al. |
| 8,572,193 B2 | 10/2013 | Nielsen et al. |
| 8,577,707 B2 | 11/2013 | Nielsen et al. |
| 8,583,264 B2 | 11/2013 | Nielsen et al. |
| 8,583,372 B2 | 11/2013 | Nielsen et al. |
| 8,589,201 B2 | 11/2013 | Nielsen et al. |
| 8,589,202 B2 | 11/2013 | Nielsen et al. |
| 8,600,526 B2 | 12/2013 | Nielsen et al. |
| 8,600,848 B2 | 12/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,572 B2 | 12/2013 | Nielsen et al. |
| 8,620,587 B2 | 12/2013 | Nielsen et al. |
| 8,620,616 B2 | 12/2013 | Nielsen et al. |
| 8,620,726 B2 | 12/2013 | Nielsen et al. |
| 8,626,571 B2 | 1/2014 | Nielsen et al. |
| 8,630,463 B2 | 1/2014 | Nielsen et al. |
| 8,644,965 B2 | 2/2014 | Nielsen et al. |
| 8,700,325 B2 | 4/2014 | Nielsen et al. |
| 8,731,830 B2 | 5/2014 | Nielsen et al. |
| 8,731,999 B2 | 5/2014 | Nielsen et al. |
| 8,749,239 B2 | 6/2014 | Nielsen et al. |
| 8,766,638 B2 | 7/2014 | Nielsen et al. |
| 8,770,140 B2 | 7/2014 | Nielsen et al. |
| 8,775,077 B2 | 7/2014 | Nielsen et al. |
| 8,805,640 B2 | 8/2014 | Nielsen et al. |
| 2001/0029996 A1 | 10/2001 | Robinson |
| 2002/0035432 A1 | 3/2002 | Kubica et al. |
| 2002/0053608 A1 | 5/2002 | Zeck et al. |
| 2002/0085884 A1 | 7/2002 | Harris |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130906 A1 | 9/2002 | Miyaki |
| 2002/0184235 A1 | 12/2002 | Young |
| 2002/0190718 A1 | 12/2002 | Gard et al. |
| 2003/0012411 A1 | 1/2003 | Sjostrom |
| 2003/0058164 A1 | 3/2003 | Zhdanov et al. |
| 2003/0080897 A1 | 5/2003 | Tranchina |
| 2003/0083073 A1 | 5/2003 | Cossins |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0006425 A1 | 1/2004 | Wood |
| 2004/0041892 A1 | 3/2004 | Yoneyama et al. |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0210370 A1 | 10/2004 | Gudat |
| 2004/0215701 A1 | 10/2004 | Vrajich |
| 2004/0220731 A1 | 11/2004 | Tucker |
| 2004/0225444 A1 | 11/2004 | Young et al. |
| 2004/0260720 A1 | 12/2004 | Cossins |
| 2004/0268005 A1 | 12/2004 | Dickie |
| 2005/0004944 A1 | 1/2005 | Cossins |
| 2005/0023367 A1 | 2/2005 | Reighard |
| 2005/0034074 A1 | 2/2005 | Munson |
| 2005/0038825 A1 | 2/2005 | Tarabzouni |
| 2005/0040222 A1 | 2/2005 | Robinson et al. |
| 2005/0054457 A1 | 3/2005 | Eyestone et al. |
| 2005/0055142 A1 | 3/2005 | Mcmurtry et al. |
| 2005/0057745 A1 | 3/2005 | Bontje |
| 2005/0150399 A1 | 7/2005 | Wiley |
| 2005/0156600 A1 | 7/2005 | Olsson |
| 2005/0192727 A1 | 9/2005 | Shostak et al. |
| 2005/0206562 A1 | 9/2005 | Willson et al. |
| 2005/0232475 A1 | 10/2005 | Floeder |
| 2005/0278371 A1 | 12/2005 | Funk et al. |
| 2006/0020417 A1 | 1/2006 | Koch et al. |
| 2006/0026020 A1 | 2/2006 | Waite et al. |
| 2006/0055584 A1 | 3/2006 | Waite et al. |
| 2006/0061595 A1 | 3/2006 | Goede et al. |
| 2006/0077095 A1 | 4/2006 | Tucker et al. |
| 2006/0085133 A1* | 4/2006 | Young ............... G01V 1/00 702/5 |
| 2006/0085396 A1 | 4/2006 | Evans |
| 2006/0091888 A1 | 5/2006 | Holman et al. |
| 2006/0109131 A1 | 5/2006 | Sen et al. |
| 2006/0169776 A1 | 8/2006 | Hornbaker |
| 2006/0220955 A1 | 10/2006 | Hamilton |
| 2006/0235741 A1 | 10/2006 | Deaton et al. |
| 2006/0244454 A1 | 11/2006 | Gard |
| 2006/0254820 A1 | 11/2006 | Gard et al. |
| 2006/0262963 A1 | 11/2006 | Navulur |
| 2006/0276198 A1 | 12/2006 | Michelon et al. |
| 2006/0276985 A1 | 12/2006 | Xu |
| 2006/0282191 A1 | 12/2006 | Gotfried |
| 2006/0282280 A1* | 12/2006 | Stotz ............... G07B 15/00 705/1.1 |
| 2006/0285913 A1 | 12/2006 | Koptis |
| 2006/0287900 A1 | 12/2006 | Fiore et al. |
| 2006/0289679 A1 | 12/2006 | Johnson et al. |
| 2007/0013379 A1 | 1/2007 | Staples et al. |
| 2007/0018632 A1 | 1/2007 | Royle |
| 2007/0031042 A1 | 2/2007 | Simental |
| 2007/0040558 A1 | 2/2007 | Overby et al. |
| 2007/0100496 A1 | 5/2007 | Forell |
| 2007/0219722 A1 | 9/2007 | Sawyer, Jr. |
| 2007/0223803 A1 | 9/2007 | Shindo |
| 2007/0268110 A1 | 11/2007 | Litte |
| 2007/0286021 A1 | 12/2007 | Hoenmans et al. |
| 2007/0288195 A1 | 12/2007 | Waite et al. |
| 2008/0010009 A1 | 1/2008 | Miyoshi |
| 2008/0013940 A1 | 1/2008 | Jung |
| 2008/0021863 A1 | 1/2008 | Evans |
| 2008/0025614 A1 | 1/2008 | Hintz et al. |
| 2008/0125942 A1 | 5/2008 | Tucker et al. |
| 2008/0180322 A1 | 7/2008 | Islam |
| 2008/0204322 A1 | 8/2008 | Oswald et al. |
| 2008/0208415 A1 | 8/2008 | Vik |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0055719 A1 | 2/2009 | Cossins |
| 2009/0063258 A1 | 3/2009 | Mueller et al. |
| 2009/0085568 A1 | 4/2009 | Cole |
| 2009/0089015 A1 | 4/2009 | Bell et al. |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201311 A1 | 8/2009 | Nielsen et al. |
| 2009/0204238 A1 | 8/2009 | Nielsen et al. |
| 2009/0204466 A1 | 8/2009 | Nielsen et al. |
| 2009/0204625 A1* | 8/2009 | Chambers ............... G06Q 10/06 |

(56) References Cited

U.S. PATENT DOCUMENTS

| | | |
|---|---|---|
| 2009/0207019 A1 | 8/2009 | Nielsen et al. |
| 2009/0210245 A1 | 8/2009 | Wold |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0327024 A1 | 12/2009 | Nielsen et al. |
| 2010/0002365 A1 | 1/2010 | Mulcahey |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0088031 A1 | 4/2010 | Nielsen et al. |
| 2010/0088134 A1 | 4/2010 | Nielsen et al. |
| 2010/0088164 A1 | 4/2010 | Nielsen et al. |
| 2010/0090700 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205536 A1 | 8/2010 | Nielsen et al. |
| 2010/0207816 A1* | 8/2010 | Islam ............... G01C 15/00 342/357.29 |
| 2010/0211354 A1 | 8/2010 | Park et al. |
| 2010/0232103 A1 | 9/2010 | Chen |
| 2010/0245086 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0272885 A1* | 10/2010 | Olsson ............ B65D 83/203 427/137 |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0093306 A1 | 4/2011 | Nielsen et al. |
| 2011/0279229 A1 | 11/2011 | Tucker et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0233883 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0122149 A1 | 5/2014 | Nielsen et al. |
| 2014/0236656 A1 | 8/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |
| 2015/0149242 A1 | 5/2015 | Nielsen et al. |
| 2015/0170089 A1 | 6/2015 | Nielsen et al. |
| 2015/0193717 A1 | 7/2015 | Nielsen et al. |

FOREIGN PATENT DOCUMENTS

| | | |
|---|---|---|
| CA | 2623466 | 6/2011 |
| CH | 695087 A5 | 12/2005 |
| EP | 0636393 | 2/1995 |
| EP | 1521331 | 4/2005 |
| EP | 1852365 | 11/2007 |
| EP | 1974638 | 10/2008 |
| GB | 2266863 | 11/1993 |
| JP | 7256169 | 10/1994 |
| JP | 7128061 | 5/1995 |
| JP | 8050180 | 2/1996 |
| JP | 8285601 | 11/1996 |
| JP | 10060865 | 3/1998 |
| JP | 2000501666 | 2/2000 |
| JP | 2002079167 | 3/2002 |
| WO | WO9112119 | 8/1991 |
| WO | WO9424584 | 10/1994 |
| WO | WO9516827 | 6/1995 |
| WO | WO9629572 | 9/1996 |
| WO | WO9854600 | 12/1998 |
| WO | WO9854601 | 12/1998 |
| WO | WO9900679 | 1/1999 |
| WO | WO0194016 | 12/2001 |
| WO | WO0228541 | 4/2002 |
| WO | WO2004100044 | 11/2004 |
| WO | WO2004102242 | 11/2004 |
| WO | WO2005052627 | 6/2005 |
| WO | WO2006015310 | 2/2006 |
| WO | WO2006136776 | 12/2006 |
| WO | WO2006136777 | 12/2006 |
| WO | WO2007067898 | 6/2007 |
| WO | WO2008112461 | 9/2008 |

OTHER PUBLICATIONS

U.S. Appl. No. 14/556,422, filed Dec. 1, 2014, Nielsen et al.
U.S. Appl. No. 14/596,750, filed Jan. 14, 2015, Nielsen et al.
U.S. Appl. No. 14/627,571, filed Feb. 20, 2015, Nielsen et al.

(56) References Cited

OTHER PUBLICATIONS

Notice of Allowance dated Dec. 11, 2014 from U.S. Appl. No. 13/867,521.
Office Action dated Feb. 11, 2015 from U.S. Appl. No. 123/797,229.
Office Action dated Feb. 16, 2015 from GB Application No. GB1115448.1.
Office Action dated Oct. 17, 2014 from Canadian Application No. 2,822,869.
Office Action dated Dec. 2, 2014 from Japanese Application No. 2013-212885.
Office Action dated Dec. 5, 2014 from U.S. Appl. No. 12/786,929.
Office Action dated Dec. 22, 2014 from Canadian Application No. 2,771,286.
Supplemental Notice of Allowability dated Nov. 4, 2014 from U.S. Appl. No. 13/644,226.
Office Action dated Mar. 20, 2015 from Canadian Application No. 2,739,119.
Notice of Allowance dated Mar. 19, 2015 from U.S. Appl. No. 12/363,951.
Notice of Allowance dated Mar. 26, 2015 from U.S. Appl. No. 12/786,929.
Office Action dated Mar. 24, 2015 from Canadian Application No. 2,771,286.
Beach, Chris, "New White Lining Technologies Reduce Costs and Enhance Public Safety," CertusView Solutions, retrieved from [URL:http://www.excavationsafetyguide.com/guidePDFs/2010_2010_Page_07.pdf] on Jun. 18, 2015, 1 page.
Notice of Allowance dated Jun. 26, 2015 from U.S. Appl. No. 13/797,229.
Office Action dated Jun. 25, 2015 from U.S. Appl. No. 12/701,496.
Office Action dated Jun. 24, 2015 from U.S. Appl. No. 13/751,862.
Office Action dated Jul. 16, 2015 from U.S. Appl. No. 12/701,468.
Office Action dated Jul. 8, 2015 from U.S. Appl. No. 13/895,046.
Office Action dated Jul. 9, 2015 from U.S. Appl. No. 14/170,740.
U.S. Appl. No. 13/834,382, filed Mar. 15, 2013, Nielsen et al.
3M Dynatel, Brochure, 2006, 1-4.
3M Dynatel, Locating and Marking System, Brochure, 2007, 1-16.
Bearden, T., "New Identification Technology Raises Concerns over Privacy," PBS Online NewsHour Report, Aug. 17, 2006, pp. 1-5, http://www.pbs.org/newshour/bb/science/july-dec06/rfid_08-17.html.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL: http://fire.nist.gov/bfrlpubsibuild02IPDF/b02059.pdf>. p. 4, col. 2, para 2.
Carey, B., "Tracking Shoes," Chicago Tribune Online Edition, Jan. 29, 2007, pp. 1-3, http://www.chicagotribune.com/services/site/premium/access-registered.intercept.
Combined Search and Examination Report dated Oct. 24, 2013 from GB Application No. 1312313.8.
Complaint for Patent Infringement dated Apr. 10, 2013, *CertusView Technologies LLC v. United States Infrastructure Corporation et al.*, Case No. 2:13CV182, USDC Eastern District of Virginia.
Complaint for Patent Infringement dated May 28, 2013, *CertusView Technologies LLC v. S&N Locating Services, LLC et al.*, Case No. 1:13CV346, USDC Eastern District of Virginia.
Corrected Notice of Allowability dated May 10, 2013 from U.S. Appl. No. 12/797,227.
Corrected Notice of Allowability dated May 13, 2013 from U.S. Appl. No. 12/429,929.
Corrected Notice of Allowability dated May 14, 2013 from U.S. Appl. No. 12/797,202.
Corrected Notice of Allowability dated Jun. 4, 2013 from U.S. Appl. No. 12/797,243.
Corrected Notice of Allowability dated Nov. 22, 2013 from U.S. Appl. No. 12/797,211.
Corrected Notice of Allowability from U.S. Appl. No. 12/364,369 dated Apr. 15, 2013.
Corrected Notice of Allowability from U.S. Appl. No. 12/622,768 dated Apr. 3, 2013.
Corrected Notice of Allowability from U.S. Appl. No. 12/703,958 dated Apr. 18, 2013.
Corrected Notice of Allowability from U.S. Appl. No. 12/797,227 dated Apr. 17, 2013.
Decision of Final Rejection dated Apr. 24, 2013 from Japanese Application No. 2010-502170.
European Search Report and Opinion dated Nov. 28, 2013 from EP Application No. 10808689.3.
European Search Report dated Sep. 25, 2013 from European Application No. 13177282.4.
European Search Report, Application No. 08743671.3, Nov. 16, 2011.
European Search Report, Application No. 08743673.9, Feb. 28, 2011.
Examination Report dated May 28, 2014 for European Application No. 13177282.4.
Examination Report dated Sep. 4, 2013 from European Application No. 10732529.2.
Examination Reported dated Sep. 4, 2013 from GB Application No. GB1107165.1.
Fox, G. et al., "GPS Provides Quick, Accurate Data for Underground Utility Location," as featured in Apr. 2002 issue of Trenchless Technology, http://www.woolpert.com/asp/articles/GPS-Provides.asp, Sep. 14, 2007, pp. 1 and 2.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2010/000389, Jun. 2, 2010.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.
International Search Report and Written Opinion, Application No. PCT/US2008/55796, Oct. 14, 2008.
International Search Report and Written Opinion, Application No. PCT/US2008/55798, Jul. 28, 2008.
International Search Report and Written Opinion, Application No. PCT/US2009/003957, Mar. 21, 2011.
International Search Report and Written Opinion, Application No. PCT/US2009/005299, Dec. 22, 2009.
International Search Report and Written Opinion, Application No. PCT/US2009/005348, Mar. 2, 2010.
International Search Report and Written Opinion, Application No. PCT/US2009/005359, Feb. 8, 2010.
International Search Report and Written Opinion, Application No. PCT/US2010/036029, Sep. 3, 2010.
International Search Report and Written Opinion, Application No. PCT/US11/51616, dated Jan. 31, 2012.
International Search Report and Written Opinion, Application No. PCT/US2011/047807, Dec. 6, 2011.
Jung, H.G., Structure Analysis Based Parking Slot Marking Recognition for Semi-automatic Parking System, Springer-Verlag Berlin Heidelberg 2006, 10 pages.
Luczak, S., "Increasing Accuracy of Tilt Measurements," Engineering Mechanics, vol. 14, 2007, p. 143-154.
New Mexico's Recommended Marking Guidelines for Underground Utilities, May 2006, 8 pages.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jan. 8, 2013 from U.S. Appl. No. 12/797,243.
Notice of Allowance dated Jan. 22, 2013 from U.S. Appl. No. 12/703,958.
Notice of Allowance dated Jan. 24, 2012 from U.S. Appl. No. 12/363,951.

(56) References Cited

OTHER PUBLICATIONS

Notice of Allowance dated Feb. 1, 2013 from U.S. Appl. No. 12/797,202.
Notice of Allowance dated Feb. 13, 2013 from U.S. Appl. No. 12/701,447.
Notice of Allowance dated Feb. 20, 2013 from U.S. Appl. No. 12/364,369.
Notice of Allowance dated Feb. 26, 2014 from U.S. Appl. No. 12/797,262.
Notice of Allowance dated Feb. 26, 2014 from U.S. Appl. No. 13/686,262.
Notice of Allowance dated Mar. 9, 2012 from U.S. Appl. No. 12/236,688.
Notice of Allowance dated Mar. 28, 2013 from U.S. Appl. No. 12/797,227.
Notice of Allowance dated Apr. 25, 2013 from U.S. Appl. No. 12/364,359.
Notice of Allowance dated May 2, 2012 from U.S. Appl. No. 12/429,929.
Notice of Allowance dated May 10, 2013 from U.S. Appl. No. 12/797,243.
Notice of Allowance dated May 20, 2014 from U.S. Appl. No. 12/363,951.
Notice of Allowance dated Jun. 17, 2013 from Canadian Application No. 2,750,908.
Notice of Allowance dated Jul. 10, 2013 from U.S. Appl. No. 12/571,411.
Notice of Allowance dated Jul. 12, 2012 from U.S. Appl. No. 12/539,497.
Notice of Allowance dated Jul. 17, 2014 from U.S. Appl. No. 13/644,226.
Notice of Allowance dated Jul. 23, 2014 from U.S. Appl. No. 13/834,382.
Notice of Allowance dated Aug. 1, 2012 from U.S. Appl. No. 12/364,339.
Notice of Allowance dated Aug. 1, 2013 from U.S. Appl. No. 12/571,401.
Notice of Allowance dated Aug. 2, 2013 from U.S. Appl. No. 12/797,211.
Notice of Allowance dated Aug. 25, 2011 from U.S. Appl. No. 11/696,606.
Notice of Allowance dated Aug. 27, 2013 from U.S. Appl. No. 12/855,977.
Notice of Allowance dated Sep. 5, 2012 from U.S. Appl. No. 12/854,370.
Notice of Allowance dated Sep. 17, 2013 from U.S. Appl. No. 12/859,394.
Notice of Allowance dated Sep. 25, 2013 from U.S. Appl. No. 12/364,369.
Notice of Allowance dated Sep. 25, 2013 from U.S. Appl. No. 12/571,408.
Notice of Allowance dated Jan. 14, 2014 from U.S. Appl. No. 12/797,169.
Notice of Allowance dated Jan. 24, 2013 from U.S. Appl. No. 12/622,768.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.
Notice of Allowance dated Nov. 6, 2009 from U.S. Appl. No. 11/685,602.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.
Notice of Allowance dated Dec. 23, 2013 from U.S. Appl. No. 12/364,369.
Notice of Allowance dated Mar. 12, 2013 from U.S. Appl. No. 12/429,929.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,633.
Notice of Allowance dated Nov. 12, 2010 from U.S. Appl. No. 29/356,634.
Notice of Allowance dated Nov. 12, 2010 from U.S. Appl. No. 29/356,635.
Notice of Allowance dated Nov. 28, 2011 from Canadian Application No. 2,710,269.
Office Action dated Jan. 9, 2013 from U.S. Appl. No. 12/571,411.
Office Action dated Jan. 9, 2014 from Canadian Application No. 2,738,968.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 26, 2013 from Canadian Application No. 2,738,968.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 13, 2013 from Chinese Application No. 201080045879.1.
Office Action dated Mar. 20, 2012 from U.S. Appl. No. 12/764,164.
Office Action dated Mar. 20, 2013 from U.S. Appl. No. 12/764,164.
Office Action dated Mar. 25, 2013 from U.S. Appl. No. 12/797,211.
Office Action dated Mar. 25, 2014 from Canadian Application No. 2,771,286.
Office Action dated Mar. 28, 2013 from U.S. Appl. No. 12/571,408.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated Apr. 26, 2013 from U.S. Appl. No. 12/859,394.
Office Action dated May 1, 2012 from Australian Application No. 2009300362.
Office Action dated May 10, 2013 from U.S. Appl. No. 12/786,929.
Office Action dated May 15, 2012 from U.S. Appl. No. 12/797,243.
Office Action dated May 17, 2012 from U.S. Appl. No. 12/364,369.
Office Action dated May 24, 2011 from U.S. Appl. No. 12/363,951.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 10, 2014 from U.S. Appl. No. 12/701,468.
Office Action dated Jun. 13, 2012 from U.S. Appl. No. 12/639,373.
Office Action dated Jun. 16, 2010 from Canadian Application No. 2,691,707.
Office Action dated Jun. 17, 2013 from U.S. Appl. No. 12/797,262.
Office Action dated Jun. 18, 2012 from U.S. Appl. No. 12/701,468.
Office Action dated Jun. 18, 2012 from U.S. Appl. No. 12/701,496.
Office Action dated Jun. 26, 2014 from U.S. Appl. No. 12/701,496.
Office Action dated Jul. 2, 2012 from U.S. Appl. No. 12/797,262.
Office Action dated Jul. 7, 2014 from U.S. Appl. No. 13/867,521.
Office Action dated Jul. 8, 2014 from U.S. Appl. No. 12/568,087.
Office Action dated Jul. 10, 2014 from U.S. Appl. No. 12/786,929.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.

(56) References Cited

OTHER PUBLICATIONS

Office Action dated Jul. 29, 2014 from U.S. Appl. No. 13/846,120.
Office Action dated Aug. 7, 2013 from Canadian Application No. 2,739,119.
Office Action dated Aug. 7, 2013 from Canadian Application No. 2,739,320.
Office Action dated Aug. 15, 2012 from Australian Application No. 2010214104.
Office Action dated Aug. 29, 2012 from U.S. Appl. No. 12/701,447.
Office Action dated Sep. 4, 2012 from U.S. Appl. No. 12/622,768.
Office Action dated Sep. 9, 2013 from U.S. Appl. No. 13/867,521.
Office Action dated Sep. 21, 2012 from U.S. Appl. No. 12/797,202.
Office Action dated Sep. 25, 2012 from Australian Application No. 2010214053.
Office Action dated Sep. 25, 2013 from U.S. Appl. No. 13/686,262.
Office Action dated Sep. 26, 2011 from Canadian Application No. 2,739,119.
Office Action dated Sep. 26, 2011 from Canadian Application No. 2,739,320.
Office Action dated Oct. 2, 2012 from Japanese Application No. 2010-502170.
Office Action dated Oct. 4, 2011 from U.S. Appl. No. 12/364,359.
Office Action dated Oct. 15, 2012 from U.S. Appl. No. 12/797,227.
Office Action dated Oct. 18, 2013 from Chinese Application No. 201080045879.1 with English Translation.
Office Action dated Oct. 19, 2012 from U.S. Appl. No. 12/797,243.
Office Action dated Oct. 20, 2011 from U.S. Appl. No. 12/639,041.
Office Action dated Oct. 24, 2011 from U.S. Appl. No. 12/236,688.
Office Action dated Nov. 5, 2013 from U.S. Appl. No. 12/979,262.
Office Action dated Nov. 9, 2011 from U.S. Appl. No. 12/429,929.
Office Action dated Nov. 14, 2012 from Canadian Application No. 2,750,908.
Office Action dated Nov. 15, 2011 from Canadian Application No. 2,691,707.
Office Action dated Nov. 18, 2009 from Canadian Application No. 2,623,466, filed Mar. 4, 2008.
Office Action dated Nov. 20, 2012 from U.S. Appl. No. 12/701,468.
Office Action dated Nov. 21, 2012 from U.S. Appl. No. 12/701,496.
Office Action dated Nov. 23, 2009 from Canadian Application No. 2,623,761, filed Mar. 4, 2008.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Office Action dated Dec. 28, 2012 from U.S. Appl. No. 12/364,359.
Office Action dated Dec. 30, 2011 from U.S. Appl. No. 12/701,447.
Office Action dated Dec. 30, 2013 from U.S. Appl. No. 13/834,382.
Office Action dated Apr. 28, 2009 from U.S. Appl. No. 11/685,602.
Office Action dated Jul. 20, 2010 from U.S. Appl. No. 11/696,606.
Office Action dated Sep. 17, 2009 from U.S. Appl. No. 11/685,602.
Office Action dated Jul. 11, 2011 from Canadian Application No. 2713282.
Office Action dated Jun. 28, 2011 from Canadian Application No. 2710269.
Office Action dated Mar. 3, 2011 from Australian Application No. 2008226627.
Office Action dated Mar. 9, 2011 from Australian Application No. 2008236526.
Office Action dated Oct. 6, 2010 from Canadian Application No. 2623761.
Office Action from Japanese Application No. 2009-553688.
Olsson, Office Action dated Sep. 13, 2012 from U.S. Appl. No. 12/827,993.
Patent Examination Report dated Aug. 13, 2014 from Australian Application No. 20100282559.
Patent Examination Report No. 1 dated Jan. 24, 2014 from Australian Application No. 2012227240.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Supplemental Notice of Allowability dated Jul. 21, 2014 from U.S. Appl. No. 13/363,951.
Supplemental Notice of Allowability dated Aug. 1, 2013 from U.S. Appl. No. 12/571,411.
Supplementary European Search Report dated Nov. 7, 2013 from EP Application No. 10810421.7.
Trimble Navigation Limited, "H-Star Technology Explained," pp. 1-9, 2005, www.trimble.com.
Virginia Underground utility marking standard, Mar. 2004, 20 pages.
Corrected Notice of Allowabilitiy dated Nov. 4, 2014 from U.S. Appl. No. 12/818,382.
Patent Examination Report dated Sep. 8, 2014 from Australian Application No. 2013200160.
Corrected Notice of Allowability dated Sep. 17, 2014 from U.S. Appl. No. 13/834,382.
Office Action dated Jul. 25, 2014 from Taiwan Patent Application No. 097108911.
Office Action dated Aug. 12, 2014 from Japanese Patent Application No. 2013-185570.
Office Action dated Sep. 24, 2014 from U.S. Appl. No. 12/701,468.
Notice of Allowance dated Oct. 16, 2014 from U.S. Appl. No. 12/568,087.
Notice of Allowance dated Sep. 12, 2014 from U.S. Appl. No. 13/644,226.
Corrected Notice of Allowability dated Oct. 10, 2014 from U.S. Appl. No. 13/834,382.
Office Action dated Aug. 21, 2014 from Taiwan Application No. 097108912.
Office Action dated Oct. 6, 2014 from U.S. Appl. No. 12/701,496.
Notice of Allowance dated Oct. 7, 2014 from U.S. Appl. No. 13/867,521.

* cited by examiner

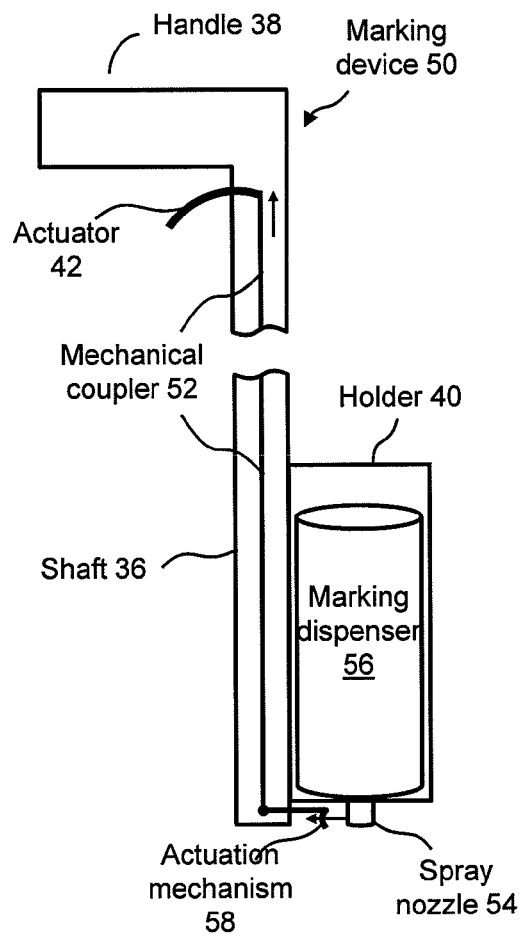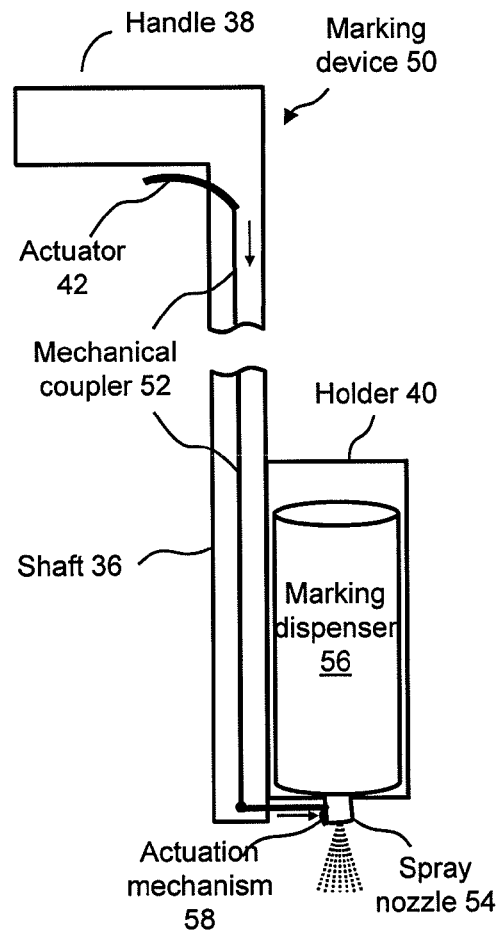
FIG. 1A
(Prior Art)
FIG. 1B
(Prior Art)

METHODS AND APPARATUS FOR GENERATING OUTPUT DATA STREAMS RELATING TO UNDERGROUND UTILITY MARKING OPERATIONS

CROSS-REFERENCES TO RELATED APPLICATIONS

This application claims a priority benefit, under 35 U.S.C. §120, as a continuation (CON) of U.S. Non-provisional application Ser. No. 12/622,768, entitled "METHODS AND APPARATUS FOR GENERATING AN ELECTRONIC RECORD OF A MARKING OPERATION INCLUDING SERVICE-RELATED INFORMATION AND/OR TICKET INFORMATION," filed on Nov. 20, 2009.

U.S. patent application Ser. No. 12/622,768 claims a priority benefit, under 35 U.S.C. §120, as a continuation (CON) of U.S. Non-provisional application Ser. No. 12/539,497, entitled "Methods and Apparatus for Generating an Electronic Record of a Marking Operation based on Marking Device Actuations," filed on Aug. 11, 2009, and issued as U.S. Pat. No. 8,280,631 on Oct. 2, 2012.

U.S. patent application Ser. No. 12/539,497 claims the benefit, under 35 U.S.C. §119(e), of U.S. Provisional Application Ser. No. 61/102,151, entitled "Data acquisition system for and method of analyzing marking operations based on marking device actuations," filed on Oct. 2, 2008.

Each of the above-identified applications is hereby incorporated herein by reference in its entirety.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

A locate operation typically is initiated as a result of an excavator providing an excavation notice to a one-call center. An excavation notice also is commonly referred to as a "locate request," and may be provided by the excavator to the one-call center via an electronic mail message, information entry via a website maintained by the one-call center, or a telephone conversation between the excavator and a human operator at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps." Facilities maps typically are maintained by facilities owners/ members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner of an underground facility that falls within a given polygon), and may also include various other information relevant to the proposed excavation or design (e.g., the name of the excavation company, a name of a property owner or party contracting the excavation company to perform the excavation, etc.). The one-call center sends the ticket to one or more underground facility owners and/or one or more locate service providers (who may be acting as contracted agents of the facility owners) so that they can conduct a locate and marking operation to verify a presence or absence of the underground facilities in the dig area. For example, in some instances, a given underground facility owner may operate its own fleet of locate technicians, in which case the one-call center may send the ticket to the underground facility owner. In other instances, a given facility owner may contract with a locate service provider to receive locate request tickets and perform a locate and marking operation in response to received tickets on their behalf.

More specifically, upon receiving the locate request, a locate service provider or a facility owner (hereafter referred to as a "ticket recipient") may dispatch a locate technician to the work site of planned excavation to determine a presence or absence of one or more underground facilities in the dig area to be excavated or otherwise disturbed. A first step for the locate technician includes utilizing an underground facility "locate device," which is an instrument for detecting facilities that are concealed in some manner, such as cables and pipes that are located underground, to verify the presence or absence of underground facilities indicated in the locate request ticket as potentially present in the dig area (e.g., via the facility owner member codes listed in the ticket). An underground facility locate device is used to detect electromagnetic fields that are generated by a "test" signal provided along a length of a target facility to be identified. Locate devices typically include both a signal transmitter to provide the test signal (e.g., which is applied by the locate technician to a tracer wire disposed along a length of a facility), and a signal receiver which is generally a hand-held apparatus carried by the locate technician as the technician walks around the dig area to search for underground facilities. The signal receiver indicates a presence of a facility when it detects electromagnetic fields arising from the test signal. Conversely, the absence of a signal detected by the receiver of the locate device generally indicates the absence of the target facility.

Subsequently, the locate technician then generally marks the presence (and in some cases the absence) of a given underground facility in the dig area based on the various signals detected (or not detected) using the locate device. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 1A and 1B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/ walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 1A and 1B, the mechanical actuation system of the marking device 50 includes an actuator or mechanical trigger 42 proximate to the handle 38 that is actuated/ triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 1A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 1B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 1A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

Previous efforts at documenting locate operations have focused primarily on locate devices that employ electromagnetic fields to determine the presence of an underground facility. For example, U.S. Pat. No. 5,576,973, naming inventor Alan Haddy and entitled "Apparatus and Method for Obtaining Geographical Positional Data for an Object Located Underground" (hereafter "Haddy"), is directed to a locate device (i.e., a "locator") that receives and stores data from a global positioning system ("GPS") to identify the position of the locate device as an underground object (e.g., a cable) is detected by the locate device. Haddy notes that by recording geographical position data relating to the detected underground object, there is no need to physically mark the location of the underground object on the ground surface, and the recorded position data may be used in the future to re-locate the underground object.

Similarly, U.S. Pat. No. 7,319,387, naming inventors Willson et al. and entitled "GPS Interface for Locating Device" (hereafter "Willson"), is directed to a locate device for locating "position markers," i.e., passive antennas that reflect back RF signals and which are installed along buried utilities. In Willson, a GPS device may be communicatively coupled to the locate device, or alternatively provided as an integral part of the locate device, to store GPS coordinate data associated with position markers detected by the locate device. Electronic memory is provided in the locate device for storing a data record of the GPS coordinate data, and the data record may be uploaded to a remote computer and used to update a mapping database for utilities.

U.S. Publication No. 2006/0282280, naming inventors Stotz et al. and entitled "Ticket and Data Management" (hereafter "Stotz"), also is directed to a locate device (i.e., a "locator") including a GPS receiver. Upon detection of the presence of a utility line, Stotz' locate device can update ticket data with GPS coordinates for the detected utility line. Once the locate device has updated the ticket data, the reconfigured ticket data may be transmitted to a network.

U.S. Publication No. 2007/0219722, naming inventors Sawyer, Jr. et al. and entitled "System and Method for Collecting and Updating Geographical Data" (hereafter "Sawyer"), is directed to collecting and recording data representative of the location and characteristics of utilities and infrastructure in the field for creating a grid or map. Sawyer employs a field data collection unit including a "locating pole" that is placed on top of or next to a utility to be identified and added to the grid or map. The locating pole includes an antenna coupled to a location determination system, such as a GPS unit, to provide longitudinal and latitudinal coordinates of the utility under or next to the end of the locating pole. The data gathered by the field data collection unit is sent to a server to provide a permanent record that may be used for damage prevention and asset management operations.

SUMMARY

Applicants have recognized and appreciated that uncertainties which may be attendant to locate and marking operations may be significantly reduced by collecting various information particularly relating to the marking operation, rather than merely focusing on information relating to detection of underground facilities via a locate device. In many instances, excavators arriving to a work site have only physical locate marks on which to rely to indicate a presence or absence of underground facilities, and they are not generally privy to information that may have been collected previously during the locate operation. Accordingly, the integrity and accuracy of the physical locate marks applied during a marking operation arguably is significantly more important in connection with reducing risk of damage and/or injury during excavation than the location of where an underground facility was detected via a locate device during a locate operation.

More specifically, Applicants have recognized and appreciated that conventional techniques for using a locate device to detect underground facilities are sometimes tentative and typically iterative in nature, and use of locate devices with GPS capabilities may result in redundant, spurious and/or incomplete geographic location data collected by such devices. For example, during a typical locate operation, a technician attempting to locate an underground facility with a locate device often needs to sweep an appreciable area around a suspected underground facility, and make multiple passes with the locate device over the underground facility to obtain meaningful detection signals. Furthermore, the technician often needs to rely significantly on visual observations of the area, including relevant landmarks such as facility connections to buildings, transformer boxes, maintenance/public access points, curbs, sidewalks, roadways, etc., to effectively deduce a sensible path of an underground facility to be located. The foregoing is particularly true if at some point during the locate operation the technician loses a signal from an underground facility in the process of being detected (e.g., due to a broken transmitter circuit path from a damaged tracer wire, and loss of the transmitter test signal). In view of the foregoing, it may be readily appreciated that collecting and logging geographic location information throughout this process may result in excessive and/or imprecise data, or in some instances incomplete relevant data (e.g., in the case of signal loss/broken tracer wire), from which it may be difficult to cull the data that is truly complete and representative of where the underground facility ultimately was detected.

Furthermore, Applicants have recognized and appreciated that the location at which an underground facility ultimately is detected during a locate operation is not always where the technician physically marks the ground, pavement or other surface during a marking operation; in fact, technician imprecision or negligence may in some instances result in significant discrepancies between detected location and physical locate marks. Accordingly, having documentation (e.g., an electronic record) of where physical locate marks were actually dispensed (i.e., what an excavator encounters when arriving to a work site) is notably more relevant to the assessment of liability in the event of damage and/or injury than where an underground facility was detected prior to marking.

Examples of marking devices configured to collect some types of information relating specifically to marking operations are provided in U.S. publication no. 2008-0228294-A1, published Sep. 18, 2008, filed Mar. 13, 2007, and entitled "Marking System and Method With Location and/or Time Tracking," and U.S. publication no. 2008-0245299-A1, published Oct. 9, 2008, filed Apr. 4, 2007, and entitled "Marking System and Method," both of which publications are incorporated herein by reference. These publications describe, amongst other things, collecting information relating to the geographic location, time, and/or characteristics (e.g., color/type) of dispensed marking material from a marking device and generating an electronic record based on this collected information. Applicants have recognized and appreciated that collecting information relating to both geographic location and color of dispensed marking material provides for automated correlation of geographic information for a locate mark to facility type (e.g., red=electric power lines and cables; blue=potable water; orange=telecommunication lines; yellow=gas, oil, steam); in contrast, in conventional locate devices equipped with GPS capabilities as discussed above, there is no apparent automated provision for readily linking GPS information for a detected facility to the type of facility detected. Applicants have further appreciated that building a more comprehensive electronic record of information relating to marking operations further facilitates ensuring the accuracy of such operations.

In view of the foregoing, various inventive embodiments disclosed herein relate generally to methods and apparatus for collecting, logging (electronically storing), formatting, processing, and/or electronically analyzing a variety of information relating to marking operations. More specifically, some exemplary embodiments described herein are directed to methods and apparatus for acquiring information relating to a marking operation (i.e., dispensing of a marking material so as to mark a presence or absence of an underground facility), generating a comprehensive electronic record of the marking operation including data relating to one or more actuations of a marking device to dispense a marking material, and storing and/or transmitting the electronic record for subsequent access, processing and/or analysis.

For example, in some implementations of the methods and apparatus described herein, when a locate technician actuates (triggers) a marking device to dispense marking material, control electronics in the marking device may collect and store information from various devices (also referred to herein generally as "input devices") included in the marking device (e.g., a location sensor or tracking system to provide geographic information about where the material is dispensed, a time sensor or timing system to provide timing information about when the material is dispensed, a marking material detection mechanism to provide information about one or more characteristics of material dispensed, etc.). Information may be collected at a start of a given actuation, at one or more times during the actuation, and/or at the end of the actuation, and for successive actuations. In some cases, information relating to the marking operation may be collected or otherwise available before or after a given actuation or a succession of multiple actuations, as an alternative to or in addition to information collected during one or more actuations.

Further, in some embodiments of the invention disclosed herein, one or more input devices of a marking apparatus may include a communication interface (e.g., network interface) and/or a user interface, and information received from the interface(s) may include or be related to a locate request ticket, in response to which the locate and marking operation is being performed (i.e., "ticket information"). This ticket information may include, for example, a one-call center ticket number, a street address or other geographic location of the work site, a description of the dig area, and/or an indication of one or more facilities to be marked in the dig area (e.g., via facility owner member codes). Examples of additional and/or other information that may be received via a user interface associated with the marking device may include "service-related information," e.g., one or more identifiers for the locate technician carrying out the locate and marking operation, one or more identifiers for equipment used by the technician, and/or one or more identifiers for an employer of the technician.

Accordingly, for purposes of the present disclosure, "marking information" refers generally to any of the various types of information relating to a marking operation including for example, but not limited to, service-related information, ticket information, time information, geographic location information, and marking material information, alone or in various combinations with each other.

In various embodiments discussed herein, marking information collected in response to actuation of the marking device, and/or otherwise generally associated with the locate and marking operation, may be logged in (entered into) an electronic record of the marking operation, and such an electronic record may be stored in memory of the marking device, particularly formatted, processed and/or analyzed at the marking device itself, and/or transmitted to another device for storage, formatting, processing and/or analysis.

During and/or following collection and/or storage of information regarding the marking operation, data compiled in one or more electronic records associated with the marking operation may be accessed, processed and/or analyzed to provide further information relating to the performance of the marking operation. For example, in other embodiments disclosed herein, data from one or more electronic records of the marking operation is processed so as to electronically render (visually recreate) the marking operation (e.g., on a display device associated with the marking device or other display device).

In one such exemplary implementation, lines, dots or other indicators are displayed in relative positions on a display screen (e.g., at an appropriate scale based on an available display field) and represent respective actuations of the marking device (and corresponding physical locate marks created on a ground, pavement or other surface). In one aspect of this implementation, multiple different underground facilities that may have been located and marked during a locate and marking operation may be electronically rendered based on the information contained in one or more electronic records to provide a composite visual representation in the available display field (e.g., in which different marked underground facilities are displayed in different line-types and/or different colors).

In other aspects, electronic renderings may be generated statically (e.g., in which all available data in an electronic record is rendered essentially simultaneously on an available display field) or in an "animated" time-sequenced recreation of the marking operation (e.g., based on at least timing and geographic location information in the electronic record) once an electronic record is generated. In yet another exemplary implementation, various information to be logged in an electronic record may be passed/transmitted in essentially real-time to one or more display devices to facilitate an essentially real-time electronic rendering on an available display field of a marking operation in process.

In sum, one embodiment of the present invention is directed to an apparatus for generating an electronic record of a marking operation to mark on ground, pavement, or other surface a presence or an absence of at least one underground facility. The apparatus comprises an actuator to dispense a marking material so as to form at least one locate mark on the ground, pavement or other surface to mark the presence or the absence of the at least one underground facility, at least one input device to provide marking information regarding the marking operation, and a memory to store processor-executable instructions and the electronic record of the marking operation. The apparatus further comprises a processor coupled to the memory, the at least one input device, and the actuator. Upon execution of the processor-executable instructions by the processor, the processor logs in the electronic record an actuation data set including a plurality of actuation event entries for at least one actuation of the actuator, wherein at least one actuation event entry includes at least some of the marking information provided by the at least one input device.

Another embodiment is directed to a method for generating an electronic record of a marking operation to mark on ground, pavement, or other surface a presence or an absence of at least one underground facility. The method comprises: A) effecting at least one actuation of an actuator of a marking apparatus to dispense a marking material so as to form at least one locate mark on the ground, pavement or other surface to mark the presence or the absence of the at least one underground facility; B) providing marking information regarding the marking operation; and C) logging into an electronic record an actuation data set including a plurality of actuation event entries for the at least one actuation of the actuator in A), wherein at least one actuation event entry includes at least some of the marking information provided in B).

Another embodiment is directed to an apparatus for generating an electronic record of a marking operation to mark on ground, pavement, or other surface a presence or an absence of at least one underground facility. The apparatus comprises an actuator to dispense a marking material so as to form at least one locate mark on the ground, pavement or other surface to mark the presence or the absence of the at least one underground facility, at least one input device to provide marking information regarding the marking operation, wherein the marking information includes at least one of service-related information and ticket information, and a memory to store processor-executable instructions and the electronic record of the marking operation. The apparatus further comprises a processor coupled to the memory, the at least one input device, and the actuator. Upon execution of the processor-executable instructions by the processor, the processor logs in the electronic record actuation data for at least one actuation of the actuator, and wherein the processor further logs in the electronic record at least some of the service-related information and/or at least some of the ticket information provided by the at least one input device.

Another embodiment is directed to a method for generating an electronic record of a marking operation to mark on ground, pavement, or other surface a presence or an absence of at least one underground facility. The method comprises: A) effecting at least one actuation of an actuator of a marking apparatus to dispense a marking material so as to form at least one locate mark on the ground, pavement or other surface to mark the presence or the absence of the at least one underground facility; B) providing marking information regarding the marking operation, wherein the marking information includes at least one of service-related information and ticket information; C) logging into an electronic record actuation data for the at least one actuation of the actuator in A); and D) logging into the electronic record at least some of the service-related information and/or at least some of the ticket information provided in B).

Another embodiment is directed to a method for providing an electronic rendering on a display device of a marking operation to mark on ground, pavement, or other surface a presence or an absence of at least one underground facility. The method comprises: A) accessing an electronic record of the marking operation generated by a marking device, the electronic record comprising a plurality of actuation data sets, each actuation data set associated with a corresponding locate mark created by an actuation of the marking device, wherein each actuation data set comprises at least two pieces of geographic information for the corresponding locate mark; and B) for each actuation data set of the electronic record, displaying on the display device at least one electronic locate mark so as to provide the electronic rendering of the marking operation, based at least in part on the at least two pieces of geographic information for the corresponding locate mark.

Another embodiment is directed to a method for providing an electronic rendering on a display device of a marking operation to mark on ground, pavement, or other surface a presence or an absence of at least one underground facility. The method comprises: A) accessing an electronic record of the marking operation generated by a marking device, the electronic record comprising a plurality of actuation data sets, each actuation data set associated with a corresponding locate mark created by an actuation of the marking device, wherein each actuation data set comprises at least two pieces of geographic information for the corresponding locate mark; B) displaying, on the display device, a digital image representative of at least a portion of an area of the ground, pavement, or other surface on which the locate mark is created; and C) for at least some actuation data sets of the electronic record, displaying on the display device at least one electronic locate mark overlaid on the displayed digital image so as to provide the electronic rendering of the marking operation, based at least in part on the at least two pieces of geographic information for the corresponding locate mark and on the displayed digital image.

Another embodiment is directed to at least one computer-readable storage medium storing an electronic record of a marking operation, the electronic record comprising a plurality of actuation data sets, each actuation data set associated with a corresponding actuation of a marking device to dispense a marking material during the marking operation, wherein at least one first actuation data set of the electronic record corresponds to a first actuation. The at least one first actuation data set comprises: a first field including a first piece of geographic information for the first actuation; and at least one second field including at least one second piece of geographic information for the first actuation. In one aspect, the at least one computer-readable storage medium is combined with at least one processor to form a machine, wherein the at least one computer-readable storage medium further stores processor-executable instructions, and wherein the processor, upon execution of the processor-executable instructions, accesses at least one of the first field and the at least one second field of the at least one first actuation data set. In another aspect, upon execution of the processor-executable instructions by the processor, for the at least one first actuation data set, the at least one processor displays on a display device at least one electronic locate mark so as to provide an electronic rendering of the marking operation, based at least in part on the first piece and the at least one second piece of geographic information for the first actuation.

Another embodiment is directed to a marking apparatus to perform a marking operation. The marking apparatus comprises an actuation system, a memory to store processor-executable instructions, and a processor coupled to the memory and the actuation system. Upon execution of the processor-executable instructions by the processor, the processor provides an output stream of data packets, each data packet including at least one flag field that is set or reset upon at least one actuation of the actuation system.

Another embodiment is directed to a method for providing information relating to a marking operation to mark on ground, pavement, or other surface a presence or an absence of at least one underground facility. The method comprises: A) effecting at least one actuation of an actuation system of a marking apparatus to dispense a marking material so as to form at least one locate mark on the ground, pavement or other surface to mark the presence or the absence of at least one underground facility; and B) providing an output stream of data packets, each data packet including at least one flag field that is set or reset upon the at least one actuation of the at least one actuation system.

For purposes of the present disclosure, the term "dig area" refers to a specified area of a work site within in which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility.

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory.

The terms "locate and marking operation," "locate operation," and "locate" are used interchangeably and refer to any activity to detect, infer, and/or mark the presence or absence of an underground facility. In some instances, the term "marking operation" is used to more specifically refer to that portion of a locate operation in which a marking material and/or one or more marking objects is/are employed to mark a presence or an absence of one or more underground facilities. The term "locate technician" refers to an individual performing a locate operation. A locate operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The term "complex event processing (CEP)" refers to a software and/or hardware-implemented (e.g., facilitated by a computer system, distributed computer system, computational analysis coded in software, and/or a combination thereof) technique relating to recognizing one or more events, patterns of events, or the absence of an event or pattern of events, within one or more input streams of information and performing one or more actions and/or computations in response to such recognition, in accordance with specified rules, criteria, algorithms, or logic. CEP generally involves detection of relationships between information contained in input streams (which input streams may include indications of previously recognized events), such as causality, membership, timing, event-driven processes, detection of complex patterns of one or more events, event streams processing, event correlation and abstraction, and/or event hierarchies. CEP may complement and contribute to technologies such as, but not limited to, service oriented architecture (SOA), event driven architecture (EDA), and/or business process management (BPM). CEP allows the information contained in the events flowing through all of the layers of a service business, an enterprise information technology infrastructure and/or management operation to be discovered, analyzed, and understood in terms of its impact on management goals and business processes, and acted upon in real time or as a management process.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

FIGS. 1A and 1B illustrate a conventional marking device in an actuated and non-actuated state, respectively;

DETAILED DESCRIPTION

Figure 2:
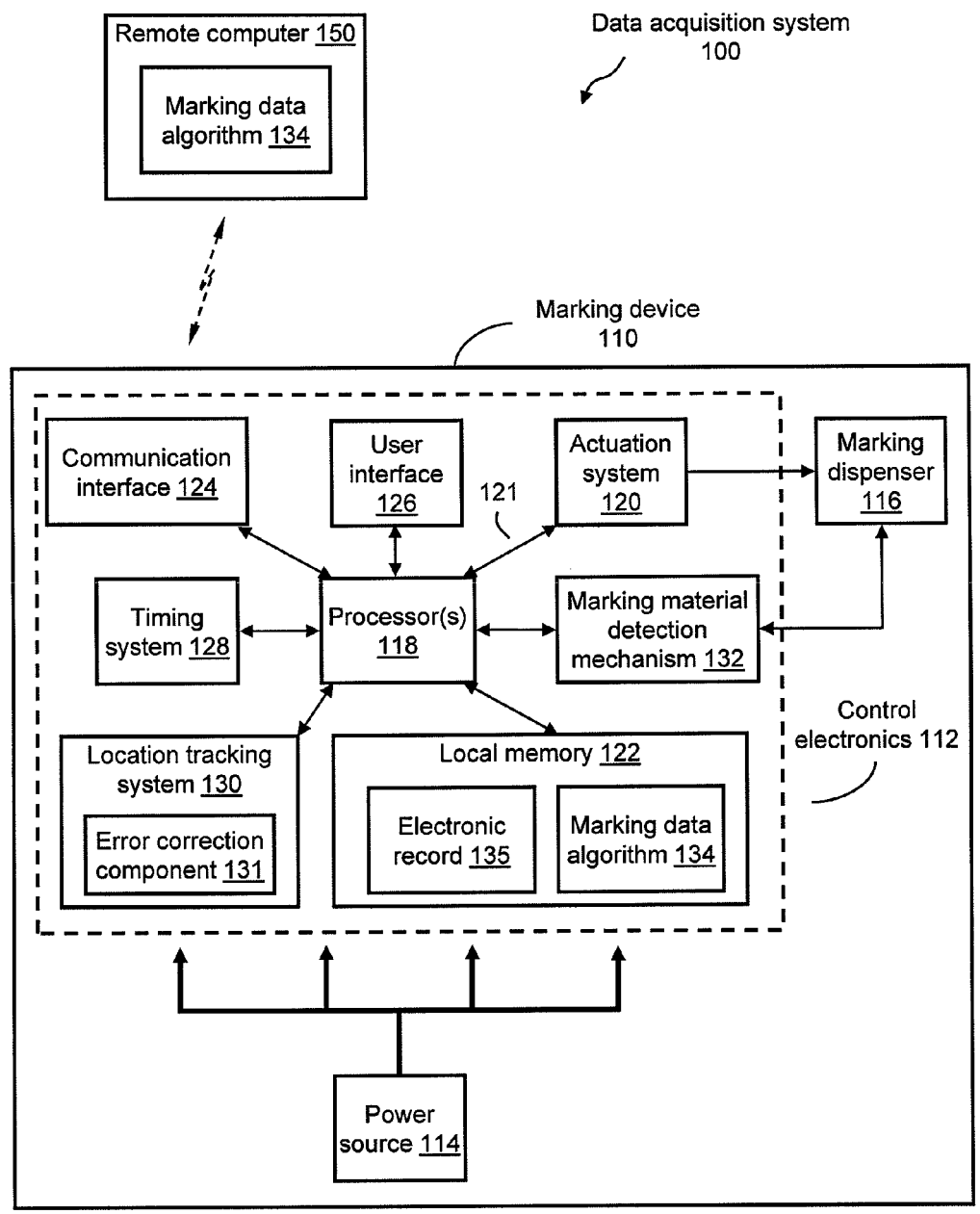
FIG. 2 is a functional block diagram of a data acquisition system according to one embodiment of the present invention for creating electronic records of marking operations based on actuations of a marking device.

Following below are more detailed descriptions of various concepts related to, and embodiments of, inventive systems, methods and apparatus for generating electronic records of marking operations based on marking device actuations. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

I. Overview

In some embodiments of the present invention, a marking device employed by a locate technician to dispense marking material is particularly configured to acquire "marking information" relating to a marking operation based at least in part on actuations of the marking device, and create an electronic record of at least some of the marking information. As discussed in greater detail below, examples of marking information relating to the marking operation that may be logged into an electronic record may include, but are not limited to:

timing information (e.g., one or more time stamps) associated with one or more actuations of the marking device and/or one or more events occurring during a given actuation;

geographic information (e.g., one or more geographic coordinates) associated with one or more actuations of the marking device (in some instances, the geographic information may be accompanied by timing information, such as a time stamp, for each acquisition of geographic information);

marking material information: one or more aspects/characteristics of a marking material (e.g., a color, brand, type, serial number, UPC code, weight, inventory information, etc. associated with the marking material) dispensed in response to one or more actuations of the marking device;

service-related information: one or more identifiers for the locate technician performing the marking operation, the marking device itself (e.g., a serial number of the marking device), and/or the locate contractor dispatching the locate technician; and ticket information: information relating to one or more facilities to be marked, location information (e.g., an address, geo-coordinates, and/or text description) relating to the work site and/or dig area in which the locate and marking operation is performed, excavator information, etc.

One or more electronic records based on the marking information may be generated, logged/stored in local memory of the marking device, formatted in any of a variety of manners, processed and/or analyzed at the marking device itself, and/or transmitted to another device (e.g., a computer) for storage, processing and/or analysis.

In various implementations of the methods and apparatus described herein, data from one or more electronic records, including multiple pieces of geographical location information (geo-location data), time and date information, and duration, as well as a total number of actuations, characteristics of the marking material (e.g., color, brand, type) dispensed during the actuations, and the like, may be processed and analyzed to provide insight into the marking operation. In one embodiment, a computer-generated image or other visual representation of the marking operation may be electronically rendered; for example, this visual representation may provide electronic indications ("electronic locate marks") of the relative placement of marking material dispensed during a marking operation, and electronic locate marks corresponding to different types of facilities may be color-coded. Such a visual representation of the marking operation may be used, for example, to provide immediate feedback to the locate technician (e.g., via a display device associated with the marking device), provide essentially real-time feedback to a supervisor monitoring the marking operation from a remote location, provide a visual record of the marking operation (e.g., for archiving purposes, once the marking operation is completed and one or more electronic records are generated), and/or to verify the quality (e.g., accuracy and completeness) of work performed during the locate and marking operation.

II. Marking Device

Figure 3:
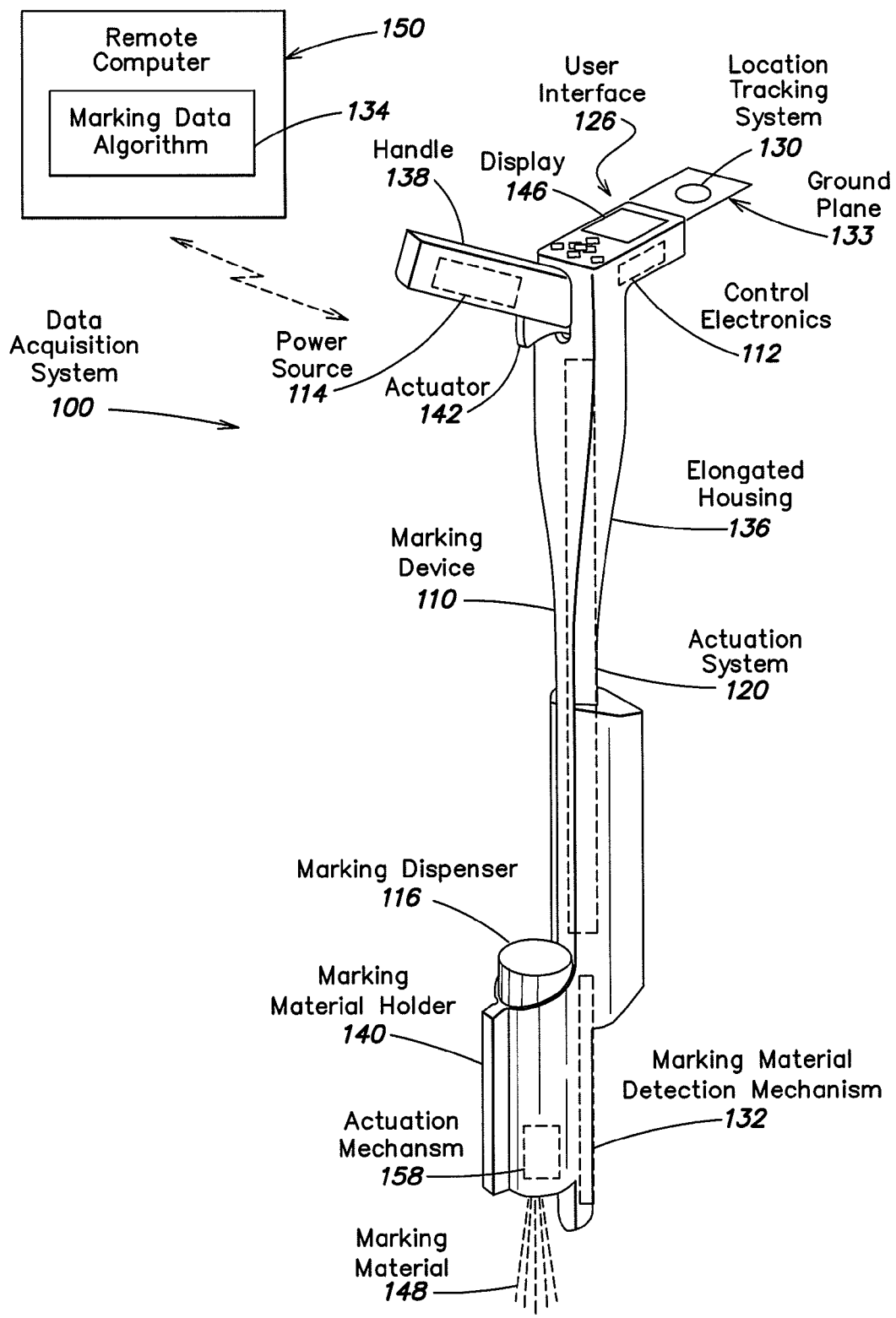
FIG. 3 is a perspective view of the data acquisition system of FIG. 2, illustrating an exemplary marking device according to one embodiment of the present invention.

FIGS. 2 and 3 illustrate a functional block diagram and perspective view, respectively, of one example of a data acquisition system 100, including a marking device 110 and optionally a remote computer 150, according to one embodiment of the present invention. One or both of the marking device 110 and the remote computer 150 of the data acquisition system 100 may be configured to sense one or more actuations of the marking device 110 (e.g., to dispense marking material during a marking operation), and collect information based on one or more actuations of the marking device so as to generate an electronic record.

As shown in FIG. 2, in one embodiment marking device 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

The marking device 110 is configured to hold a marking dispenser 116, which as shown in FIG. 3 is loaded into a marking material holder 140 of the marking device 110. In one exemplary implementation, the marking dispenser 116 is an aerosol paint canister that contains paint; however, it should be appreciated that the present invention is not limited in this respect, as a marking material dispensed by the marking device 110 may be any material, substance, compound, and/or element, used to mark, signify, and/or indicate. Examples of marking materials may include, but are not limited to, paint, chalk, dye, and/or marking powder.

As also shown in FIG. 2, in one embodiment control electronics 112 of marking device 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive). As discussed further below, the local memory may store a marking data algorithm 134, which may be a set of processor-executable instructions that when executed by the processor 118 causes the processor to control various other components of the marking device 110 so as to generate an electronic record 135 of a marking operation, which record also may be stored in the local memory 122 and/or transmitted in essentially real-time (as it is being generated) or after completion of a marking operation to a remote device (e.g., remote computer 150).

In one exemplary implementation, a Linux-based processing system for embedded handheld and/or wireless devices may be employed in the marking device 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the marking device), supports a variety of wired and wireless interfaces (WiFi, Bluetooth, GPS, Ethernet) to facilitate implementation of the communication interface 124, and connects to a wide variety of LCD displays (to facilitate implementation of a user interface/display).

Communication interface 124 of marking device 110 may be any wired and/or wireless communication interface by which information may be exchanged between marking device 110 and an external or remote device, such as a remote computing device that is elsewhere in the dig area (i.e., not a part of the marking device 110) or outside the dig area. For example, data that is provided by components of data acquisition system 100 and/or stored in local memory 122 (e.g., one or more electronic records 135) may be transmitted via communication interface 124 to a remote computer, such as remote computer 150, for processing. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of marking device 110 may be any mechanism or combination of mechanisms by which a user may operate data acquisition system 100 and by which information that is generated by data acquisition system 100 may be presented to the user. For example, user interface 126 may include, but is not limited to, a display device (including integrated displays and external displays, such as Heads-Up Displays (HUDs)), a touch screen, one or more manual pushbuttons, one or more light-emitting diode (LED) indicators, one or more toggle switches, a keypad, an audio output (e.g., speaker, buzzer, and alarm), and any combination thereof. In one implementation, the user interface 126 includes a "menu/on" button to power up the marking device and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display information relating to a placement of marking material in a dig area, a location of an underground facility in a dig area, or any other suitable information that may be displayed based on information acquired to create an electronic record 135.

In various embodiments, the one or more interfaces of the marking device 110—including the communication interface 124 and user interface 126—may be used as input devices to receive information to be stored in the memory 122 as part of an electronic record of a marking operation. In some cases, marking information received via the interface(s) (e.g., via the communication interface 124) may include ticket information regarding underground facilities to be marked during a marking operation. As another example, using an interface such as the user interface 126, service-related information may be input, including an identifier for the marking device used by the technician, an identifier for a technician, and/or an identifier for the technician's employer. Alternatively, some or all of the service-related information similarly may be received via the communication interface 124 (and likewise some or all of the ticket information may be received via the user interface 126).

The actuation system 120 of marking device 110 shown in the block diagram of FIG. 2 may include both electrical and mechanical elements according to various embodiments discussed in further detail below, and for purposes of illustration is shown in FIG. 2 as included as part of the control electronics 112. The actuation system 120 may include a mechanical and/or electrical actuator mechanism (e.g., see the actuator 142 shown in FIG. 3) to provide one or more signals or stimuli as an input to the actuation system 120. Upon receiving one or more signals or stimuli (e.g., actuation/triggering by a locate technician or other user), the actuation system 120 causes marking material to be dispensed from marking dispenser 116. In various embodiments, the actuation system 120 may employ any of a variety of mechanical and/or electrical techniques (e.g., one or more switches or other circuit components, a dedicated processor or the processor 118 executing instructions, one or more mechanical elements, various types of transmitters and receivers, or any combination of the foregoing), as would be readily appreciated by those of skill in the relevant arts, to cause the marking dispenser 116 to dispense marking material in response to one or more signals or stimuli. The actuation system 120 also provides one or more output signals in the form of an actuation signal 121 to the processor 118 to indicate one or more actuations of the marking device, in response to which the processor 118 may acquire/collect various marking information and log data into the electronic record 135. Additional details of exemplary actuation system implementations are provided below in connection with FIGS. 3 through 5.

In some embodiments, the actuation system 120 may be configured so as not to cause marking material to be dispensed from marking dispenser 116 in response to one or more signals or stimuli; rather, the actuation system may merely facilitate a logging of data from one or more input devices in response to operation of an actuator/trigger, without necessarily dispensing marking material. In some instances, this may facilitate "simulation" of a marking operation (i.e., simulating the dispensing of marking material) by providing an actuation signal 121 to the processor 118 indicating one or more simulated actuation events, in response to which the processor may cause the logging of various data for creating an electronic record without any marking material actually being dispensed.

Location tracking system 130 of marking device 110 constitutes another type of input device that provides marking information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. An error correction component 131 may be, but is not limited to, any mechanism for improving the accuracy of the geographic information provided by location tracking system 130; for example, error correction component 131 may be an algorithm for correcting any offsets (e.g., due to local disturbances in the atmosphere) in the geo-location data of location tracking system 130. While shown as part of a local location tracking system of the marking device 110, error correction component 131 alternatively may reside at a remote computing device, such as remote computer 150. In other embodiments, location tracking system 130 may include any device or mechanism that may determine location by any other means, such as performing triangulation by use of cellular radiotelephone towers.

In one exemplary implementation, the location tracking system 130 may include an ISM300F2-C5-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

In another embodiment, location tracking system 130 may not reside locally on marking device 110. Instead, location tracking system 130 may reside on any on-site computer, which serves as a location reference point, to which the location of marking device 110 may be correlated by any other means, such as, but not limited to, by a triangulation technique between the on-site computer and marking device 110.

With respect to other input devices of the marking device 110 that may provide marking information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp).

Marking material detection mechanism 132 of the marking device 110 shown in FIG. 2 is another type of input device that provides marking information, and may be any mechanism or mechanisms for determining a presence or absence of a marking dispenser 116 in or otherwise coupled to the marking device 110, as well as determining certain attributes/characteristics of the marking material within marking dispenser 116 when the dispenser is placed in or coupled to the marking device. As shown in FIG. 3, in some embodiments the marking material detection mechanism 132 may be disposed generally in an area proximate to a marking material holder 140 in which a marking dispenser 116 may be placed.

For example, in one embodiment, the marking material detection mechanism 132 may include one or more switch devices (e.g., a make/break single pole/single throw contact switch) disposed at one or more points along the marking material holder 140 and electrically coupled to the processor 118. The switch device(s) may also be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. When the marking dispenser 116 is present in the holder 140, the switch device(s) is in one of two possible states and when there is no marking dispenser the switch device(s) is in another of the two possible states (e.g., the marking dispenser, when present, may depress the switch device(s) so as to make contact and pass the ground/DC voltage to the processor). In this manner, the marking material detection mechanism 132 may provide a signal to the processor indicating the presence or absence of the marking dispenser 116 in the marking device 110.

The marking material detection mechanism 132 also or alternatively may include a barcode reader to read barcode data from a dispenser 116 and/or a radio-frequency identification (RFID) reader for reading information from an RFID tag that is provided on marking dispenser 116. The RFID tag may include, for example, a unique serial number or universal product code (UPC) that corresponds to the brand and/or type of marking material in marking dispenser 116. The type of information that may be encoded within the RFID tag on marking dispenser 116 may include product-specific information for the marking material, but any information of interest may be stored on an RFID tag. For example, user-specific information and/or inventory-related information may be stored on each RFID tag for a marking dispenser 116 to facilitate inventory tracking of marking materials. In particular, an identifier for a technician may be stored on an RFID tag when the technician is provided with a marking dispenser 116, and information relating to weight, amount dispensed, and/or amount remaining may be written to the RFID tag whenever the marking dispenser is used.

In one exemplary implementation, the marking material detection mechanism 132 may include a Micro RWD MIFARE-ICODE RFID reader module available from IB Technology (Eccel Technology Ltd) of Aylesbury, Buckinghamshire, UK (see www.ibtechnology.co.uk/products/icode.htm). The Micro RWD reader module includes an RS232 communication interface to facilitate communication between the processor 118 and the reader module (e.g., via messages sent as a string of ASCII characters), and supports both reading information from an RFID tag attached to a marking dispenser as well as writing information to an RFID tag attached to the marking dispenser. In one aspect of an exemplary implementation, an antenna constituted by one or more turns of wire (e.g., two turns of awg 26 wire, 6.5 cm in diameter, about 1 uH) is coupled to the Micro RWD reader module and disposed in the marking material holder 140 of the marking device 110 (see FIG. 3), proximate to a marking dispenser 116 when placed in the holder 140, so as to capture close near field signals (e.g., from an RFID tag on the dispenser, within about 2 inches) and exclude far field signals. In another aspect, the Micro RWD reader module may be configured to read RFID tags having an ICODE SLI format (e.g., ISO 15693 ICODE SLI). In yet another aspect, an RFID tag may be affixed to an aerosol paint can serving as the marking dispenser, such that the tag conforms to a plastic cap of the paint can and is disposed at a particular location relative to a notch in the cap (e.g., 90 degrees+/−15 degrees from the notch) that allows access to the spray nozzle of the can and is in a relatively predictable position substantially aligned with the antenna when the paint can is placed in the marking material holder 140. Examples of RFID tags suitable for this purpose are available from BCS Solutions, Inc. (see www.bcssolutions.com/solutions/rfid) and include, but are not limited to, the HF Bullseye Wet Inlay SLA Round 40.

In yet other embodiments, marking material detection mechanism 132 may alternatively or further be configured to detect properties of marking material as it is dispensed. For example, the marking material detection mechanism may include one or more of an optical sensor, an olfactory sensor, an auditory sensor (e.g., a microphone), a weight sensor, and any combination thereof. For example, in one embodiment an optical sensor in the marking device may be used to identify the composition and/or type of marking material in the marking dispenser by analyzing light reflected by the material as it is dispensed. Similarly, an olfactory sensor may be used to identify one or more characteristics of the marking material based on an odor profile of the material, and an auditory sensor may be used to identify the difference between paint being sprayed from an aerosol can and aerosol without paint being sprayed from a can (e.g., as the dispenser becomes emptied of paint).

In one embodiment, information provided by one or more input devices of the marking device 110 (e.g., the timing system 128, the location tracking system 130, the marking material detection mechanism 132, the user interface 126, the communication interface 124) is acquired and logged (stored in memory) upon actuation of the actuation system 120 (e.g., triggering an actuator). Some embodiments of the invention may additionally or alternatively acquire/log information from one or more input devices at one or more times during or throughout an actuation, such as when a technician is holding a mechanical or electrical actuator for some period of time and moving to dispense marking material in a line (e.g., see FIG. 7). In various aspects of such embodiments, marking information derived from one or more input devices may be collected at a start time of an actuation, at one or more times during an actuation, and in some cases at regular intervals during an actuation (e.g., several times per second, once per second, once every few seconds). Further, some marking information may be collected at an end of an actuation, such as time information that may indicate a duration of an actuation.

Additionally, it should be appreciated that while some marking information may be received via one or more input devices at the start of each marking operation and upon successive actuations of the marking device, in other cases some marking information may be collected by or provided to the marking device once, prior to a marking operation (e.g., on power-up or reset of the marking device, as part of an electronic instruction or dispatch by a locate company, and/or in response to a request/query from a locate technician), and stored in local memory 122 for later incorporation into an electronic record. For example, prior to a given marking operation and one or more actuations of the marking device, ticket information and/or service-related information may have already been received (e.g., via the communication interface 124 and/or user interface 126) and stored in local memory 122. Upon generation of an electronic record of a given marking operation, information previously received via the interface(s) may be retrieved from the local memory (if stored there initially) and entered into an electronic record, in some case together with information collected pursuant to one or more actuations of the marking device. Alternatively, ticket information and/or service-related information may be received via the interface(s) and stored in an entry in the electronic record 135 "directly" in response to one or more actuations of the marking device (e.g., without being first stored in local memory).

In sum, according to embodiments of the present invention, various marking information from one or more input devices, regardless of how or when it is received, may be stored in an electronic record of a marking operation, in which at least some of the marking information is logged pursuant to one or more actuations of the marking device.

In one embodiment, the optional remote computer 150 of the data acquisition system 100 may be a centralized computer, such as a central server of an underground facility locate service provider. In another embodiment, remote computer 150 may be a computer that is at or near the work site (i.e., "on-site"), e.g., a computer that is present in a locate technician's vehicle.

Whether resident and/or executed on either the marking device 110 or the remote computer 150, as noted above the marking data algorithm 134 includes a set of processor-executable instructions (e.g., stored in memory, such as local memory 122 of the marking device) that, when executed by processor 118 of the marking device 110 or another processor, processes information (e.g., various marking information) collected in response to (e.g., during) one or more actuations of the marking device 110, and/or in some cases before or after a given actuation or series of actuations. As also discussed above, according to various embodiments the actuations of marking device 110 may effect both dispensing marking material and logging of marking information, or merely logging of marking information for other purposes (e.g., simulating the dispensing of marking material) without dispensing marking material. In either situation, marking data algorithm 134, when executed by the processor 118, may cause the processor to perform collection, logging/storage (creation of electronic records), and in some instances further processing and analysis of various marking information with respect to marking device actuations. For example, as discussed in further detail below in connection with FIG. 9, the operations of marking data algorithm 134 as effected by the processor 118 may include, but are not limited to, the following:

(1) reading in (acquiring) data that is generated by any component (e.g., one or more input devices); for example, data may be read in that is acquired at a start of a given actuation, throughout the duration of the actuation, at the end of the actuation, before or after the actuation, and any combination thereof;

(2) processing the information that is collected and associating the collected information with respective actuations; for example, any information collected may be parsed/packaged so as to be associated with any one or more actuations of the marking device, irrespective of when the data was actually acquired;

(3) formatting the acquired information, e.g., as multiple time-stamped event entries constituting actuation data sets forming an electronic record, wherein each actuation data set corresponds to a particular actuation; and (4) using respective actuation data sets of an electronic record to visually recreate the marking operation (e.g., render a computer-generated representation in a display field, wherein respective actuation data sets correspond to electronic locate marks).

It should also be appreciated that the marking data algorithm 134 may include one or more adjustable parameters that govern various aspects of the collection and logging of marking information (e.g., the rate at which various marking information is collected from one or more input devices), and that these parameters may be adjusted or set, for example, by an administrator at a remote computer, after which the marking data algorithm is downloaded to the marking device for execution by the processor 118. Alternatively, in other implementations, adjustable parameters of a marking data algorithm already resident on a marking device may in some cases be adjusted remotely via the communication interface, or locally via the user interface.

While the functionality of various components of the marking device 110 was discussed above in connection with FIG. 2, FIG. 3 shows some structural aspects of the marking device 110 according to one embodiment. For example, the marking device 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of marking device 110 that are shown in FIG. 2. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the marking device 110 during use (i.e., the exemplary marking device depicted in FIG. 3 is intended to be a hand-held device). In one implementation, the power source 114 may be provided in the form of a removable battery pack housing one or more rechargeable batteries that are connected in series or parallel in order to provide a DC voltage to marking device 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 3, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128) also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 3, the location tracking system 130 similarly may be positioned on the proximal end of the elongated housing 136 to facilitate substantially unobstructed exposure to the atmosphere; in particular, as illustrated in FIG. 3, the location tracking system 130 may be situated on an a ground plane 133 (providing an electrical ground at least at the antenna frequency of the location tracking system, e.g., at approximately 1.5 GHz) that extends from the proximal end of the housing 136 and is approximately parallel to the ground, surface or pavement when the marking device is being normally operated by a technician (so as to reduce signal modulation with subtle movements of the marking device).

As also shown in FIG. 3, incorporated at the distal end of elongated housing 136 is a marking dispenser holder 140 for holding one or more marking dispensers 116 (e.g., an aerosol paint canister). Dispenser 116 may be one or more replaceable dispensers or one or more reusable refillable dispensers (including a fixed reservoir forming a part of the device 110) or any other suitable dispenser. Also situated at the distal end of the housing is the marking material detection mechanism 132 to detect a presence or absence of the marking dispenser 116 in the marking material holder 140, and/or one or more characteristics of the marking material 148, as well as an actuation mechanism 158, which in some implementations may constitute part of the actuation system 120 and be employed to interact with the marking dispenser 116 so as to effect dispensing of the marking material 148.

With respect to the actuation system 120, as shown in FIG. 3, at least a portion of the actuation system 120 is indicated generally along the length of the elongated housing for purposes of illustration. More specifically, however, in various implementations the actuation system 120 may include multiple components disposed in various places in, on or coupled to the marking device 110. For example, in the embodiment of FIG. 3, the actuation system 120 includes an actuator 142, which for example may be a mechanical mechanism provided at the handle 138 in the form of a trigger that is pulled by a finger or hand of an user/ technician. The actuation system 120 further includes the actuation mechanism 158 disposed at the distal end of the marking device that is responsive to the actuator 142 to dispense marking material. In general, in various exemplary implementations as discussed in further detail below, the actuation system 120 may employ any of a variety of mechanical and/or electrical techniques to cause the marking dispenser 116 to dispense marking material 148 in response to one or more signals or stimuli. In the embodiment shown in FIG. 3, the signal/stimulus is initially provided to the actuation system via the mechanical actuator 142; i.e., a locate technician or other user triggers (e.g., pulls/depresses) the actuator 142 to provide a signal/stimulus to the actuation system 120, which in turn operates the actuation mechanism 158 to dispense marking material in response to the signal/ stimulus.

In response to the signal/stimulus provided by the actuator 142, as discussed above the actuation system may also provide an actuation signal 121 to the processor 118 to indicate an actuation. As discussed in further detail below in connection with FIG. 9, pursuant to the execution by the processor 118 of the marking data algorithm 134, the actuation signal 121 may be used to cause the logging of information that is provided by one or more components of the marking device 110 so as to generate an electronic record of the marking operation.

Figures 4A, 4B:
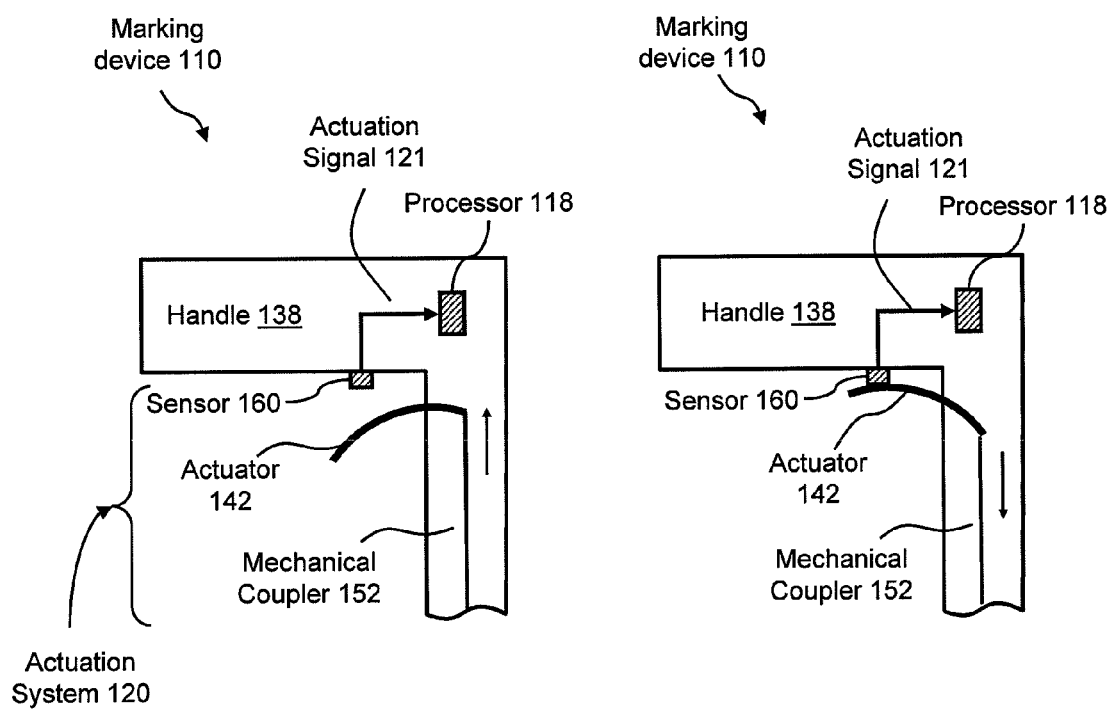
FIGS. 4A and 4B illustrate a portion of an actuation system of the marking device of FIG. 3 according to one embodiment of the present invention.

FIGS. 4A and 4B illustrate a portion of the actuation system 120 according to one embodiment of the present invention. FIG. 4A shows the actuator 142 in an un-actuated state, whereas FIG. 4B shows the actuator 142 in an actuated state (in which a signal/stimulus is provided by the actuator). In the example of FIGS. 4A and 4B, the actuator 142 is coupled to a mechanical coupler 152, similar to that shown in FIGS. 1A and 1B, which extends along a length of the elongated housing and is in turn coupled to a mechanical actuation mechanism 158 at the distal end of the housing (not shown in FIGS. 4A and 4B) that ultimately effects dispensing of marking material when the actuator is in the actuated state. The portion of the actuation system 120 shown in FIGS. 4A and 4B also includes a sensor 160 which is configured to provide an actuation signal 121 to the processor 118 to indicate one or both of the respective actuated and un-actuated states of the actuator 142.

In one implementation, the sensor 160 may include a switch device (e.g., a make/break single pole/single throw contact switch) disposed along the handle 138 of the marking device such that, when pulled, the actuator contacts (e.g., depresses) the switch causing a state of the switch to toggle. In another implementation, the sensor 160 may include a switch device such as a reed (magnetic) switch disposed at some point along the length of the elongated housing; in such an implementation, the mechanical coupler 152 may have a magnet disposed along it at an appropriate position relative to the reed switch, such that movement of the mechanical coupler 152 upon actuation of the actuator 142 causes a state of the reed switch to toggle. Electrically, a switch device serving as the sensor 160 may be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. In this manner, the sensor 160 may provide the actuation signal 121 to the processor indicating actuation (and release) of the actuator 142.

Figure 5:
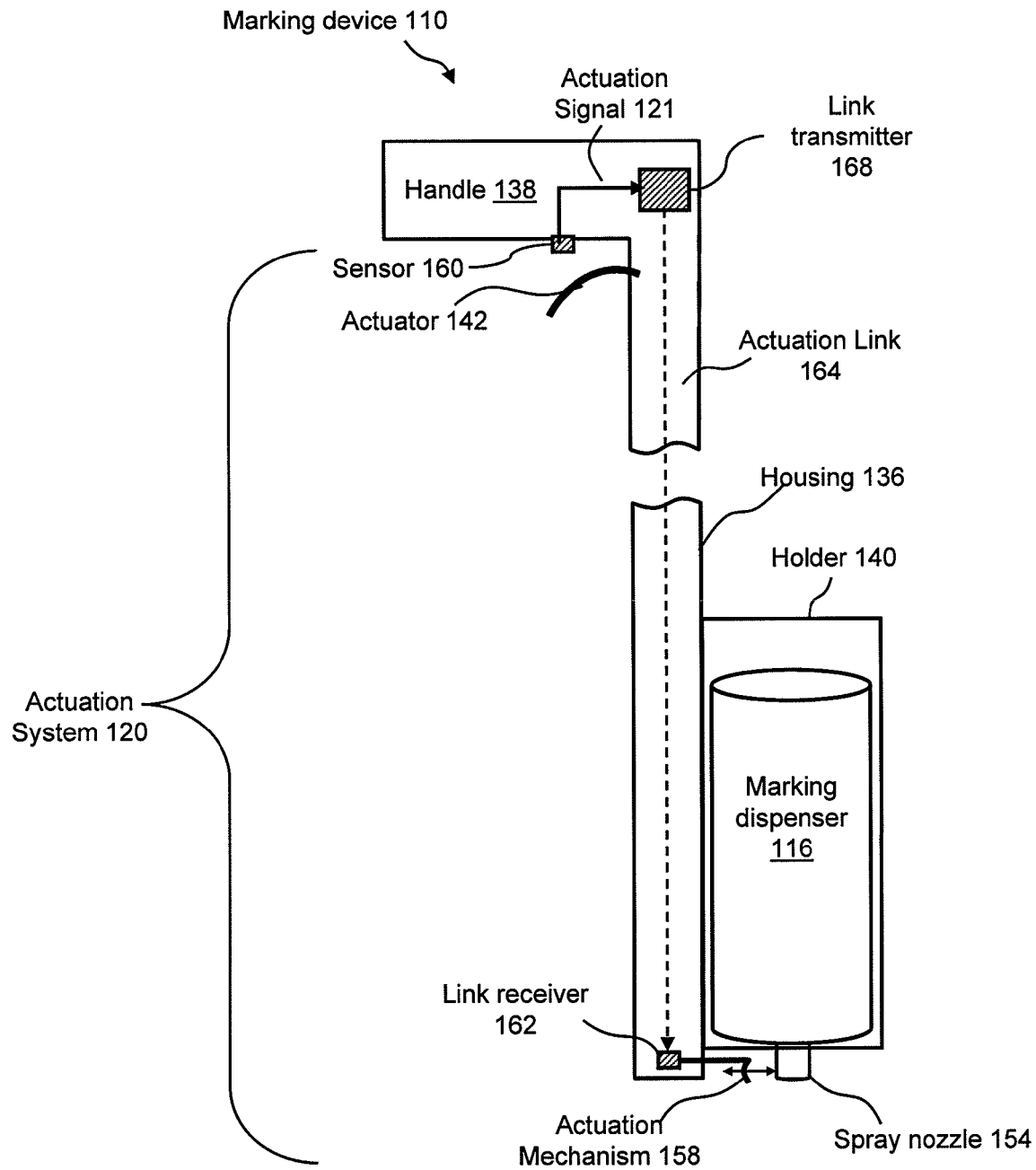
FIG. 5 illustrates various components of an actuation system 120 according to other embodiments of the present invention.

FIG. 5 illustrates various components of an actuation system 120 according to other embodiments of the present invention. Generally speaking, the actuation system 120 may include the actuator 142, the sensor 160 to detect actuation and release of the actuator 142 (and also provide a corresponding actuation signal 121 representing same to the processor 118), a link transmitter 168 coupled and responsive to the sensor 160 to transmit one or more signals and/or other stimulus via an actuation link 164, and a link receiver 162 to receive the one or more signals and/or other stimulus from the actuation link 164 and, in response to same, operate the actuation mechanism 158. The link transmitter 168, the link 164, and the link receiver 162 may include one or more electrical and/or mechanical components.

For example, the link receiver 162 may include a linear solenoid mechanically coupled to the actuation mechanism 158 and whose movement is responsive to one or more signals and/or stimuli received from the link 164. In various exemplary implementations, the link transmitter 168 and the link 164 simply may include a wire that couples the sensor 160 to the solenoid to activate the solenoid upon changes of state in the actuation signal 121. Alternatively, the transmitter 168 may be an RF transmitter that is activated in response to the actuation signal 121, the link 164 may be a wireless link, and the receiver 162 may include an RF receiver.

Other examples of transmitter/link/receiver combinations include, but are not limited to, an acoustic transmitter/link/ receiver (e.g., a sound wave source that provides a sound wave of a certain tone, duration, and/or amplitude when the actuator is actuated, and a corresponding sound wave detector), an optical transmitter/link/receiver (e.g., a light or laser source that provides an optical signal of a certain wavelength, duration, and/or amplitude when the actuator is actuated, and a corresponding optical detector), a fluid transmitter/link/receiver (e.g., a fluid system that provides a fluid control output of a certain volume, pressure, and/or duration when the actuator is actuated, and a corresponding fluid sensor for sensing the presence of, for example, a short blast of water of a certain volume, pressure, and/or duration to indicate an actuation; the fluid system may be, for example, a closed-loop system that has a source reservoir at the top of the marking device, a fluid line in proximity with the fluid sensor, a return reservoir for capturing water during the actuation process, and appropriate pressure regulation and ducts for cycling water from the return reservoir back to the source reservoir), and an air transmitter/link/receiver (e.g., an air system that provides an air control output of a certain volume, pressure, and/or duration when the actuator is actuated, and a corresponding air sensor for sensing the presence of, for example, a blast or puff of air of a certain volume, pressure, and/or duration to indicate an actuation).

While not explicitly shown in FIG. 5, in yet other embodiments it should be appreciated that the sensor 160 may be coupled to the processor 118 (to provide the actuation signal 121 representing actuation/release of the actuator), and in turn the processor may provide a signal to the link transmitter 168, such that dispensing of marking material may in part be under the control of the processor 118 executing particular instructions for this purpose. More specifically, while in some implementations dispensing of marking material may be directly responsive to actuation of the actuator (and cease upon release of the actuator), in other implementations dispensing of marking material may be initiated in some manner upon actuation of the actuator, but then continued dispensing of marking material may not necessarily be dictated by continued actuation, or release, of the actuator. Rather, the processor 118 may provide one or more signals or commands to the link transmitter 168 to govern dispensing of marking material in some manner that does not necessarily track each actuation and release of the actuator.

For example, in one implementation the processor 118 may execute instructions such that, once the actuation signal 121 from the sensor 160 indicates actuation of the actuator, the processor 118 provides a signal to the link transmitter 168 that causes dispensing of marking material for some predetermined or user-defined amount of time, irrespective of release of the actuator. Additionally or alternatively, the processor may provide one or more signals to the link transmitter 168 that causes dispensing of marking material for multiple discrete amounts of time with a single actuation (e.g., three bursts of 1 second each per actuation). From the foregoing, it should be generally appreciated that a wide variety of marker sizes and patterns may be generated from the marking device in an automated or semi-automated manner based on processor-based control of the actuation system 120. It should also be appreciated that automated or semi-automated processor-based control of the dispensing of marking material may also govern in some fashion how, how often, and/or what type of marking information is collected and logged to generate an electronic record of a marking operation, as discussed further below in connection with FIG. 9.

III. Exemplary Marking Techniques

Figure 6:
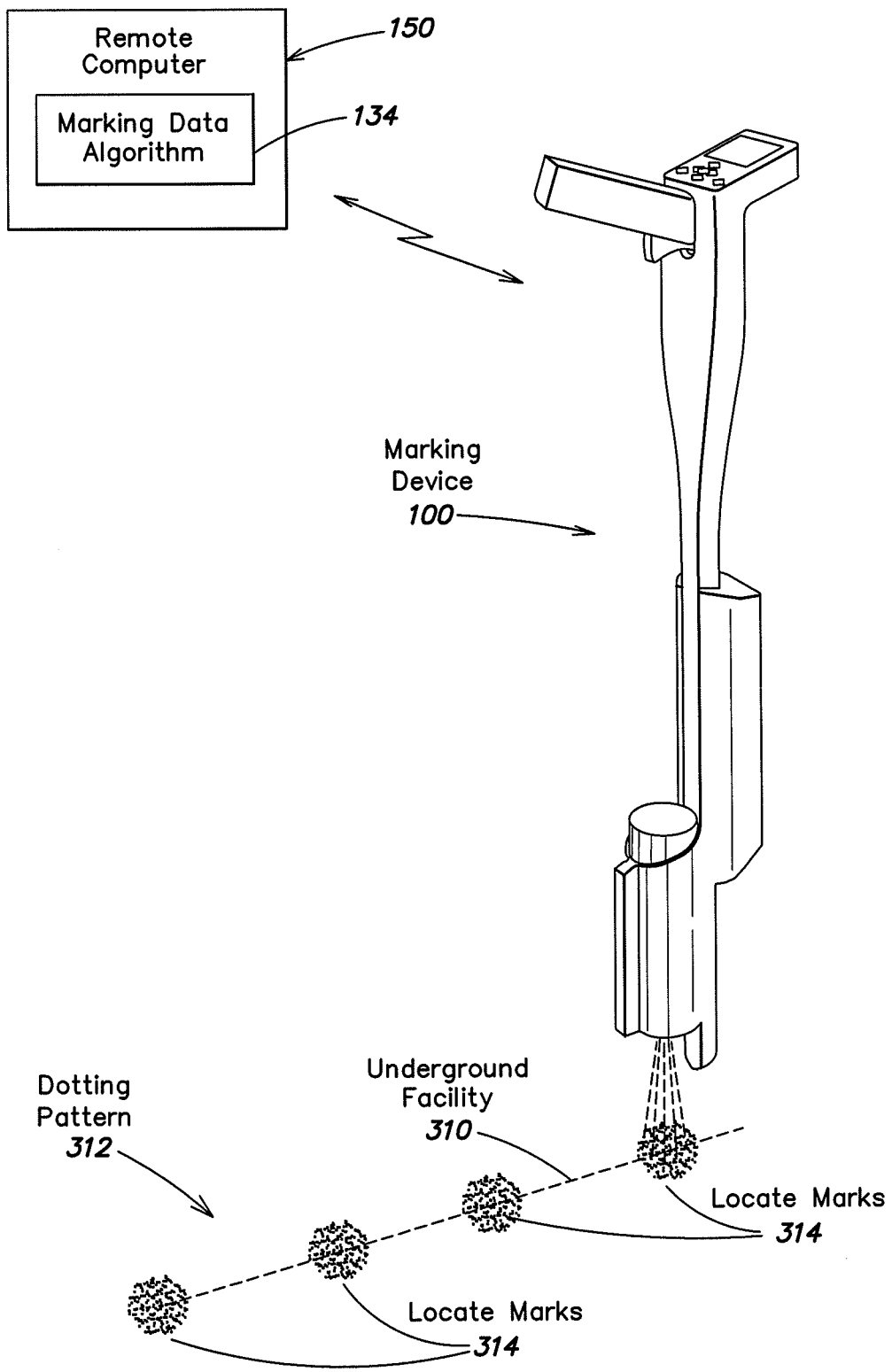
FIG. 6 is a perspective view of an exemplary marking device being used for marking a dotting pattern, according to one embodiment of the present invention.
Figure 7:
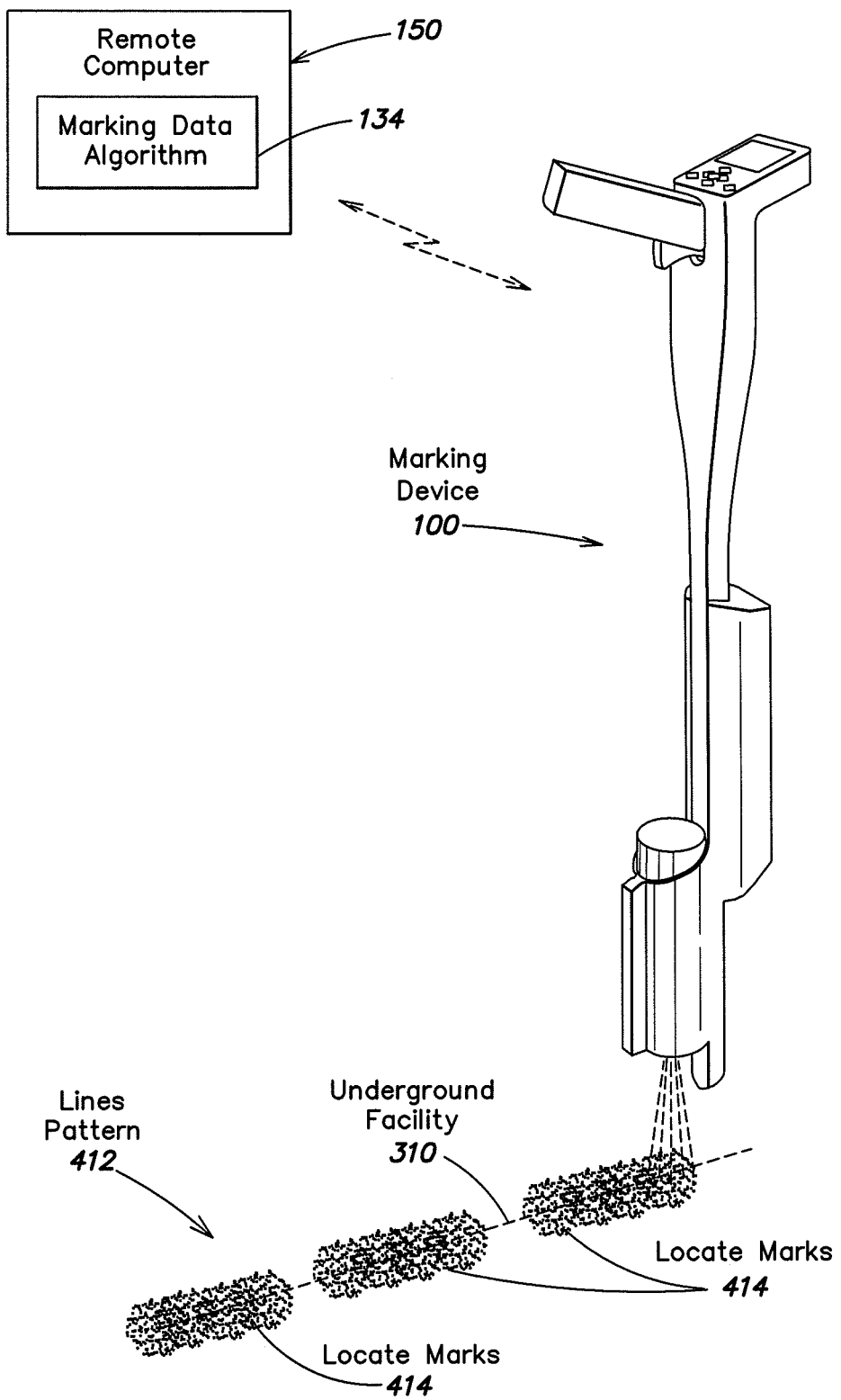
FIG. 7 is a perspective view of an exemplary marking device being used for marking a lines pattern, according to one embodiment of the present invention.

FIGS. 6 and 7 provide examples of how the marking device 110 shown in FIGS. 2 and 3 may be employed by a technician during a marking operation. Referring now to FIG. 6, a perspective view of marking device 110 when in use for marking a "dotting pattern" is presented. In marking operations, a dotting pattern may be utilized to preliminarily and quickly indicate the presence or absence of a target facility during an initial locate of a target facility. By way of example, FIG. 6 shows an underground facility 310, which may be any facility, such as an underground gas line, water pipe, sewer pipe, power line, telephone line, cable television conduit, and the like. FIG. 6 also shows a dotting pattern 312 that is formed by multiple locate marks 314 dispensed via marking device 110. The locate marks 314 of dotting pattern 312 are formed by successive short bursts of marking material (e.g., brief actuations); i.e., each locate mark 314 corresponds to one brief actuation of the marking device 110.

Referring now to FIG. 7, a perspective view of marking device 110 when in use for marking a "lines pattern" is presented. In marking operations, a lines pattern is typically the end product of a marking operation. This pattern extends the dotting pattern (e.g., dotting pattern 312 of FIG. 6) so as to create lines (e.g., a series of dashes) that indicate the presence or absence of an underground facility. These lines subsequently provide important reference marks to an excavator so as to avoid damage to a facility during excavation activities or other disturbances of the ground. By way of example, FIG. 7 shows underground facility 310, which may be any concealed facility, such as an underground gas line, water pipe, sewer pipe, power line, telephone line, cable television conduit, and the like. FIG. 7 also shows a lines pattern 412 that is formed by multiple locate marks 414 dispensed via marking device 110. A characteristic of locate marks 414 of lines pattern 412 is that each locate mark 414 is formed by an extended burst of marking material (e.g., a longer actuation of the marking device) as compared with a dotting pattern. As with the dotting pattern shown in FIG. 6, however, each locate mark 414 of the lines pattern shown in FIG. 7 may correspond to one actuation of marking device 110. In some alternative implementations, as discussed above, a series of locate marks (e.g., all three marks 414) may be automatically generated by one actuation of marking device 110 pursuant to processor-based control of the actuation system.

Figure 8:
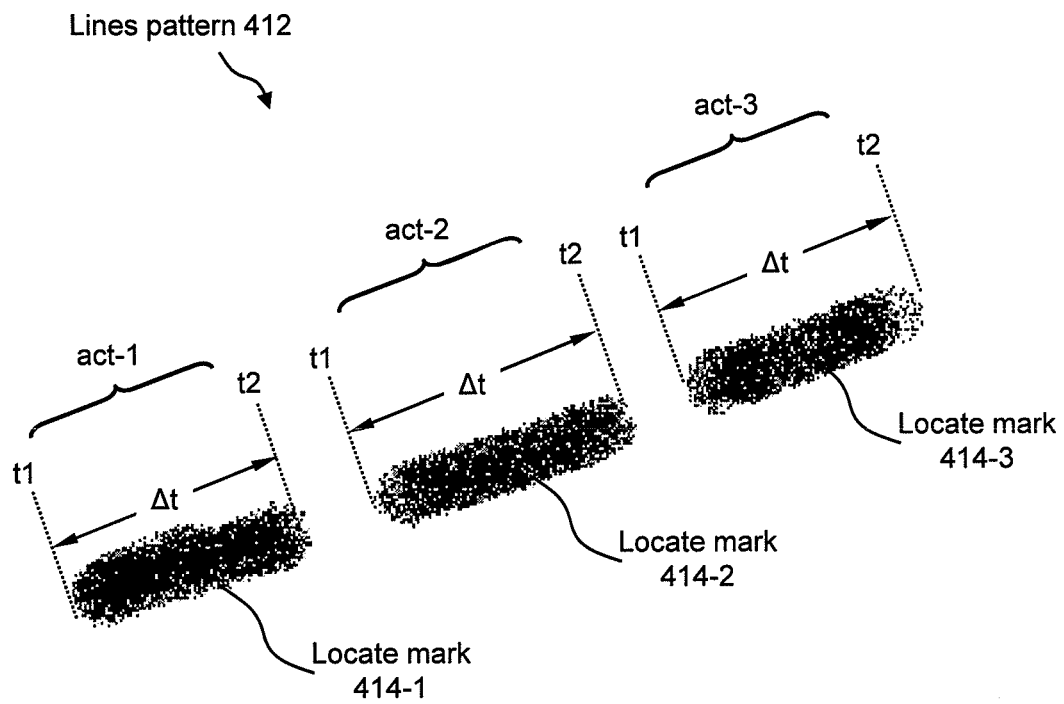
FIG. 8 is a plan view that shows further details of the lines pattern of FIG. 7, in connection with the information acquired for purposes of creating an electronic record according to one embodiment of the present invention.

FIG. 8 illustrates a plan view that shows further details of the lines pattern 412 of FIG. 7. In the example of FIG. 8, each locate mark 414-1, 414-2, and 414-3 corresponds to one actuation ("act") of marking device 110, i.e., locate mark 414-1 corresponds to act-1, locate mark 414-2 corresponds to act-2, and locate mark 414-3 corresponds to act-3. Furthermore, each actuation and its corresponding locate mark 412 has a start time t1, an end time t2, and a duration (Δt). While FIG. 8 shows three locate marks, it should be appreciated that lines pattern 412 may be formed by any number of locate marks.

IV. Format, Content and Process of Generating Electronic Records of Marking Operations In one embodiment of the present invention for generating an electronic record of a marking operation, the processor 118 of the marking device 110, executing the marking data algorithm 134, may collect various marking information and generate an electronic record having one or more "actuation data sets" respectively associated with one or more actuations (act-1, act-2, act-3 . . . act-n) and corresponding locate marks, as shown in FIG. 8. Marking information may be collected and entered into such an electronic record at various times relative to the start time t1 and the end time t2 of a given actuation, e.g., at t1 only, at t2 only, at both t1 and t2, at any time(s) between t1 and t2, and/or before or after t1 and t2.

Examples of marking information that generally (but not necessarily) is acquired with respect to t1 and t2 of each actuation, and points between t1 and t2 ("actuation data"), may include, but are not limited to:

(1) timing information: time and date for one or both of t1 and t2 (hereinafter also referred to as "time stamp data"), and/or duration (Δt) of the actuation, which may be provided in some instances by timing system 128; and (2) geographic information: latitude and longitude data from location tracking system 130 (hereinafter also referred to as "geo-location data") (e.g., GPS data may be expressed in degrees, minutes, and seconds (i.e., DDD°, MM', and SS.S"), degrees and decimal minutes (DDD° and MM.MMM'), or decimal degrees)) (DDD.DDDDD°.

Examples of marking information that may be acquired before, during or after a given actuation or succession of actuations, and also entered into an electronic record, include, but are not limited to:

(3) marking material information, such as the presence, color, brand and/or type of dispensed marking material or a simulated dispensing of such marking material (i.e., hereinafter also referred to as "product data");

(4) service-related information: identification (ID) number of the locate service provider (e.g., a party/company who dispatches the locate technician, hereinafter also referred to as "service provider ID"); ID number of the user and/or technician (hereinafter also referred to as "user ID"); ID number of the marking device being used for the marking operation (hereinafter also referred to as "device ID"); and (5) ticket information, such as the requesting party, type of facility requested to be marked by the requesting party, and address of the work site/dig area for the marking operation (hereinafter also referred to as "locate request data"). Ticket information may be received as, or derived from, a locate request ticket or any other suitable source.

In exemplary methods for generating an electronic record of marking operations according to some embodiments of the invention, as discussed in greater detail below, for a given actuation the processor 118 may request the location tracking system 130 to provide geographic information at one or more times during the actuation (e.g., periodically at regular intervals). Thus, an actuation data set of an electronic record for a given actuation of the marking device may have multiple pieces of geographic information (and associated time stamps) representing the location of the marking device at multiple times during a corresponding actuation. Additionally, for a given actuation, the processor 118 also may request the marking material detection mechanism 132 to provide marking material information as part of the actuation data set. The processor also may include ticket information and service-related information, which may be collected (e.g., via one or more of the user interface 126 and the communication interface 124) before a corresponding actuation, stored in memory 122 and retrieved from the memory for entry into the electronic record upon or during the corresponding actuation, or collected and entered into the electronic record upon or during the corresponding actuation.

While the collection and logging of marking information to generate an electronic record is discussed in some aspects, for purposes of illustration, in terms of actuation data sets (i.e., a set of data that is associated and logged with a corresponding actuation of the marking device), it should be appreciated that various embodiments of the present invention are not limited in this respect. More generally, an electronic record of a marking operation may be generated in any of a variety of manners, have a variety of file formats and/or data structures, and include any of a variety of marking information (some of which may be germane to one or more actuations of the marking device and some of which may be common to multiple actuations or the overall marking operation in general).

Figure 9:
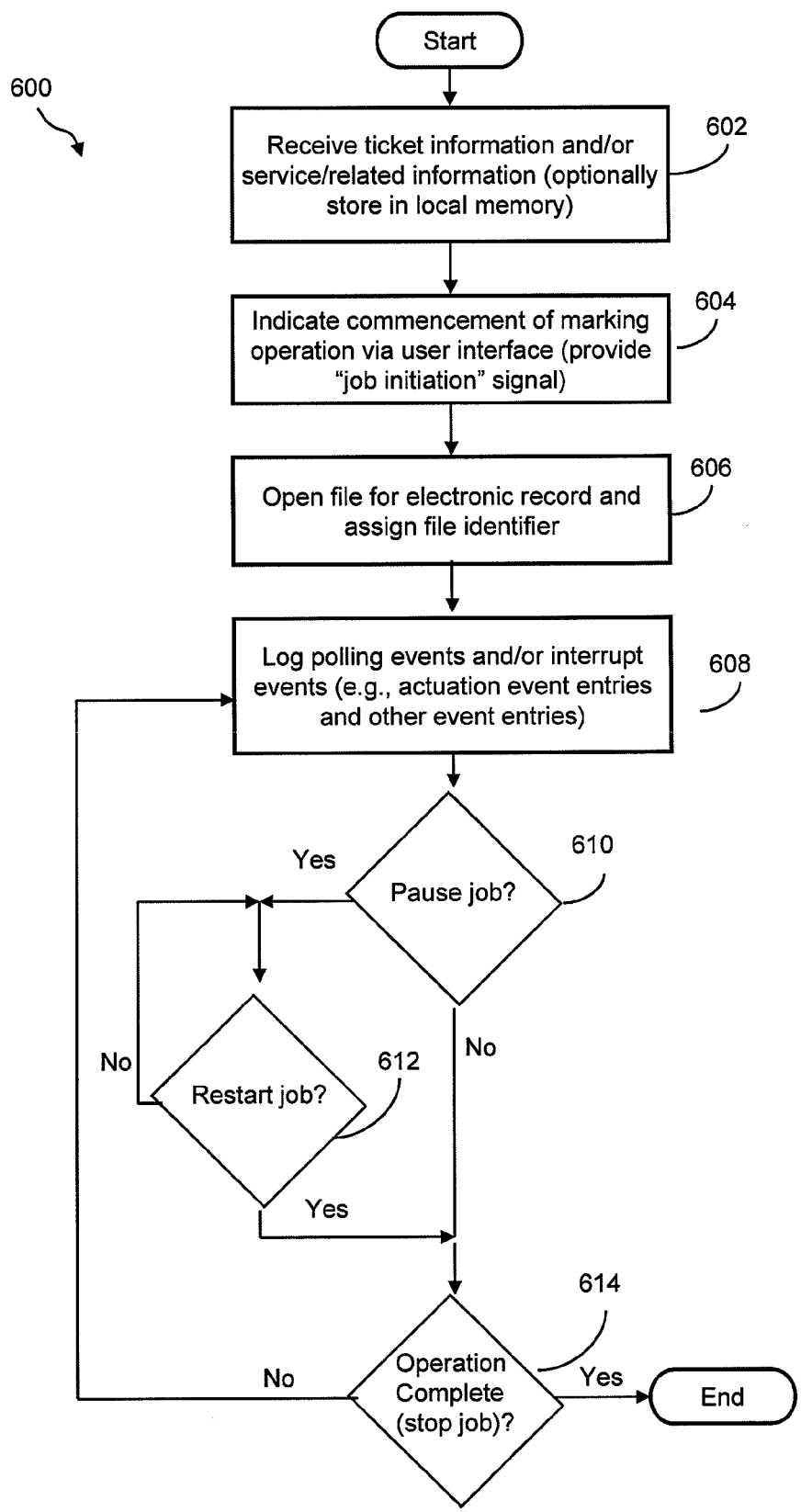
FIG. 9 is a flow diagram of an exemplary method for collecting marking information for generation of an electronic record, according to one embodiment of the present invention.

FIG. 9 is a flow diagram of an exemplary process 600 for collecting marking information during operation of a marking device 110 and generating an electronic record, according to one embodiment of the present invention. It should be appreciated that as various marking information is collected and logged in the process 600, such marking information also may be transmitted from the marking device (e.g., to remote computer 150) to facilitate essentially real-time monitoring of the marking operation, and/or remote generation of an electronic record of the marking operation.

In block 602 of the process 600 shown in FIG. 9, ticket information and/or service-related information may be received (e.g., via one or more of the user interface 126 and the communication interface 124 of marking device 110) and this information optionally may be stored in whole or in part in local memory 122 of the marking device. The ticket information and/or service-related information may be received electronically in any of a variety of formats, and the processor may be configured to appropriately parse the information for subsequent entry into an electronic record. For example, in some embodiments, the ticket information may be received as part of an electronic locate request ticket, and individual respective pieces of ticket information (e.g., ticket number, work site address information, requesting party, etc.) may be extracted or derived from the electronic locate request ticket. In other embodiments, various aspects of ticket information may be input by a user/technician via the user interface. Similarly, with respect to service-related information, a user/technician may manually enter some aspects of this information, while other aspects may already be available in other memory locations (e.g., the marking device ID or serial number, a technician ID to which the marking device is assigned or checked-out, etc.). Accordingly, while block 602 is illustrated as one element of the process 600, it should be appreciated that respective pieces of information received as input in block 602 may be received at different times and via different interfaces/sources.

In block 604, the locate technician utilizes the user interface 126 to indicate the initiation of a marking operation. For example, the technician may press a button, operate a joy-stick, or touch a touch screen display portion of a graphical user interface to commence a marking operation. In response, a "job initiation signal" is provided to the processor 118 (e.g., via a switch closure and a ground or DC level applied to an I/O pin of the processor, or by the user interface providing a signal to the processor) to initiate generation of an electronic record. Alternatively, a remote job initiation signal may be received by the processor via the communication interface from another device, such as the remote computer 150.

In response to the job initiation signal, in block 606 the processor opens a file in the memory 122 in which to store the electronic record 135, and assigns a file identifier to the opened file. In one example, the file identifier assigned to the opened file may be or include one or more of a job number ("job ID") or ticket number derived from the ticket information and/or the service-related information, an identifier for the marking device itself, and an identifier for a remote computer associated with the marking device (e.g., for either remote control operation of the device and/or data uploading/downloading). To this end, if ticket information and/or service-related information is not previously available (e.g., if no information is received in block 602), the technician optionally may be prompted to manually enter (e.g., via a "wizard" or sequence of dialogues germane to obtaining relevant information displayed on the display of the user interface) various elements of ticket information and/or service-related information from which a file identifier may be derived, or provide other information that may be used as a file identifier.

A file opened in block 606 for purposes of storing an electronic record may have any of a variety of formats and include any of a variety of data structures. In one embodiment, the processor initially opens up a "flat file" for collection and logging of marking information to facilitate generation of an electronic record. As known in the art, a flat file is a plain text or mixed text/binary file containing one entry (data record) per line, in which each entry may have multiple fields containing respective values, and wherein the respective values may be separated by delimiters (e.g., commas) or have a fixed length. In one exemplary implementation, the processor 118 logs data into a flat file opened for the electronic record as a succession of time stamped "event entries." Some event entries may be related specifically to actuation and/or logged in response to actuation of the marking device (e.g., the processor 118 receiving an actuation signal 121). Other event entries may be more generally related in some manner to overall operation of the marking device or the marking operation itself, but not necessarily associated with one or more particular actuations (e.g., start/pause/stop marking operation, power/battery status, communication link/network connection status, etc.), and these other event entries may be logged at virtually any time (in some cases irrespective of one or more actuations).

Accordingly, it should be appreciated that in one aspect of this embodiment a flat file for an electronic record may contain a succession of time stamped event entries on respective lines, in which one or more event entries may have multiple delimited fields/values and at least some of the event entries relate to actuation of the marking device. In another aspect, one or more fields/values in a given event entry may specifically indicate in some manner whether or not the event is associated with an actuation of the marking device. In general, an "actuation event entry" constitutes an entry in a file for an electronic record that is in some manner specifically related to, and/or logged in response to or during, actuation of the marking device, and multiple actuation event entries for a given actuation constitute an actuation data set for that actuation. Again, it should be appreciated that a file for an electronic record may include one or more other event entries that may not be particularly associated with an actuation.

In other embodiments, the file for an electronic record may or may not be a flat file, and event entries associated with actuations (actuation event entries) may be somehow identified and differentiated from other event entries that are not associated with an actuation. For example, a file for an electronic record may include a particular data structure or format that segregates or separates in some manner event entries associated with successive actuations from those event entries that are not particularly associated with actuations (and/or may be common to multiple actuations or a group of actuations). In yet other embodiments, as discussed below, marking information may be initially collected and logged in a first file for an electronic record in a first format (e.g., a flat file including a succession of time-stamped event entries as "raw data" for the marking operation) that may be stored and/or transmitted for any of a variety of purposes, and then reformatted and/or reorganized in some manner in one or more subsequent files (e.g., a file having a particular data structure that segregates/separates actuation-related information from other information in different fields/elements of a data structure) for archiving and/or transmission to one or more other devices/processors.

Once a file for an electronic record is opened in block 606, in block 608 the processor can begin collecting and logging various marking information, i.e., logging in the electronic record (and/or transmitting via the communication interface) actuation event entries and/or other event entries. In one exemplary implementation, the processor may be programmed so as to poll one or more input devices and/or other components of the marking device to receive information, either once or multiple times/periodically following the job initiation signal, and log responses to these polls ("polling events") as event entries with associated time stamps. Examples of entries corresponding to polling events that may be logged into the file for the electronic record (and/or transmitted) include, but are not limited to, one or more "power status event entries" including power information associated with the power source 114, one or more "ticket information event entries" including ticket information (e.g., as received from the user interface or the communication interface, retrieved from local memory, etc.), one or more "service-related information event entries" including the service-related information (e.g., as received from the user interface or the communication interface, retrieved from local memory, etc.), and one or more "communication interface event entries" including status information regarding operation of the communication interface (e.g., network communication available/unavailable).

Additionally or alternatively, the processor may be programmed so as to respond to one or more signals designated as "interrupt events" from one or more components of the marking device. Such interrupt events cause logging of information in the electronic record (and/or transmission of information) upon/following the processor detecting the corresponding signal(s). For example, the "job initiation signal" itself may constitute an interrupt event, in response to which the processor 118 not only opens a file for the electronic record but, once the file is opened, the processor may request timing information from the timing system 128 and log into the electronic record a "start job event entry" including a job initiation time stamp associated with receipt of the job initiation signal.

In a similar manner, following commencement of a marking operation, the locate technician may utilize the user interface 126 (e.g., press a button, operate a joy-stick, or touch a touch screen display portion of a graphical user interface) to pause, restart, and/or indicate completion of the marking operation, and these actions may constitute interrupt events. For example, as indicated in block 610 of FIG. 9, a "pause signal" may be provided by the user interface to the processor, in response to which the processor may request timing information from the timing system and log a "pause job event entry" including a pause job time stamp associated with the at least one pause signal. When the technician is ready to continue, as shown in block 612 of FIG. 9 the technician may indicate this via the user interface and a "restart job event entry" similarly may be logged. When the marking operation is deemed by the technician to be completed, as noted in block 614 of FIG. 9 the technician may utilize the user interface so as to provide a "stop signal" to the processor, in response to which the processor may request timing information from the timing system and log a "stop job event entry" including a stop job time stamp associate with the stop signal.

While various events are noted above as examples of "polling events" as opposed to "interrupt events," it should be appreciated that the invention is not limited in these respects, and that the marking data algorithm 134 executed by the processor 118 may be configured in any of a variety manners to designate various functions performed by and/or information provided by various components of the marking device as polling events or interrupt events. For example, the power source 114 may be configured to provide a "low battery signal" to the processor, which when present is treated by the processor as an interrupt event that may be logged by the processor and/or that may cause the processor to take some particular action (e.g., provide an audible/visible alert; disable logging of further data, etc.). In one aspect, absent the "low battery signal," the processor may request status information from the power source once or occasionally as a polling event. Similarly, the communication interface 124 may be configured to provide a "no network connection available signal" to the processor, which when present is treated by the processor as an interrupt event (that is logged and/or causes the processor to take some action), and when not present, the processor may poll the communication interface to request status information as a polling event.

Another example of an interrupt event is given by the actuation signal 121 provided by the actuation system 120 upon actuation of the actuator 142 (i.e., a signal change-of-state indicating a transition from a non-actuated state to an actuated state), in response to which the processor logs one or more actuation event entries in the electronic record. More specifically, in one implementation, the receipt of a non-actuated to actuated transition state of the actuation signal 121 by the processor may cause an initial actuation event entry to be logged as a "start actuation event entry" having an associated time stamp (i.e., a start time for the corresponding actuation) and also cause the processor to subsequently poll one or more input devices for information during the corresponding actuation and until release of the actuator (i.e., subsequent change of state of the actuation signal 121). In this manner, an actuation data set for a given actuation may include multiple actuation event entries.

For example, during actuation of the actuator, the processor may poll the location tracking system 130 so as to receive geographic information, and in turn log one or more "geo-location data event entries" in the actuation data set for the corresponding actuation. As discussed above in connection with FIGS. 2 and 3, in one exemplary implementation the location tracking system is configured to provide geographic information at an information update rate of approximately 5 Hz, and the processor may log respective updates of geographic information provided by the location tracking system at this update rate during an actuation as multiple geo-location data event entries of the actuation data set. It should be appreciated, however, that methods and apparatus according to various embodiments of the present invention are not limited in this respect, and that other geographic information update rates may be employed in various implementations (e.g., update rates of up to approximately 100 Hz), based in part on the particular location tracking system employed. Furthermore, it should be appreciated that in some implementations the geographic information provided by the location tracking system 130 may include one or more longitude coordinates, latitude coordinates, and a corresponding geo-location data time stamp at which a given set of longitude/latitude coordinates are obtained by the location tracking system; accordingly, a given geo-location data event entry in an actuation data set may include a longitude coordinate, a latitude coordinate, and the corresponding geo-location data time stamp.

Similarly, in some implementations, pursuant to an interrupt provided by the actuation signal 121, the processor may subsequently poll one or more of the timing system 128 and the marking material detection mechanism 132 so as to receive timing information and/or marking material information during a corresponding actuation, and in turn log one or more of a "timing event entry," and a "marking material detection event entry" as part of the actuation data set. Any of a variety of marking material information as discussed above may be collected and logged during actuation in response to processor polling of the marking material detection mechanism (e.g., causing an RFID tag reader to read various information from an RFID tag affixed to the marking dispenser).

Additionally, in some implementations, pursuant to an interrupt provided by the actuation signal 121, the processor may subsequently poll one or more of the user interface 126, the communication interface 124, and the local memory 122 to retrieve ticket information and/or service-related information for logging into an actuation data set. As discussed above, in some implementations the receipt/retrieval of ticket information and/or service-related information may be treated as a polling event not necessarily associated with actuations, and this information need not be included in one or more actuation data sets. However, in other implementations it may be desirable to include at least some aspect of ticket information and/or service related information in each actuation data set, notwithstanding the possible redundancy of data content in respective actuation data sets (e.g., see Table 2, discussed further below in connection with FIG. 10).

Another example of an interrupt event is given by a change-of-state of the actuation signal 121 indicating a transition from the actuated state to the non-actuated state, i.e., release of the actuator 142. In response to this event, the processor may request information from the timing system 128 and log an "end actuation event entry" including an end time stamp.

Yet another type of interrupt event causing the processor to log one or more event entries may be provided by the marking material detection mechanism 132 in the form of a signal that indicates whether or not a marking dispenser is contained in or appropriately coupled to the marking device. To this end, as discussed above in connection with FIGS. 2 and 3, the marking material detection mechanism may include a toggle switch that provides a two-state signal to the processor (e.g., dispenser in/dispenser out) as an interrupt. Upon receiving an interrupt indicating a transition from "dispenser out" to "dispenser in," the processor may collect and log this event as a "dispenser in event entry" with a corresponding time stamp, and then request other marking material information relating to the marking material in the dispenser from the marking material detection mechanism. In view of the foregoing, it should be appreciated that in some embodiments, marking material information may not necessarily be collected during one or more actuations of the marking device, but alternatively may be collected only upon a "dispenser in" event being detected. Upon detection of an interrupt event indicating a transition from "dispenser in" to "dispenser out," the processor similarly may collect and log this event as a "dispenser out event entry."

In yet another embodiment, the processor 118, executing marking data algorithm 134, may be configured to repeatedly/regularly poll all available input devices and other components of the marking device (e.g., in a predetermined order, in response to receipt of the job initiation signal) and generate an essentially continuous stream of data packets including marking information received pursuant to these polling events. In one aspect of this embodiment, each data packet of marking information may include a header, one or more flag fields, and one or more information payload fields. For example, in one implementation, the header for each packet may include one or more of a job ID (e.g., ticket identifier), technician ID, device ID (e.g., serial number), packet type ID, and/or a time stamp corresponding to logging of information/generation of the packet. Each packet also may include one or more payload fields for carrying information provided by the polled device(s) or components, and one or more flag fields that are set (or reset) upon occurrence of one or more predetermined interrupt events (e.g., pull/depress actuator, release actuator, marking dispenser in, marking dispenser out, low power, communication link fail, etc.). In this manner, a continuous stream of data may be provided as an output by the processor, in which certain interrupt events, such as an actuation and/or release of the actuator, "tag" certain data packets via an interrupt flag. In yet other aspects of this embodiment, all data packets thusly generated may be stored in the file opened for the electronic record and/or transmitted from the marking device in essentially real time; alternatively, only certain data packets with one or more predetermined flags set may be stored and/or transmitted.

Table 1 below illustrates an example of a portion of the contents of a relatively simple flat file for an electronic record that may be generated by the process 600 of FIG. 9:

TABLE 1

| TIME | LAT | LONG | EVENT | MARKER COLOR |
|---|---|---|---|---|
| 1:23:00.00 PM | −80.3851 | 25.5604 | Spraying | ORANGE |
| 1:23:00.20 PM | −80.3851 | 25.5604 | Spraying | ORANGE |
| 1:23:00.40 PM | −80.3851 | 25.5604 | Spraying | ORANGE |
| 1:23:00.60 PM | −80.3851 | 25.5604 | Spraying | ORANGE |
| 1:23.00.80 PM | −80.3851 | 25.5604 | Spraying | ORANGE |
| 1:23:01.00 PM | −80.3851 | 25.5604 | Spraying | ORANGE |
| 1:23:01.20 PM | −80.3851 | 25.5604 | Spraying | ORANGE |
| 1:23:01.40 PM | −80.3851 | 25.56039 | Spraying | ORANGE |
| 1:23:01.60 PM | −80.3851 | 25.56039 | Spraying | ORANGE |
| 1:23:01.80 PM | −80.3851 | 25.5604 | Spraying | ORANGE |
| 1:23:02.00 PM | −80.3851 | 25.5604 | Spraying | ORANGE |

The portion of the file shown in Table 1 corresponds to multiple actuation event entries (one entry per line) collected and logged during an actuation of the marking device. Each entry has a time stamp (e.g., entries are logged at a rate of approximately five events per second) and further includes multiple fields having respective values (e.g., as comma separated values) for latitude and longitude coordinates received from the location tracking device, an event indicator indicating that the device is "Spraying" (the actuator is actuated), and a color of the marking material being dispensed.

As noted above, it should be appreciated that the portion of the file shown in Table 1 is provided primarily for purposes of illustration, and that the format and/or content for respective event entries and the file itself for an electronic record generated by and/or based on the information collection process discussed above in connection with FIG. 9 may have any of a variety of different formats and/or content.

To this point, Tables 2 through 5 below provide examples of various events for which event entries may be logged in a file for an electronic record and/or transmitted by the marking device, exemplary formats for these event entries, and exemplary file formats for files having multiple such entries, according to another embodiment of the present invention.

Job Started/Paused/Restarted/Completed Events:

This event entry format provides information about when a marking operation ("job") was started and completed in addition to capturing details about if and when the job was paused and restarted.

TABLE 2

| Format | INFO+JOBS: (DATE) (TIME) (WAND_ID) (JOB_ID) (STATE) <CR><LF> |
|---|---|
| Examples | INFO+JOBS: DATE(2009-04-15) TIME(12:03:44) WAND(2334) JOB(4000) (STARTED) <CR> <LF> |
| | INFO+JOBS: DATE(2009-04-15) TIME(12:11:44) WAND(2334) JOB(4000) (PAUSED) <CR> <LF> |
| | INFO+JOBS: DATE(2009-04-15) TIME(12:51:44) WAND(2334) JOB(4000) (RESTARTED) <CR> <LF> |
| | INFO+JOBS: DATE(2009-04-15) TIME(13:09:44) WAND(2334) JOB(4000) (END) <CR> <LF> |

Actuation State Change Events:

For purposes of this event format, the actuator is deemed to have three possible states, i.e., PRESSED, HELD and RELEASED. Marking information from one or more input devices/other components of the marking device is recorded with these events to provide information about the job in progress.

TABLE 3

| Format | INFO+ WPTR: (DATE) (TIME) (GPS data) (PAINT info) (TRIGGER SWITCH STATE) <CR><L> |
|---|---|
| Examples | INFO+WPTR: DATE(2009-04-15) TIME(12:04:44) GPS($GPGGA, 120443, 4807.038, N, 01131.000, E, 1, 08, 0.9, 545.4, M, 46.9, M,, *47) CLR(RED) SWCH(PRESSED)<CR><LF> |
| | INFO+WPTR: DATE(2009-04-15) TIME(12:04:45) GPS($GPGGA, 120445, 4807.038, N, 01131.000, E, 1, 08, 0.9, 545.4, M, 46.9, M,, *47) CLR(RED) SWCH(HELD)<CR><LF> |
| | INFO+WPTR: DATE(2009-04-15) TIME(12:04:46) GPS($GPGGA, 120446, 4807.038, N, 01131.000, E, 1, 08, 0.9, 545.4, M, 46.9, M,, *47) CLR(RED) SWCH(RELEASED)<CR><LF> |

Marking Device Status Events:

The status event collects various marking information and/or information on operating characteristics of the device on a periodic basis while a job is in progress (e.g., pursuant to processor polls).

TABLE 4

| Format | INFO+STAT: (DATE) (TIME) (GPS data) (PAINT status) (MEMORY used in %) (BATTERY level) <CR><LF> |
|---|---|
| Examples | INFO+STAT: DATE(2009-04-15) TIME(12:04:00) GPS($GPGGA, 120400, 4807.038, N, 01131.000, E, 1, 08, 0.9, 545.4, M, 46.9, M,, *47) CLR(RED) MEM(65) BAT(3)<CR><LF> |

Error Events:

Should any input device or other component of the marking device encounter a significant error condition, this may be logged as an event. In some cases, the user/technician also may be notified of the error through the user interface 126 (visible alert on display, audible alarm/alert, etc.). Similar event formats may be adopted for warning alerts/events and informational alerts/events.

TABLE 5

| Format | INFO+ERR: (DATE) (TIME) (GPS data) (PAINT status) (MEMORY used in %) (BATTERY level) <CR><LF> |
|---|---|
| Examples | INFO+ERR: DATE(2009-04-15) TIME(12:04:00) GPS($GPGGA, 120400, 4807.038, N, 01131.000, E, 1, 08, 0.9, 545.4, M, 46.9, M,, *47) CLR(RED) MEM(65) BAT(3)<CR><LF> |

With respect to file formats for electronic records including the event entries outlined above in Tables 2 through 5, two exemplary file formats, namely ASCII and XML, are provided below for purposes of illustration. In various implementations, a given marking device may be particularly configured to store and/or transmit electronic records and respective entries therein in either format (or other formats). With respect to identification of files/electronic records, a standard naming scheme/format may be adopted, for example, including an identifier for the remote computer with which the marking device may be communicating ("ServerID"), an identifier for the marking device itself ("WandID"), and an identifier for the marking operation/job ("JobID"), and having the format "ServerID_WandID_Job ID."

ASCII Data Format:

This format allows low-level remote processing engines to quickly and easily receive, parse, and react to marking information logged and/or transmitted by the marking device. An example of an electronic record formatted in ASCII based on the event entries outlined in Tables 2 through 5 is as follows:

```
INFO+JOBS: DATE(2009-04-15) TIME(12:03:44) WAND(2334) JOB(4000) (STARTED)
<CR> <LF>
INFO+STAT: DATE(2009-04-15) TIME(12:04:00)
GPS($GPGGA,120400,4807.038,N,01131.000,E,1,08,0.9,545.4,M,46.9,M,,*47 )
CLR(RED) MEM(65) BAT(3)<CR><LF>
INFO+WPTR: DATE(2009-04-15) TIME(12:04:44)
GPS($GPGGA,120443,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(12:04:45)
GPS($GPGGA,120445,4807.038,N,01131.000,E,1,08,0.9,545.4,M,46.9,M,,*47 )
CLR(RED) SWCH(HELD)<CR><LF>
INFO+WPTR: DATE(2009-04-15) TIME(12:04:46)
GPS($GPGGA,120446,4807.038,N,01131.000,E,1,08,0.9,545.4,M,46.9,M,,*47 )
CLR(RED) SWCH(RELEASED)<CR><LF>
INFO+STAT: DATE(2009-04-15) TIME(12:05:00)
GPS($GPGGA,120500,4807.038,N,01131.000,E,1,08,0.9,545.4,M,46.9,M,,*47 )
CLR(RED) BAT(3)<CR><LF>
INFO+JOBS: DATE(2009-04-15) TIME(12:10:03) WAND(2334) JOB(4000)
(PAUSED)<CR> <LF>
INFO+JOBS: DATE(2009-04-15) TIME(13:01:43) WAND(2334) JOB(4000)
(RESTARTED)<CR> <LF>
INFO+WPTR: DATE(2009-04-15) TIME(13:01:50)
GPS($GPGGA,130150,4807.038,N,01131.000,E,1,08,0.9,545.4,M,46.9,M,,*47 )
CLR(RED) SWCH(PRESSED)<CR><LF>
INFO+WPTR: DATE(2009-04-15) TIME(13:01:51)
GPS($GPGGA,130151,4807.038,N,01131.000,E,1,08,0.9,545.4,M,46.9,M,,*47 )
CLR(RED) SWCH(RELEASED)<CR><LF>
INFO+JOBS: DATE(2009-04-15) TIME(13:20:30) WAND(2334) JOB(4000) (END)<CR>
<LF>
```

XML Data Format:

This format allows transmission of self-describing data elements from the marking device, in some instances reducing processing errors and reducing the risks and effort involved in upgrades and data changes. An example of an electronic record formatted in XML based on the event entries outlined in Tables 2 through 5 is as follows:

```
<WAND ID=2334>
    <JOB ID=4000>
        <ACTIVITY>
            <DATE>2009-04-15</DATE>
            <TIME>12:03:44</TIME>
            <STATUS>Started</STATUS>
        </ACTIVITY>
        <ACTIVITY>
            <DATE>2009-04-15</DATE>
            <TIME>12:04:00</TIME>
            <GPS>($GPGGA, 120400,4807.038,N,01131.000,E,1,08,0.9,545.4,M,46.9,M,,*47</GPS>
            <PAINT>
                <COLOR>Red</COLOR>
                <VALID>True</VALID>
                <SN>2342343243355</SN>
            </PAINT>
            <SWITCH>Pressed</SWITCH>
        </ACTIVITY>
    </JOB>
</WAND>
``` content shown below in Table 6 may constitute an "original" electronic record generated by the processor pursuant to the process 600 shown in FIG. 9, or may be derived from raw data collected and logged pursuant to the process 600 (e.g., as a flat file, an ASCII formatted file, or an XML formatted file) and subsequently reorganized and particularly formatted.

Yet another alternative format for storing and organizing marking information in an electronic record of a marking operation, according to one embodiment of the invention, is shown in Table 6 below. By way of example, Table 6 shows the format and content of three actuation data sets of an electronic record of a marking operation for a given facility, in which each actuation data set includes information associated with multiple actuation event entries logged during a corresponding actuation and resulting locate mark (e.g., act-1, act-2, and act-3), as shown for example in FIG. 8. As discussed above, it should be appreciated that the format and

TABLE 6

Example actuation data set for act-1

| | | |
|---|---|---|
| act-1 | Service provider ID | 0482 |
| | User ID | 4815 |
| | Device ID | 7362 |
| | T1 timestamp data | 12-Jul-2008; 09:35:15.2 |
| | T2 timestamp data | 12-Jul-2008; 09:35:16.1 |
| | Duration ($\Delta t$) | 00:00:00.9 |
| | T1 geo-location data | 2650.9348, N, 08003.5057, W |
| | $1^{st}$ interval location data | 2650.9353, N, 08003.5055, W |

TABLE 6-continued

| | | |
|---|---|---|
| | $2^{nd}$ interval location data | 2650.9356, N, 08003.5055, W |
| | . | . |
| | . | . |
| | . | . |
| | Nth interval location data | 2650.9246, N, 08003.5240, W |
| | T2 geo-location data | 2650.9255, N, 08003.5236, W |
| | Product data | Color = Red, Brand = ABC, Type/Batch = 224B-1 |
| | Locate request data | Requestor: XYZ Construction Company, Requested service address: 222 Main St, Orlando, FL |
| | Example actuation data set for act-2 | |
| act-2 | Service provider ID | 0482 |
| | User ID | 4815 |
| | Device ID | 7362 |
| | T1 timestamp data | 12-Jul-2008; 09:35:17.5 |
| | T2 timestamp data | 12-Jul-2008; 09:35:18.7 |
| | Duration (Δt) | 00:00:01.2 |
| | T1 geo-location data | 2650.9256, N, 08003.5234, W |
| | 1st interval location data | 2650.9256, N, 08003.5226, W |
| | $2^{nd}$ interval location data | 2650.9256, N, 08003.5217, W |
| | . | . |
| | . | . |
| | . | . |
| | Nth interval location data | 2650.9260, N, 08003.5199, W |
| | T2 geo-location data | 2650.9266, N, 08003.5196, W |
| | Product data | Color = Red, Brand = ABC, Type/Batch = 224B-1 |
| | Locate request data | Requestor: XYZ Construction Company, Requested service address: 222 Main St, Orlando, FL |
| | Example actuation data set for act-3 | |
| act-3 | Service provider ID | 0482 |
| | User ID | 4815 |
| | Device ID | 7362 |
| | T1 timestamp data | 12-Jul-2008; 09:35:18.7 |
| | T2 timestamp data | 12-Jul-2008; 09:35:19.8 |
| | duration (Δt) | 00:00:01.1 |
| | T1 geo-location data | 2650.9273, N, 08003.5193, W |
| | 1st interval location data | 2650.9281, N, 08003.5190, W |
| | $2^{nd}$ interval location data | 2650.9288, N, 08003.5188, W |
| | . | . |
| | . | . |
| | . | . |
| | Nth interval location data | 2650.9321, N, 08003.5177, W |
| | T2 geo-location data | 2650.9325, N, 08003.5176, W |
| | Product data | Color = Red, Brand = ABC, Type/Batch = 224B-1 |
| | Locate request data | Requestor: XYZ Construction Company, Requested service address: 222 Main St, Orlando, FL |

In addition to the information shown in Table 6, a job ID or some other identifier for the electronic record as a whole (e.g., a ticket number), as well as a total number of actuations for a given marking operation (e.g., the total number of actuation data sets in a given electronic record in this embodiment), may be included in the electronic record.

With regard to color information that may be included in any of the event entries and electronic records discussed herein, Table 7 below shows an example of the correlation of marking material color to the type of facility to be marked.

TABLE 7

Correlation of color to facility type

| Marking material color | Facility Type |
|---|---|
| Red | Electric power lines, cables or conduits, and lighting cables |
| Yellow | Gas, oil, steam, petroleum, or other hazardous liquid or gaseous materials |
| Orange | Communications, cable television, alarm or signal lines, cables, or conduits |
| Blue | Water, irrigation, and slurry lines |
| Green | Sewers, storm sewer facilities, or other drain lines |
| White | Proposed excavation |
| Pink | Temporary survey markings |
| Purple | Reclaimed water, irrigation, and slurry lines |
| Black | Mark-out for errant lines |

Figure 10:
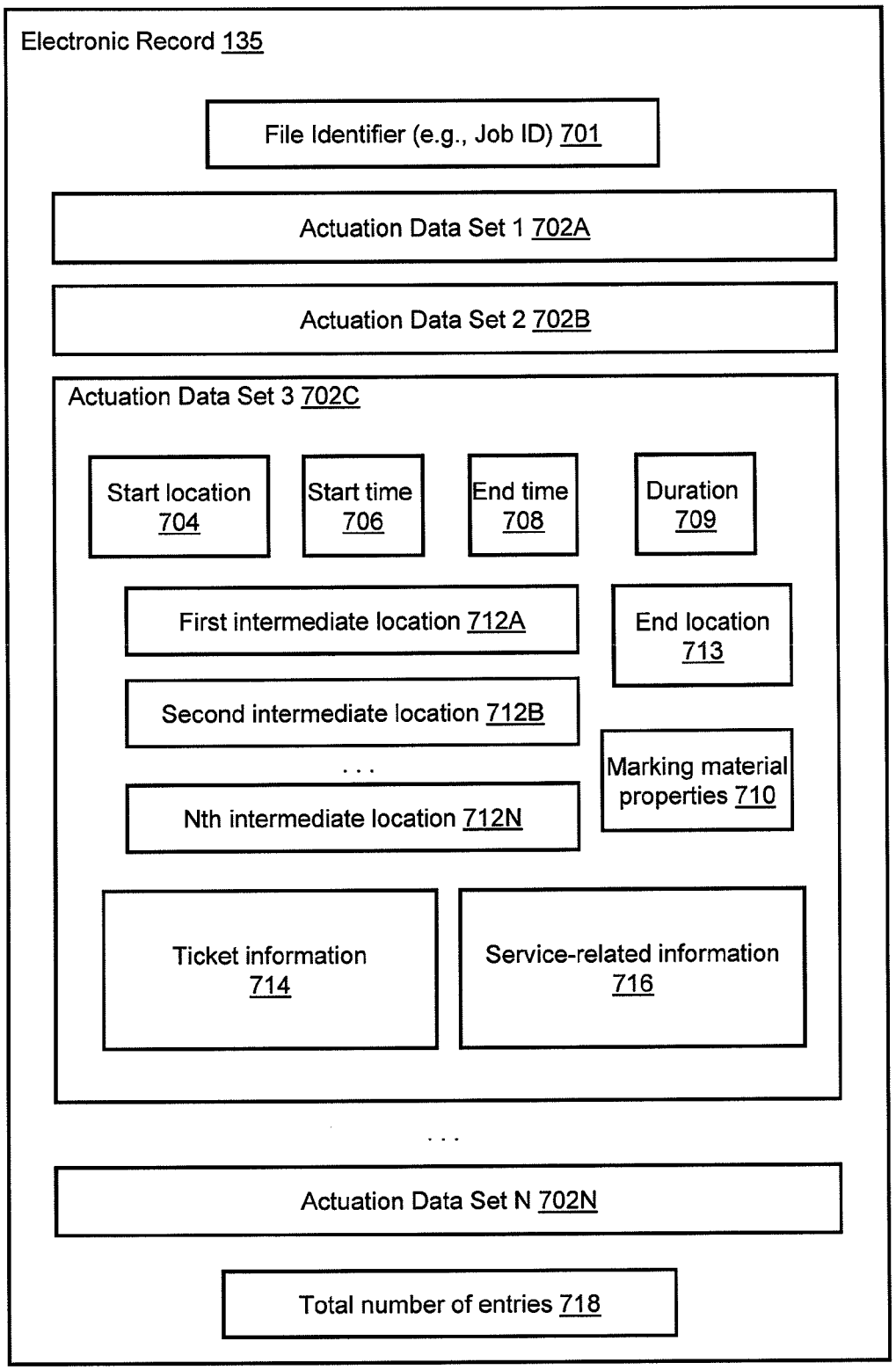
FIG. 10 is a block diagram of an exemplary data structure for an electronic record of a marking operation including information retrieved during one or more actuations of a marking device, according to one embodiment of the present invention.

FIG. 10 illustrates an exemplary data structure for an electronic record 135, according to another embodiment of the present invention, that may be generated by and/or based on information collected during the process 600 discussed above in connection with FIG. 9 and based on the organization of information shown in Table 6 above. As shown in FIG. 10, the record 135 includes a file identifier 701 (e.g., one or more of Job ID, WandID, ServerID, etc.) and a plurality of actuation data sets 1 through N (with reference numbers 702A, 702B, 702C . . . 702N), wherein each actuation data set is associated with a corresponding actuation of a marking device. For purposes of the following discussion, FIG. 10 shows additional details of the data structure for actuation data set 3 702C, showing several fields in which data (e.g., actuation event entries) may be entered to constitute the actuation data set. While only the exemplary details of the data structure of actuation data set 3 are shown in the electronic record 135 of FIG. 10, it should be appreciated that multiple actuation data sets of the electronic record 135 may have the same data structure as that shown for actuation data set 3 in FIG. 10.

The data structure of the actuation data set 3 702C of the electronic record 135 shown in FIG. 10 includes a start location field 704 (corresponding to T1 geo-location data shown in Table 2), an end location field 713 (corresponding to T2 geo-location data shown in Table 2), a start time field 706 (corresponding to T1 timestamp data shown in Table 2), an end time field 708 (corresponding to T2 timestamp data shown in Table 2) and a duration field 709 (corresponding to the duration Δt shown in Table 2). Additionally, the data structure for entry 3 702C includes one or more fields 712A, 712B, . . . 712N for intermediate location data (corresponding to $1^{st}$ interval location data, $2^{nd}$ interval location data . . . Nth interval location data shown in Table 2). Finally, the data structure for the entry 3 702C may include one or more ticket information fields 714 (e.g., corresponding to Locate request data in Table 2) and one or more service-related information fields 716 (e.g., corresponding to Service provider ID, User ID, and Device ID in Table 2).

In addition to one or more actuation data sets corresponding to actuations of a marking device, the electronic record 135 shown in FIG. 10 may include one or more additional elements. For example, FIG. 10 shows an additional element 718 of the electronic record to store the total number of entries in the record. Furthermore, according to another embodiment, various other information that may be common to multiple (or all) actuation data sets of a given electronic record may be stored in one or more additional elements of the electronic record that are not contained within one or more of the actuation data sets themselves. For example, in one alternative implementation, one or more of the ticket information field 714, the service-related information field 716, and the marking material properties field 710, which are shown as part of the data structure for a given actuation data set of the electronic record, may instead be elements of the electronic record that are not included within any one actuation data set (e.g., the information contained in one or more of the ticket information field and the service-related information field may be common to all actuation data sets of a given electronic record).

V. Computer-Generated Visual Representation of a Marking Operation

With reference again to FIGS. 2 and 3, in yet another embodiment the processor 118, executing marking data algorithm 134, and/or one or more remote computers 150 executing marking data algorithm 134, may additionally process various marking information provided in real time from a marking device and/or stored in an electronic record of a marking operation and control a display device (e.g., display 146 of marking device 110 or some other display device) to render a computer-generated visual representation of a marking operation. Such a visual representation of the marking operation may be used, for example, to provide immediate feedback to the locate technician, provide essentially real-time feedback to a supervisor monitoring the marking operation from a remote location, provide a visual record of the marking operation (e.g., for archiving purposes, once the marking operation is completed and one or more electronic records are generated), and/or to verify the quality (e.g., accuracy and completeness) of work performed during the marking operation.

In various aspects of this embodiment, a visual representation may be static in that all available information is presented in a display field at one time after completion of the marking operation and generation of an electronic record; alternatively, the visual representation may be dynamic in that information representing successive actuations of the marking device is displayed in essentially real-time, or may be displayed after completion of the marking operation and generation of the electronic record in a time-sequenced animation that "recreates" the marking operation on the time scale in which it was performed originally.

In other aspects, the relative positions of all locate marks represented by actuation event entries logged and/or transmitted by the marking device may be displayed (e.g., based on geo-location data and some appropriate scale of an available display field of display 146) to provide a visual representation of the marking operation. A visual representation of a marking operation may also be rendered in one or more particular colors corresponding to one or more particular underground facilities marked during the marking operation (e.g., see Table 7).

In one exemplary implementation, such a visual representation may include one "electronic locate mark" displayed in a display field for each actuation/dispensing action of a marking device, such that there is essentially a one-to-one correspondence between electronic locate marks and physical locate marks for a given underground facility marked during a marking operation. Alternatively, in another exemplary implementation of such a visual representation, an essentially continuous solid line (or other line type) may be displayed in a display field to represent a given underground facility marked during a marking operation. In another aspect, the processor may process the geo-location data in respective actuation data sets of an electronic record so as to filter, average, interpolate and/or otherwise "smooth" data (e.g., so as to provide "cleaner" visual renderings and/or connect successive locate marks represented by the respective actuation data sets of the electronic record); alternatively, "raw data" provided by the marking device may be utilized for the visual representation. In yet another aspect of this embodiment, visual representations of multiple marking operations for different underground facilities within the same work site/dig area may be generated in the same display field of a display device so as to provide a composite visual representation, in which different underground facilities may be uniquely identified in some manner (e.g., by different line types and/or different colors).

Figure 11:
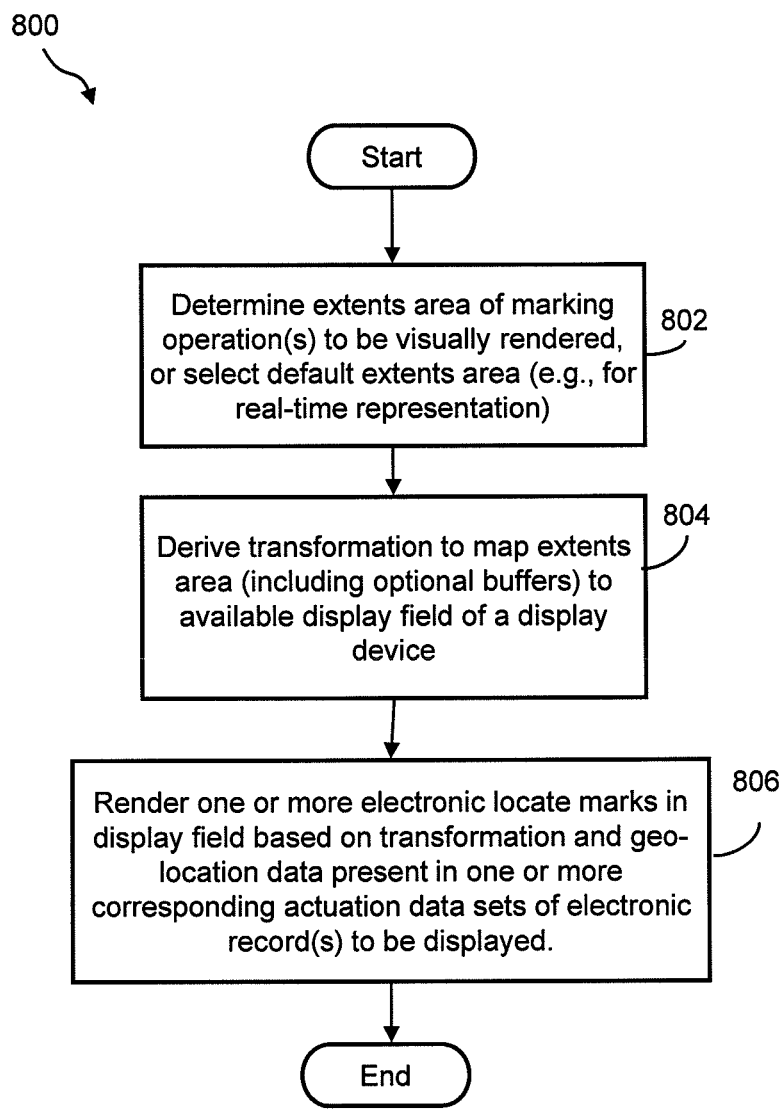
FIG. 11 is a flow diagram of an exemplary method for displaying a visual representation of a marking operation in a display field having a predetermined scale, according to one embodiment of the present invention.

FIG. 11 illustrates a flow chart for a process 800 according to one embodiment of the present invention for generating a visual representation of a marking operation based on an electronic record and/or essentially real-time information transmission from the marking device 110. As noted above, the process 800 may result from the execution of one embodiment of the marking data algorithm 134 on the processor 118 of the marking device 110 (to render the visual representation on the display 146 of the marking device), or by one or more other remote computers (to render the visual representation on one or more other display devices).

In block 802 of the process 800, if an electronic record has already been generated for the marking operation in which one or more underground facilities are marked, the record is examined to determine the geographic extents of the locate marks to be visually rendered on a display device. In particular, the processor 118 may review the geo-location data of all actuation data sets of the electronic record to determine (e.g., based on the respective latitude and longitude coordinates of the available geo-location data) the maximum extents of the marking operation to be visually rendered.

The maximum extents of the marking operation may be determined in any of a variety of manners according to different exemplary implementations. For example, in one exemplary implementation, in block 802 the processor 118 may determine the centroid of all electronic locate marks represented by respective actuation data sets of the electronic record to be displayed. The processor then determines the geographic extent of the collection of electronic locate marks by determining one or more latitude/longitude coordinate pairs from the available data having a greatest distance from the centroid. In one example, the processor may determine a single farthest point from the centroid, and a distance between this farthest point and the centroid serves as a radius of a circle that provides an "extents area circle." In another example, the "farthest opposing corners" of a rectangle around the centroid may be determined by assigning the centroid as the origin of a reference coordinate system, and finding the coordinate pairs in opposing quadrants of the coordinate system having a greatest distance from the centroid (e.g., the +LAT/+LONG and −LAT/−LONG coordinate pairs at a greatest distance from the origin) to provide an "extents area rectangle." Other types of polygons and closed shapes (ovals) may be employed to provide an extents area for the marking operation to be displayed.

Alternatively, if an electronic record has not been previously generated and information received in essentially real-time from the marking device is to be displayed in a display field, a default extents area may be selected in advance based on any of a variety of criteria. For example, address and/or site description information provided in a ticket pursuant to which the marking operation is performed may provide a basis on which an extents area for the marking operation may be estimated a priori. Similarly, as discussed further below in connection with FIG. 14, an available digital image of the work site/dig area may be employed to determine or estimate an initial extents area for the marking operation.

In block 804, the extents area of the marking operation to be visually rendered is then mapped to an available display field of a display device, using any appropriate scaling factor as necessary, to ensure that all of the geo-location data in the electronic record fits within the display field. For example, in one exemplary implementation, a transformation may be derived using information relating to the available display field (e.g., a reference coordinate system using an appropriate scale for a given display field of a display device) to map data points within the extents area to the available display field. In another aspect of this example, a buffer area around the extents area may be added to provide one or more suitable margins for the displayed visual representation, and/or to accommodate different shapes of extents areas to the available display field of the display device, and an appropriate transformation may be derived based on this optional additional buffer area.

Once a transformation is derived to map the marking operation extents area to the available display field of a display device, in block 806 one or more electronic locate marks is/are rendered in the display field based on applying the transformation to the geo-location data present in the data set of one or more corresponding actuation data sets of the electronic record. In one exemplary implementation, one electronic locate mark is rendered in the display field for each actuation data set of an electronic record. With reference again to Table 6 and FIG. 10, in one embodiment each actuation data set includes at least T1 geo-location data for a start of an actuation of a marking device and one or more other pieces of geo-location data during actuation. Using multiple pieces of geo-location data per actuation data set, an electronic locate mark may be rendered as a line in the display field (e.g., so as to visually represent one of the physical locate marks 414-1, 414-2 or 414-3 shown in FIG. 8). In another exemplary implementation, an electronic locate mark may be rendered for each geo-location data in a given entry, such that multiple electronic locate marks correspond to one actuation (e.g., a series of dots electronically rendered to graphically represent a line-type physical locate mark). In one aspect, as discussed above, a given electronic locate mark may be rendered in a particular color and/or line type to represent a type of underground facility represented by the mark (e.g., as indicated by marking material information included in the electronic record).

Figure 12:
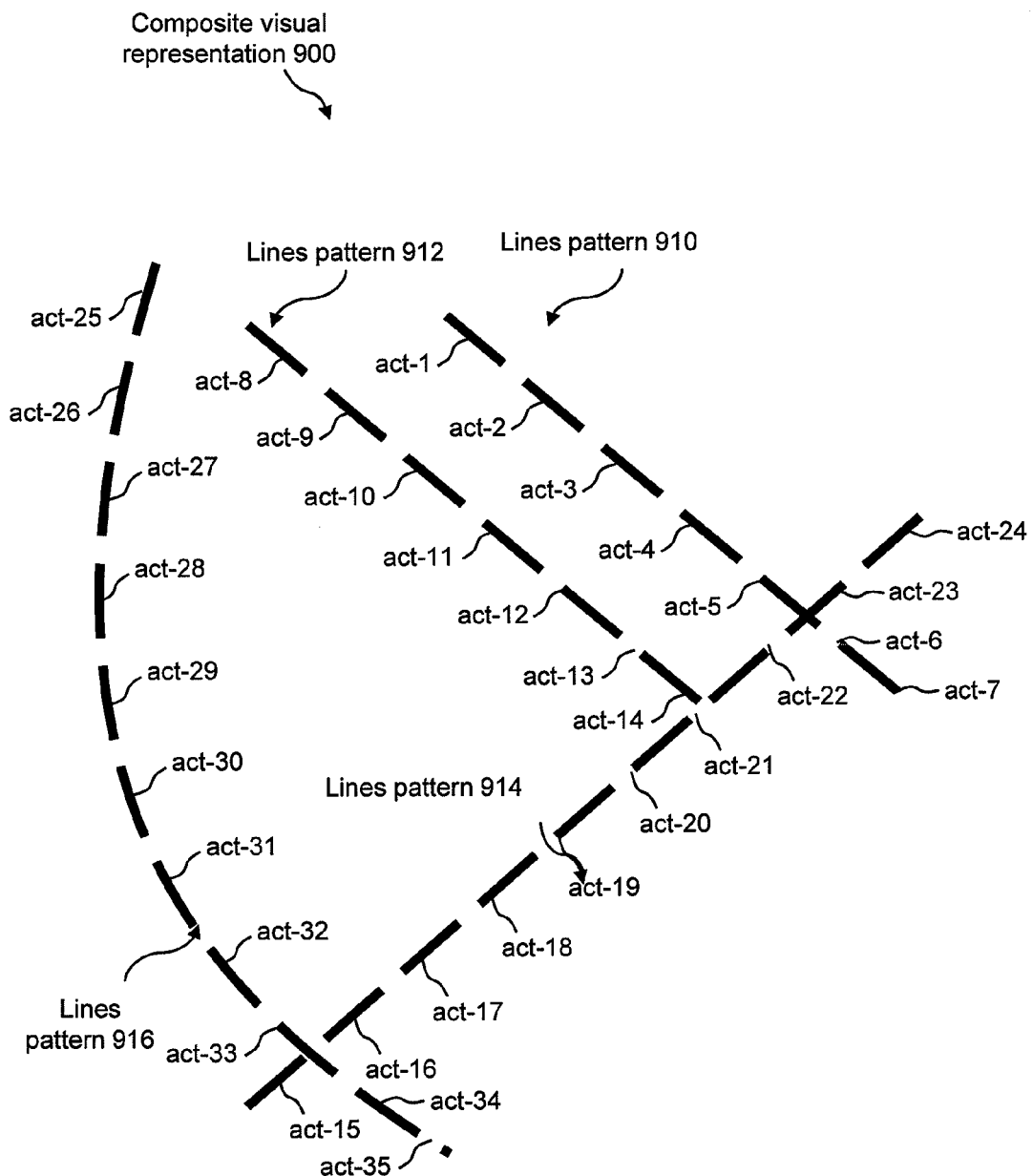
FIG. 12 is an example of a visual representation showing electronic locate marks based on collected data corresponding to respective actuations of a marking device during marking operations, according to one embodiment of the present invention.

FIG. 12 illustrates a plan view of an exemplary composite visual representation 900 that "electronically recreates" a marking operation for various underground facilities present in a dig area, based for example on the process 800 discussed above. In particular, FIG. 12 illustrates a number of electronic locate marks corresponding to actuations of a marking device whose relative positions in the display field are derived from actuation data sets of the electronic record, as discussed above. In the example of FIG. 12, act-1 through act-7 form a lines pattern 910 representing a first marked underground facility, act-8 through act-14 form a lines pattern 912 representing a second marked underground facility, act-15 through act-24 form a lines pattern 914 representing a third marked underground facility, and act-25 through act-35 form a lines pattern 916 representing a fourth marked underground facility.

Figure 13:
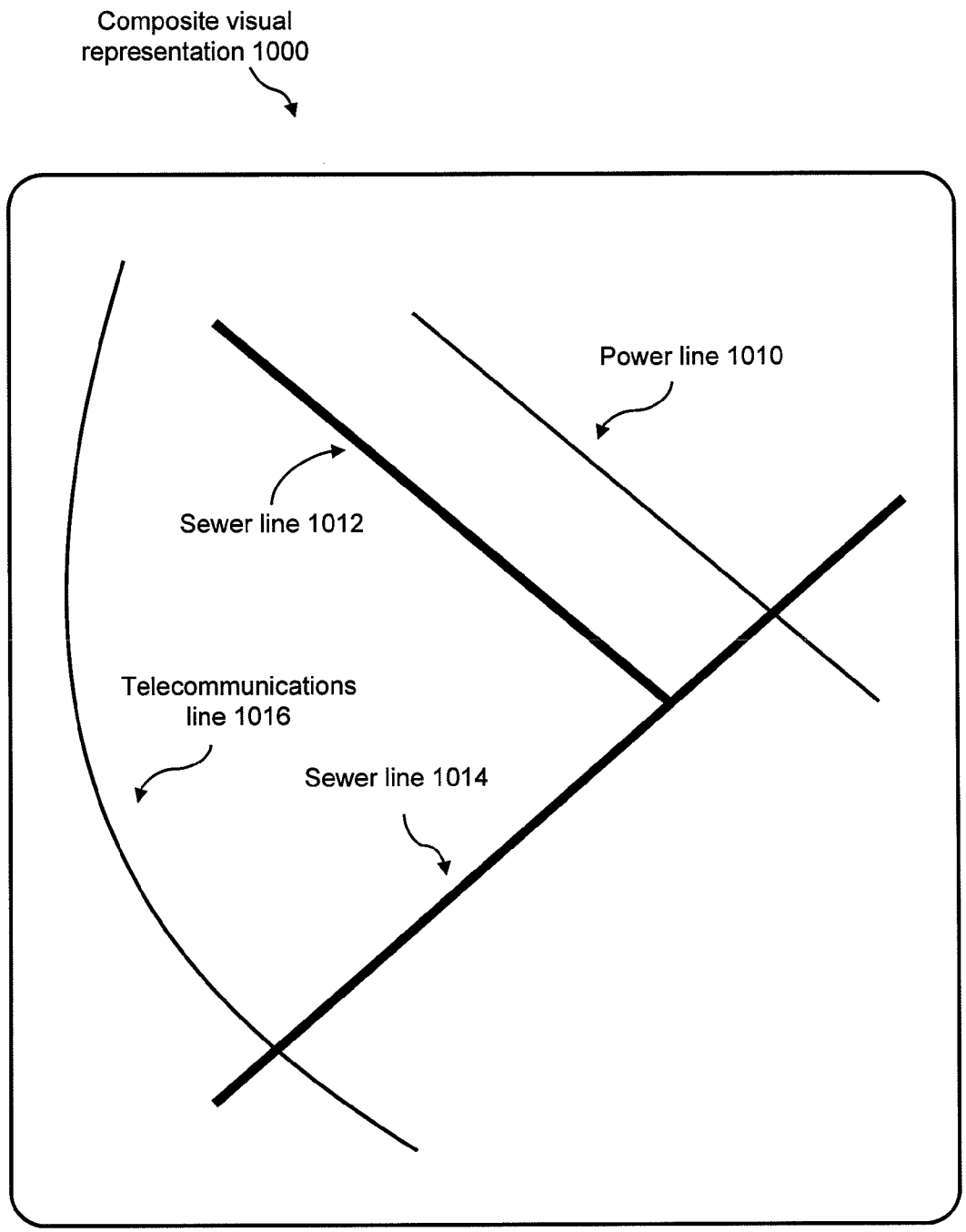
FIG. 13 is an example of another visual representation of marking operations, according to one embodiment of the present invention.

As noted above, while in one embodiment there may be a one-to-one correspondence between electronic locate marks rendered in a single or composite visual representation and physical locate marks placed in a dig area during a marking operation, or there may be multiple electronic locate marks for a corresponding physical locate mark, in yet other embodiments a single or composite visual representation may provide a variety of other indicators/digital representations of marked underground facilities in a computer-generated visual rendering. For example, FIG. 13 illustrates another example of a composite visual representation 1000 based on the same electronic record used to generate the composite visual representation 900 of FIG. 12, in which continuous lines are used to indicate the respective marking operations. To this end, in one exemplary implementation, an additional step may be included in the process 800 shown in FIG. 11, in which the processor may process the geo-location data in an electronic record by filtering, averaging, interpolating and/or otherwise "smoothing" the data so as to connect successive discrete locate marks represented by the respective actuation data sets of the electronic record and thereby provide a substantially smooth continuous line for display.

In the example of FIG. 13, as also noted above, different underground facility types may be indicated in different color lines, and the different colors/facility types may be derived from the electronic record (e.g., based on the correlations provided in Table 7). Furthermore, in other aspects, text indicators may be included in the visual representation, and/or other types of coding may be used (different line styles such as patterns, width, bold, etc.; a succession of symbols or other graphic icons, etc.) to indicate different facility types, and/or some other aspect of a given facility (e.g., the material used for a particular pipe, conduit, cable, sheathing; the diameter of a particular pipe, conduit, cable; offsets to one or more environmental landmarks, etc.). By way of example, FIG. 13 indicates that the four underground facilities in the composite visual representation correspond to a power line 1010 (which may be rendered in the color red), a first sewer line 1012 (which may be rendered in the color green), a second sewer line 1014 (which also may be rendered in the color green), and a telecommunications line 1016 (which may be rendered in the color orange). While not shown explicitly in FIG. 13, an exemplary composite visual representation may include additional textual, numeric and/or graphic elements to provide other information available in the electronic record for the marking operations (e.g., time-stamp information, ID information, coordinates for location information, offset indications, etc.).

In some marking operations, a technician may use the marking device not only to mark an underground facility's placement/path relative to the ground, pavement or other surface, but also to "annotate" the marking operation in some fashion. For example, in some instances a technician actually "writes" with the marking device (e.g., by actuating the marking device to dispense paint) to provide text annotations, offset indications, arrows, other symbols, and the like on the ground, pavement or other surface. Accordingly, the electronic record for a marking operation may include one or more actuation data sets corresponding to actuations in which the technician was "writing" to annotate the marking operation in some fashion rather than marking the path of an underground facilities. In some cases, providing such technician annotations on a visual representation of a marking operation may be desirable; however, in other instances such annotations may provide erratic markings on a visual representation, in which case additional processing of geo-location data or other information in the electronic record (e.g., filtering, averaging, interpolating and/or otherwise "smoothing" the data) may be employed.

Figure 14:
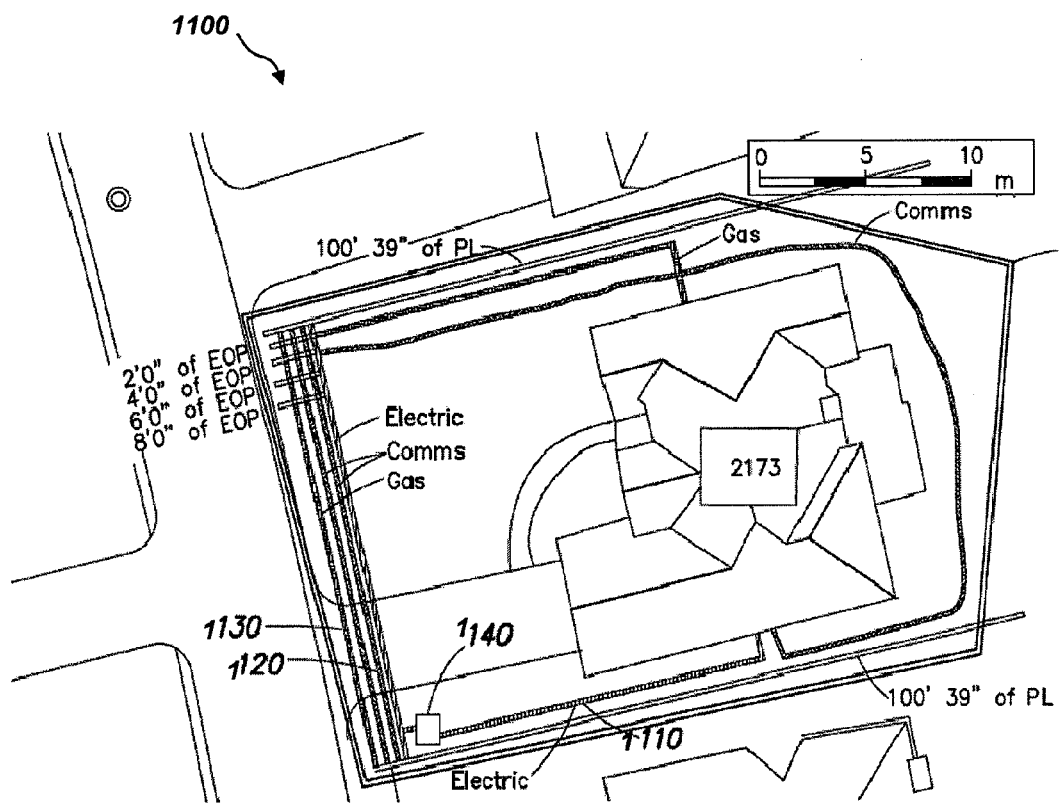
FIG. 14 is an example of another visual representation of marking operations, according to another embodiment of the present invention, in which electronic locate marks are overlaid on a digital image of a work site/dig area.

In yet another embodiment, a single or composite visual representation of a marking operation may rendered on a display device together with a digital image representative of at least a portion of a dig area at a work site, such that one or more electronic locate marks appear in appropriate relative positions overlaid on the displayed digital image. FIG. 14 illustrates yet another example of a composite visual representation 1100, albeit based on an electronic record different than that used to generate the visual representations of FIGS. 9 and 10, in which continuous lines are used to indicate the respective different underground facilities marked, and these lines are overlaid on a digital image of a dig area. It should be appreciated that although continuous lines representing underground facilities are depicted on a digital image in FIG. 14, in other embodiments discrete electronic locate marks corresponding to successive actuations of a marking device (or multiple discrete electronic locate marks per actuation) may be overlaid on a digital image of the dig area.

In the embodiment of FIG. 14, a number of different image sources and image types may be employed to provide the digital image on which a visual representation of a marking operation may be overlaid. For purposes of the present disclosure, such a digital image (also referred to herein as an "input image") may be any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map;

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML);

Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image); and An image, such as any of the above image types, that includes one or more dig area indicators, or "virtual white lines," that provide one or more indications of or graphically delimit a dig area, as described in U.S. patent application Ser. No. 12/366,853, incorporated by reference herein. The virtual white lines may include lines, drawing shapes, shades, symbols, coordinates, data sets, or other indicators that are added to an image, and may assist a locate technician in the performance of a locate operation by identifying the area of interest, i.e., the dig area. In this manner, a searchable electronic record according to the concepts disclosed herein may be generated based on a previously marked-up input image on which the dig area is indicated.

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

As noted above, in some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

Based on the foregoing, a digital image may be displayed in an available display field of a display device either before or after electronic locate marks are displayed in the available display field. For example, in one implementation, after the block 806 in FIG. 11, all or a portion of the digital image may be mapped to the available display field based on any relevant geographic information accompanying the digital image (e.g., GPS coordinates to which the image is indexed). Alternatively, the digital image may be mapped first to the available display field of the display device depending on appropriate scaling and/or transformation parameters as would be readily appreciated by one of ordinary skill in the art, and thereafter one or more electronic locate marks similarly may be mapped to the available display field in appropriate positions relative to the underlying digital image. In the example of FIG. 14, a first visual representation of a gas line 1130 is depicted, a second visual representation of a communication line 1120 is depicted, and a third visual representation of an electric line 1110 is depicted on an aerial image of a residential dig area for purposes of illustration. As discussed above in connection with other embodiments, these visual representations may be displayed in different colors and/or line types to denote different types of underground facilities and/or various attributes of a given facility. As also illustrated in FIG. 14, other types of markings may be included as part of the displayed image, including environmental landmarks (streets), property boundaries, tie-downs (reference lines between marked facilities and environmental landmarks and/or property boundaries) and their associated dimensions, junction boxes or transformers 1140, and one or more text boxes 2173 (e.g., to indicate an address of the work site over the residence), and the like.

The various examples of visual representations illustrated in FIGS. 11-14 may be used for various purposes, including, but not limited to:

(1) The display may be viewed by the marking technician for substantially immediate feedback of his/her work performed, which can be compared against the ticket information to ensure that the full scope of the current marking operation has been completed satisfactorily.

(2) The display may be viewed by a supervisor (using remote computer 150 that is receiving the data) as substantially immediate feedback of work performed by the marking technician, which again can be compared against the ticket information to ensure that the full scope of the current marking operation has been completed satisfactorily. When the supervisor is viewing the marking operation in real time, he/she may contact the marking technician in real time in the event that the marking operation is unsatisfactory;

(3) The display may be viewed by a quality control supervisor (using remote computer 150 that has received the data) as feedback of work performed by the technician, which again can be compared against the ticket information to ensure that the full scope of the current marking operation has been completed satisfactorily. By viewing the marking operation, the quality control supervisor may dispatch a quality control technician or other personnel in the event that there is the marking operation is unsatisfactory, and (4) The display may be viewed by a training supervisor as feedback of work performed by the marking technician, which can be used to assess employee performance and direct training activities.

In the data acquisition system of embodiments of the present disclosure and the method of analyzing marking operations based on actuations of a marking device, the data that may be acquired and analyzed for any purpose and is not limited to the data described with reference to FIGS. 1 through 14 and the various tables herein. The data of interest that may be acquired and analyzed may include, but is not limited to, t1 timestamp data, t2 timestamp data, geolocation information, direction information, any information included in the standard data stream of the locate tracking system (e.g., GPS system), color/type of marking material, amount of marking material in marking dispenser, serial number of marking dispenser (e.g., barcode, RFID), ID information (e.g., individual, vehicle, wage and/or hour compliance), battery status of the marking device, angle of spray of marking material (e.g., using an inclinometer), wired/wireless connection status, Bluetooth® signal strength, storage capacity of the local memory, temperature, humidity, light level, movement of the marking device, mode of operation of the marking device, docking state of the marking device (e.g., docked/undocked, charging/not charging), alerts against expectations in performance (e.g., compare amount and/or type of marking material sprayed against facility maps), and any combination thereof.

The information, such as shown in various tables herein, that may be acquired by use of the data acquisition system and methods described herein, may be used for any purpose. In an embodiment, the information of the data acquisition system may be analyzed against expected marking operations in order to gain benefits in, for example, operating efficiency, personnel management, inventory management, quality control, training operations, safety, customer satisfaction, and the like.

Additionally, the information that is acquired by use of the data acquisition system and the methods of the present disclosure may be correlated to other aspects of locate and marking operations. This correlation may occur, for example, by performing complex event processing (CEP) using multiple data streams from multiple devices. For example, the marking device data streams (e.g., respective event entries or one or more electronic records transmitted by the marking device) may be correlated to other data streams of multiple marking devices or any other devices in order to aggregate, assess, evaluate, draw insights from, take action on this information, and any combination thereof. Correlating disparate data streams may be useful in order to better interpret and/or gain new interpretations that are useful. For example, by analyzing the aggregated data, field service providers may gain visibility into the distributed workforce, may take corrective and/or any other constructive action to improve process management, may improve and/or develop best practices, and any combination thereof. In an embodiment, certain trends may be identified by correlating historical records of the amount of time that is spent performing locate and marking operations to other information, such as, but not limited to, the time of day, time of year, address of the locate site, experience of the locate technician, weather conditions, heavy or light traffic times, and the like.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A marking apparatus to perform a marking operation, the marking apparatus comprising:
    an actuation system;
    a memory to store processor-executable instructions; and
    a processor communicatively coupled to the memory and the actuation system, wherein upon execution of the processor-executable instructions by the processor, the processor provides an output stream of data packets and controls the memory to store the data packets, each data packet including at least one flag field that is set or reset upon at least one actuation of the actuation system.

2. The apparatus of claim 1, further comprising:
    at least one input device communicatively coupled to the processor to provide marking information regarding the marking operation,
    wherein the processor polls the at least one input device to acquire and log at least some of the marking information into the output stream of data packets.

3. The apparatus of claim 2, wherein the at least one input device includes at least one of:
    a location tracking system to provide geographic information; and
    a marking material detection mechanism to provide marking material information,
    wherein the processor polls the at least one of the location tracking system and the marking material detection mechanism, and wherein the at least some of the marking information logged into the output stream of data packets includes at least one of the geographic information provided by the location tracking system and the marking material information provided by the marking material detection mechanism.

4. The apparatus of claim 3, wherein the at least one input device includes the location tracking system.

5. The apparatus of claim 4, wherein:
    the geographic information provided by the location tracking system includes at least one longitude coordinate, at least one latitude coordinate, and a corresponding geo-location data time stamp at which the at least one longitude coordinate and the at least one latitude coordinate are obtained by the location tracking system; and
    the output stream of data packets includes the at least one longitude coordinate, the at least one latitude coordinate and the corresponding geo-location data time stamp.

6. The apparatus of claim 5, wherein the geographic information further includes a first number and/or identification of satellites being used by the location tracking system.

7. The apparatus of claim 5, wherein the geographic information further includes:
    a second number and/or identification of satellites in view of the location tracking system; and
    at least one of an elevation, azimuth, signal-to-noise-ratio value and dilution of precision value for at least one of the second number of satellites in view of the location tracking system.

8. The apparatus of claim 4, further comprising an elongated housing having a proximal end including a handle for a user and a distal end proximate to ground, pavement or other surface, wherein the location tracking system is coupled to the housing nearer to the proximal end than the distal end.

9. The apparatus of claim 3, wherein the at least one input device includes the location tracking system and the marking material detection mechanism.

10. The apparatus of claim 3, wherein the at least one input device includes the marking material detection mechanism.

11. The apparatus of claim 10, wherein the marking material detection mechanism includes at least one of:
    a barcode reader;
    a radio-frequency identification (RFID) tag reader;
    an optical sensor;
    an olfactory sensor;
    an auditory sensor;
    a weight sensor;
    and a switch device.

12. The apparatus of claim 10, wherein the marking material information provided by the marking material detection mechanism includes at least one of:
    at least one signal indicating a presence or absence of marking material dispensed by the apparatus;
    a serial number associated with the marking material;
    a universal product code associated with the marking material;
    color information associated with the marking material;
    brand information associated with the marking material;
    type information associated with the marking material;
    weight information associated with the marking material; and
    inventory information associated with the marking material.

13. The apparatus of claim 2, wherein the apparatus includes at least one of a communication interface and a user interface, communicatively coupled to the processor, to receive ticket information relating to the marking operation, wherein the ticket information includes at least one of:
- at least one party identifier representing a party requesting the marking operation;
- at least one facility identifier representing a type of facility to be marked in the marking operation; and
- at least one address of a work site and/or dig area at which the marking operation is performed, wherein the output stream of data packets includes at least some of the ticket information.

14. The apparatus of claim 2, wherein the apparatus includes at least one of a communication interface and a user interface, communicatively coupled to the processor, to receive service-related information relating to the marking operation, wherein the service-related information includes at least one of:
- at least one service provider identifier representing a service provider overseeing performance of the marking operation;
- at least one technician identifier representing a technician that performs the marking operation; and
- at least one device identifier representing the apparatus, wherein the output stream of data packets includes at least some of the service-related information.

15. The apparatus of claim 14, wherein the at least one device identifier includes a serial number for the marking apparatus.

16. The apparatus of claim 2, wherein the at least one input device includes at least one communication interface, wherein the processor receives status information regarding operation of the communication interface, and wherein the output stream of data packets includes at least one communication interface event entry including the status information.

17. The apparatus of claim 2, further comprising at least one power source, wherein the output stream of data packets includes power information associated with the power source.

18. The apparatus of claim 2, wherein:
- the at least one input device comprises a plurality of input devices to provide the marking information;
- the processor is configured to repeatedly poll the plurality of input devices and generate the output stream of data packets including the at least some of the marking information received from at least some of the plurality of input devices pursuant to the repeated polling; and
- the output stream of data packets is generated by the processor in a substantially continuous manner.

19. The apparatus of claim 18, wherein each data packet of the output stream of data packets includes the at least one flag field and further includes:
- a header; and
- at least one payload.

20. The apparatus of claim 19, wherein:
the header includes at least one of:
- a job number or ticket number associated with the marking operation;
- a technician identifier representing a technician that performs the marking operation;
- a device identifier representing the apparatus;
- a packet type identifier;
- a time stamp corresponding to logging of information; and
- a time stamp corresponding to generation of the packet;

the at least one flag field is set or reset upon occurrence of at least one of:
- a pull of an actuator configured to trigger the at least one actuation of the actuation system; and
- a release of the actuator configured to trigger the at least one actuation of the actuation system; and the at least one payload field includes the at least some of the marking information received from the at least some of the plurality of input devices.

21. The apparatus of claim 20, further comprising:
- a marker dispenser holder to hold a marker dispenser containing a marking material;
- at least one communication interface communicatively coupled to the processor; and
- at least one power source, wherein each data packet includes at least one second flag field that is set or reset upon occurrence of at least one of:
- an insertion of the marker dispenser into the marker dispenser holder;
- a removal of the marker dispenser from the marker dispenser holder;
- a low power state of the power supply; and
- a failure of a communication link provided by the at least one communication interface.

22. The apparatus of claim 1, further comprising:
- a location tracking system communicatively coupled to the processor to provide geographic information;
- a marking material detection mechanism communicatively coupled to the processor to provide marking material information;
- at least one communication interface communicatively coupled to the processor;
- a marker dispenser holder to hold a marker dispenser containing a marking material; and
- at least one power source, wherein each data packet in the output stream of data packets further includes:
- a marking material detection event entry including at least one indication of a presence or an absence of the marker dispenser in the marker dispenser holder;
- the geographic information provided by the location tracking system;
- the marking material information provided by the marking material detection mechanism;
- ticket information relating to the marking operation provided by the at least one communication interface;
- service-related information relating to the marking operation provided by the at least one communication interface;
- status information regarding operation of the at least one communication interface; and
- power information associated with the power source.

23. A method for providing information relating to a marking operation to mark on ground, pavement or other surface a presence or an absence of at least one underground facility, the method comprising:
A) effecting at least one actuation of an actuation system of a marking apparatus to dispense a marking material so as to form at least one locate mark on the ground, pavement or other surface to indicate the presence or the absence of the at least one underground facility; and
B) providing an output stream of data packets from a processor of the marking apparatus, each data packet including at least one flag field that is set or reset upon the at least one actuation of the at least one actuation system.

24. The method of claim 23, wherein the marking apparatus further comprises at least one input device to provide marking information regarding the marking operation, and wherein the method further comprises:
polling the at least one input device, via the processor, to acquire and log at least some of the marking information into the output stream of data packets.

25. The method of claim 24, wherein:
the at least one input device includes at least one of:
a location tracking system to provide geographic information; and
a marking material detection mechanism to provide marking material information; and
the method further includes polling the at least one of the location tracking system and the marking material detection mechanism, and wherein the at least some of the marking information logged into the output stream of data packets includes at least one of the geographic information provided by the location tracking system and the marking material information provided by the marking material detection mechanism.

26. The method of claim 25, wherein:
the at least one input device includes the location tracking system;
the geographic information provided by the location tracking system includes at least one longitude coordinate, at least one latitude coordinate, and a corresponding geo-location data time stamp at which the at least one longitude coordinate and the at least one latitude coordinate are obtained by the location tracking system; and
the output stream of data packets includes the at least one longitude coordinate, the at least one latitude coordinate and the corresponding geo-location data time stamp.

27. The method of claim 26, wherein the geographic information further includes a first number and/or identification of satellites being used by the location tracking system.

28. The method of claim 26, wherein the geographic information further includes:
a second number and/or identification of satellites in view of the location tracking system; and
at least one of an elevation, azimuth, signal-to-noise-ratio value and dilution of precision value for at least one of the second number of satellites in view of the location tracking system.

29. The method of claim 25, wherein:
the at least one input device includes the marking material detection mechanism;
the marking material detection mechanism includes at least one of:
a barcode reader;
a radio-frequency identification (RFID) tag reader;
an optical sensor;
an olfactory sensor;
an auditory sensor;
a weight sensor;
and a switch device;
the marking material information provided by the marking material detection mechanism includes at least one of:
at least one signal indicating a presence or absence of the marking material to be dispensed;
a serial number associated with the marking material;
a universal product code associated with the marking material;
color information associated with the marking material;
brand information associated with the marking material;
type information associated with the marking material;
weight information associated with the marking material; and
inventory information associated with the marking material; and
the output stream of data packets includes the marking material information.

30. The method of claim 24, further comprising receiving ticket information via at least one of a communication interface and a user interface, wherein the ticket information includes at least one of:
at least one party identifier representing a party requesting the marking operation;
at least one facility identifier representing a type of facility to be marked in the marking operation; and
at least one address of a work site and/or dig area at which the marking operation is performed,
wherein the output stream of data packets includes at least some of the ticket information.

31. The method of claim 24, further comprising receiving service-related information relating to the marking operation via at least one of a communication interface and a user interface, wherein the service-related information includes at least one of:
at least one service provider identifier representing a service provider overseeing performance of the marking operation;
at least one technician identifier representing a technician that performs the marking operation; and
at least one device identifier representing a marking apparatus used to perform the marking operation,
wherein the output stream of data packets includes at least some of the service-related information.

32. The method of claim 31, wherein the at least one device identifier includes a serial number for the marking apparatus.

33. The method of claim 24, wherein the at least one input device includes at least one communication interface, wherein the method further includes receiving status information regarding operation of the communication interface, and wherein the output stream of data packets includes at least one communication interface event entry including the status information.

34. The method of claim 24, wherein the marking apparatus includes at least one power source, and wherein the output stream of data packets includes power information associated with the at least one power source.

35. The method of claim 24, wherein:
the at least one input device comprises a plurality of input devices to provide the marking information; and
B) comprises repeatedly polling, via the processor, the plurality of input devices to generate, in a substantially continuous manner, the output stream of data packets including the at least some of the marking information received from at least some of the plurality of input devices pursuant to the repeated polling.

36. The method of claim 35, wherein each data packet of the output stream of data packets includes the at least one flag field and further includes:
a header; and
at least one payload.

37. The method of claim 36, wherein:
the header includes at least one of:
- a job number or ticket number associated with the marking operation;
- a technician identifier representing a technician that performs the marking operation;
- a device identifier representing the marking apparatus;
- a packet type identifier;
- a time stamp corresponding to logging of information; and
- a time stamp corresponding to generation of the packet;

the at least one flag field is set or reset upon occurrence of at least one of:
- a pull of an actuator configured to trigger the at least one actuation of the actuation system; and
- a release of the actuator configured to trigger the at least one actuation of the actuation system; and the at least one payload field includes the at least some of the marking information received from the at least some of the plurality of input devices.

38. The method of claim 37, wherein:
the marking apparatus further comprises:
- a marker dispenser holder to hold a marker dispenser containing a marking material;
- at least one communication interface communicatively coupled to the processor; and
- at least one power source; and each data packet includes at least one second flag field that is set or reset upon occurrence of at least one of:
- an insertion of the marker dispenser into the marker dispenser holder;
- a removal of the marker dispenser from the marker dispenser holder;
- a low power state of the power supply; and
- a failure of a communication link provided by the at least one communication interface.

* * * * *